United States Patent
Coverstone

(10) Patent No.: US 9,300,347 B1
(45) Date of Patent: *Mar. 29, 2016

(54) ACTIVE COVER FOR ELECTRONIC DEVICE

(71) Applicant: STAR CO Scientific Technologies Advanced Research Co, LLC, Longview, TX (US)

(72) Inventor: Thomas E. Coverstone, Hallsville, TX (US)

(73) Assignee: STAR CO SCIENTIFIC TECHNOLOGIES ADVANCED RESEARCH CO, LLC, Longview, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/835,805

(22) Filed: Aug. 26, 2015

Related U.S. Application Data

(63) Continuation-in-part of application No. 14/077,826, filed on Nov. 12, 2013, which is a continuation of application No. 13/450,458, filed on Apr. 18, 2012, now Pat. No. 8,583,198.

(51) Int. Cl.
| | |
|---|---|
| *H04B 1/38* | (2015.01) |
| *H04M 19/04* | (2006.01) |
| *H04B 1/3888* | (2015.01) |
| *G06F 3/043* | (2006.01) |
| *G06F 3/041* | (2006.01) |
| *G06F 3/0484* | (2013.01) |
| *H04M 1/725* | (2006.01) |

(52) U.S. Cl.
CPC .............. *H04B 1/3888* (2013.01); *G06F 3/043* (2013.01); *G06F 3/0412* (2013.01); *G06F 3/04847* (2013.01); *H04M 1/72527* (2013.01); *H04M 1/72547* (2013.01)

(58) Field of Classification Search
None
See application file for complete search history.

(56) References Cited

U.S. PATENT DOCUMENTS

| | | |
|---|---|---|
| 6,608,996 B1 | 8/2003 | Laurikka et al. |
| 7,065,381 B2 | 6/2006 | Jenkins et al. |
| 7,305,260 B2 | 12/2007 | Vuori et al. |
| 7,353,416 B2 | 4/2008 | Jeansonne et al. |
| 7,400,917 B2 | 7/2008 | Wood |
| 7,466,810 B1 | 12/2008 | Quon et al. |
| 7,769,141 B2 | 8/2010 | Cupal |
| 7,941,725 B2 | 5/2011 | Francillon et al. |
| 2005/0119032 A1 | 6/2005 | Airas |
| 2005/0270872 A1 | 12/2005 | Lin |
| 2006/0240877 A1 | 10/2006 | Filiba |
| 2009/0231248 A1 | 9/2009 | Dorff |
| 2012/0196580 A1 | 8/2012 | Simmons |
| 2012/0302294 A1 | 11/2012 | Hammond |
| 2014/0120883 A1 | 5/2014 | Fondeau |

*Primary Examiner* — Creighton Smith
(74) *Attorney, Agent, or Firm* — McAndrews, Held & Malloy, Ltd.

(57) ABSTRACT

Systems and methods of providing a mobile device cover are described. In some embodiments, the mobile device cover may include, for example, an acoustic sensor, a processor, and lighting devices. The processor can be operatively coupled to the acoustic sensor and the lighting devices. The acoustic sensor can be configured to receive sound generated by the mobile phone and to convert the sound into an acoustic signal. The processor can be configured to receive the acoustic signal and to determine whether the acoustic signal is similar to one of a plurality of acoustic signals previously stored on the mobile phone cover. Each of the previously stored acoustic signals can be indicative of, for example, a particular caller, a particular message sender, or a particular alert. Based on the acoustic signal determination, the processor is configured to cause lighting of the one or more lighting devices corresponding to the indicated caller, indicated message sender, or indicated alert.

30 Claims, 37 Drawing Sheets

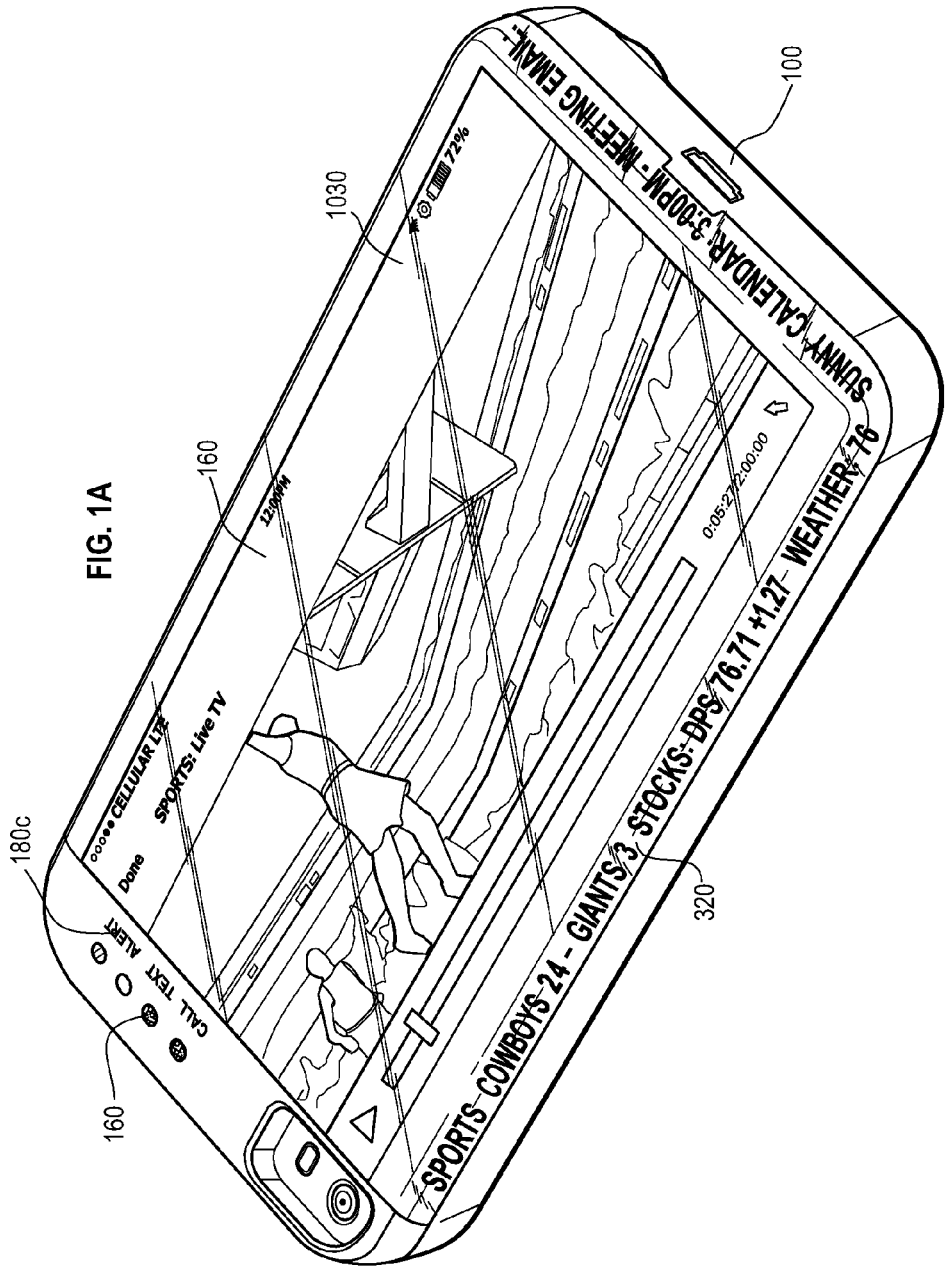

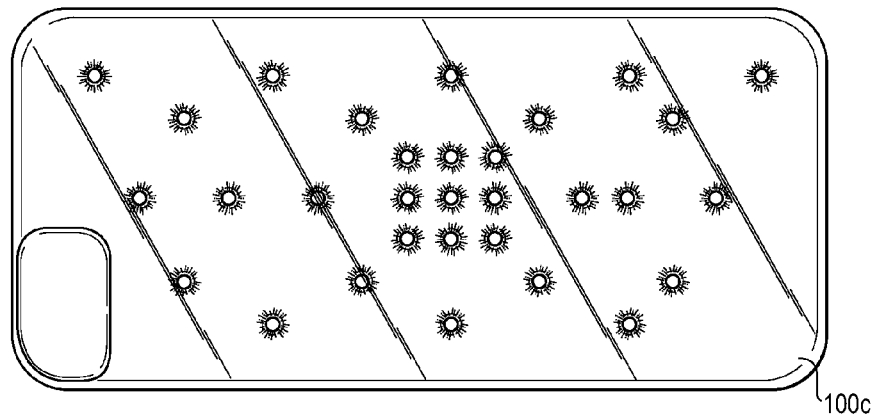
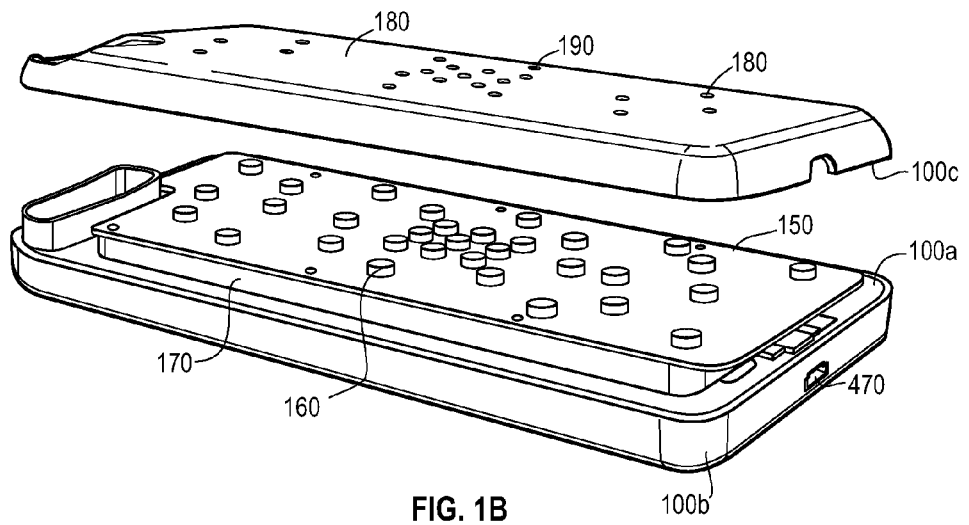
FIG. 1B

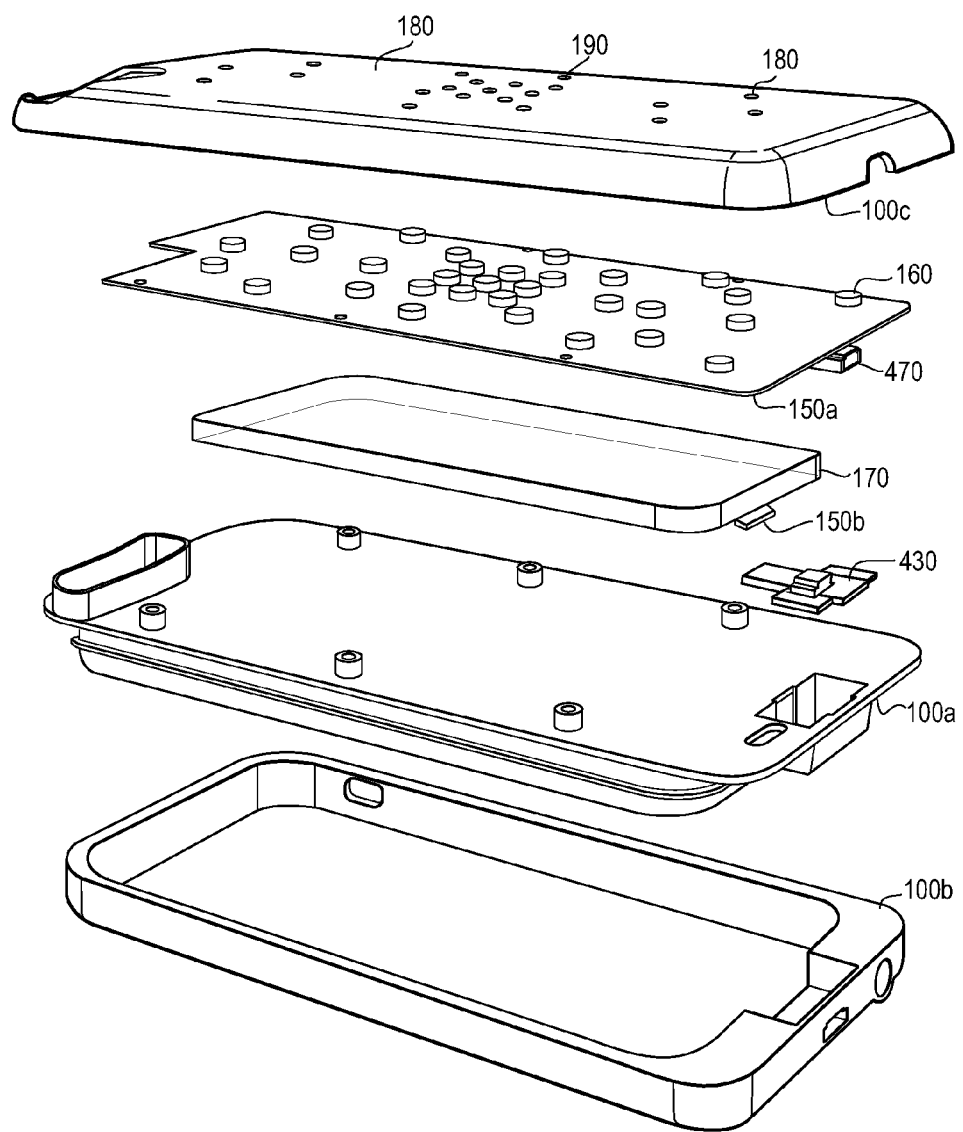

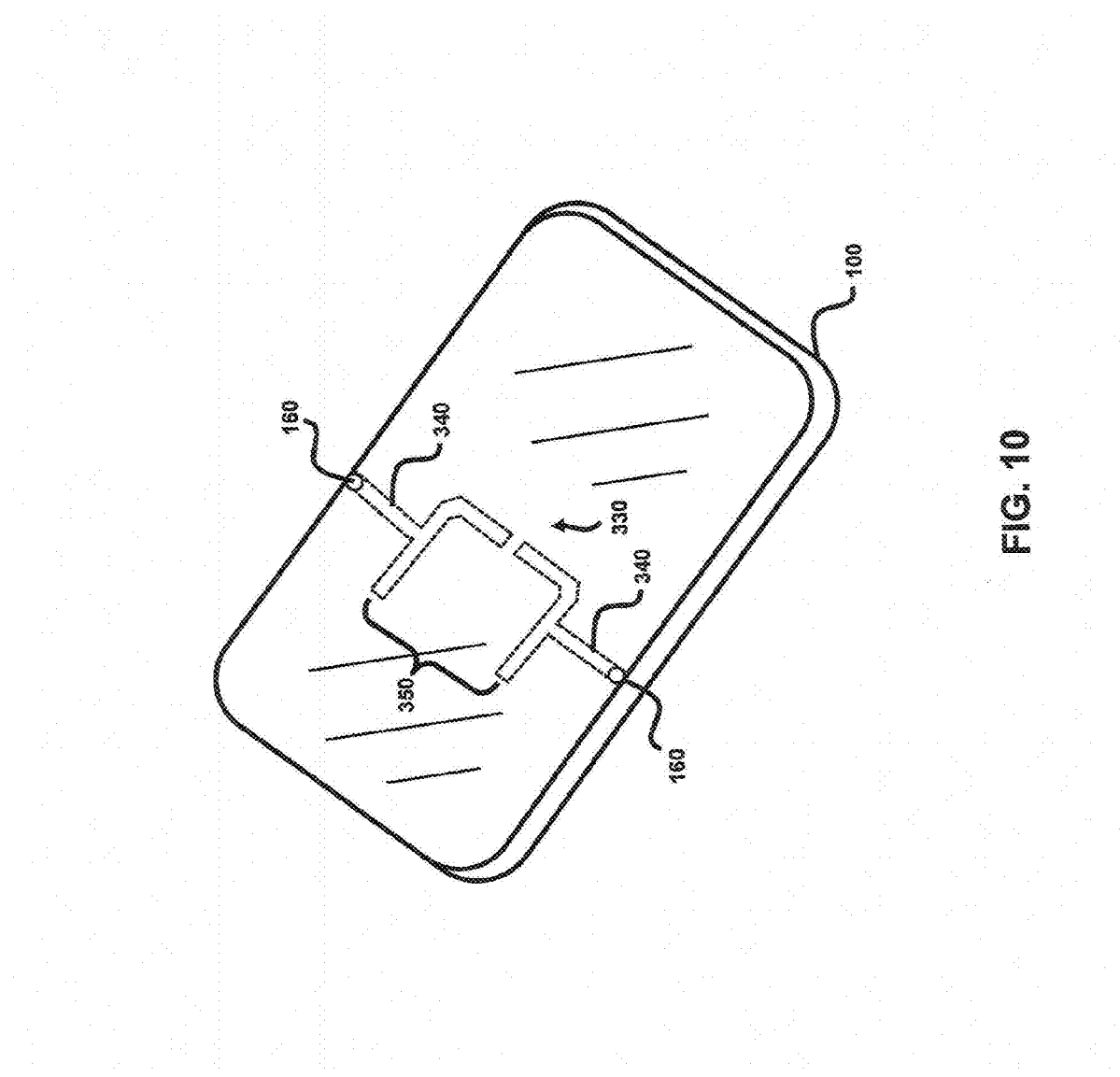

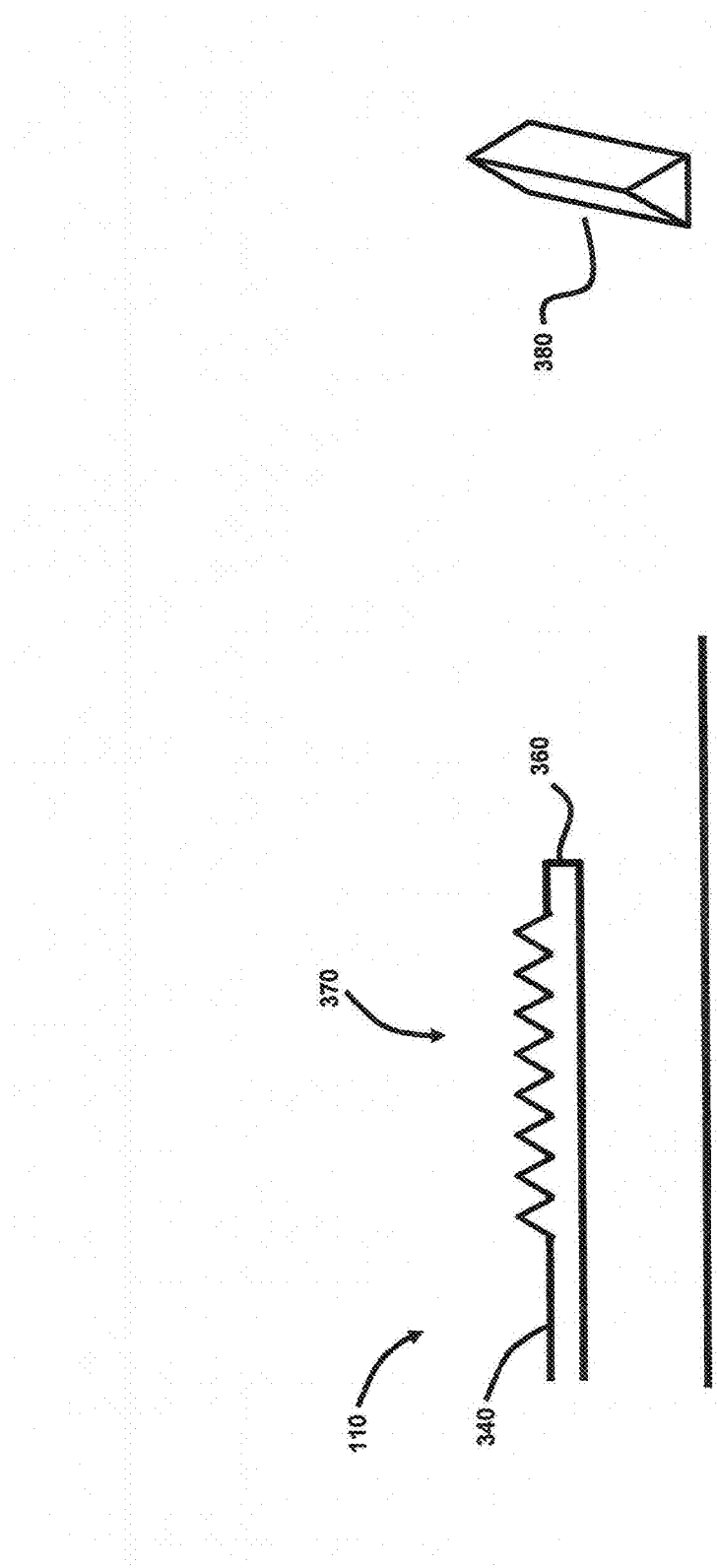

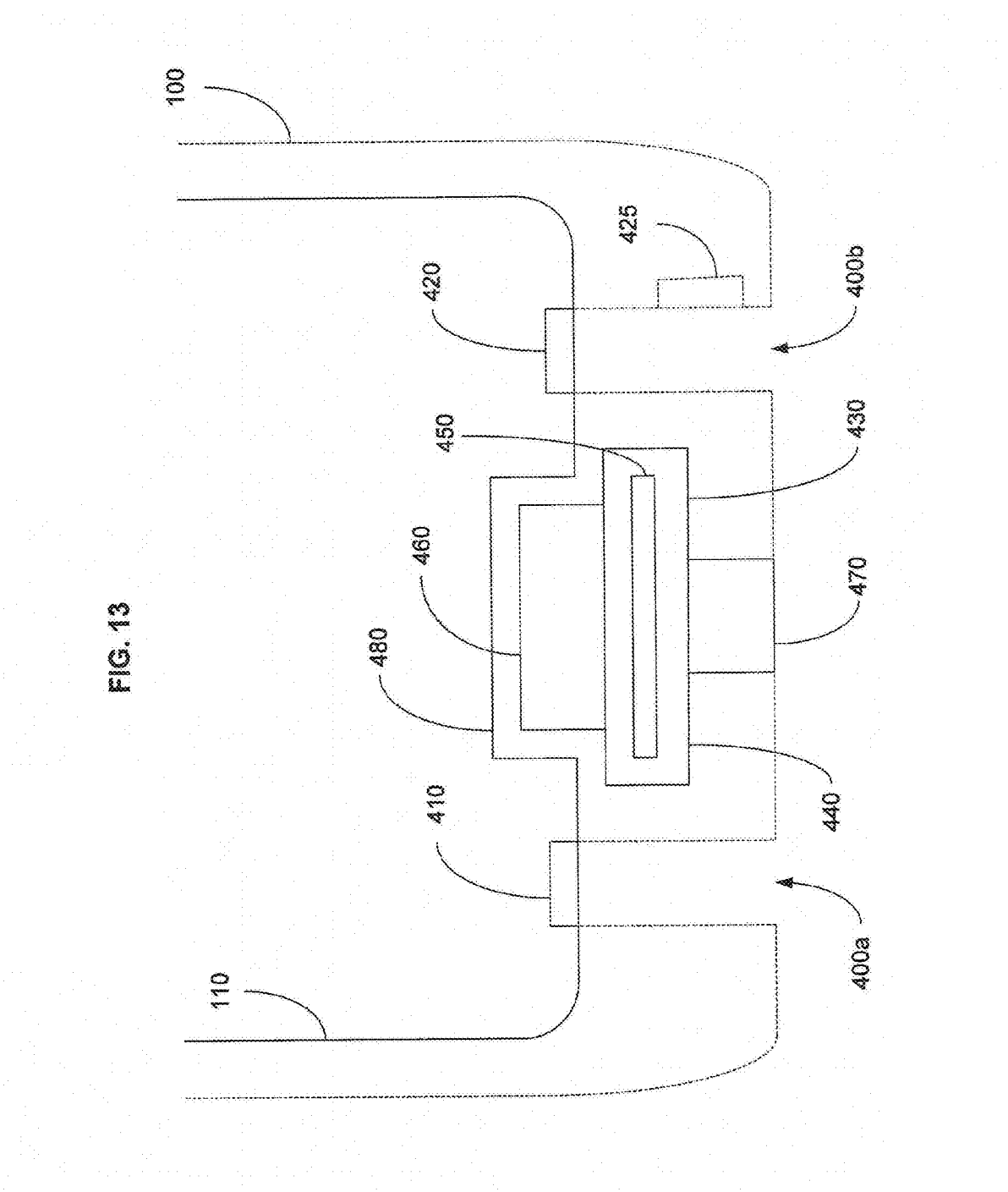

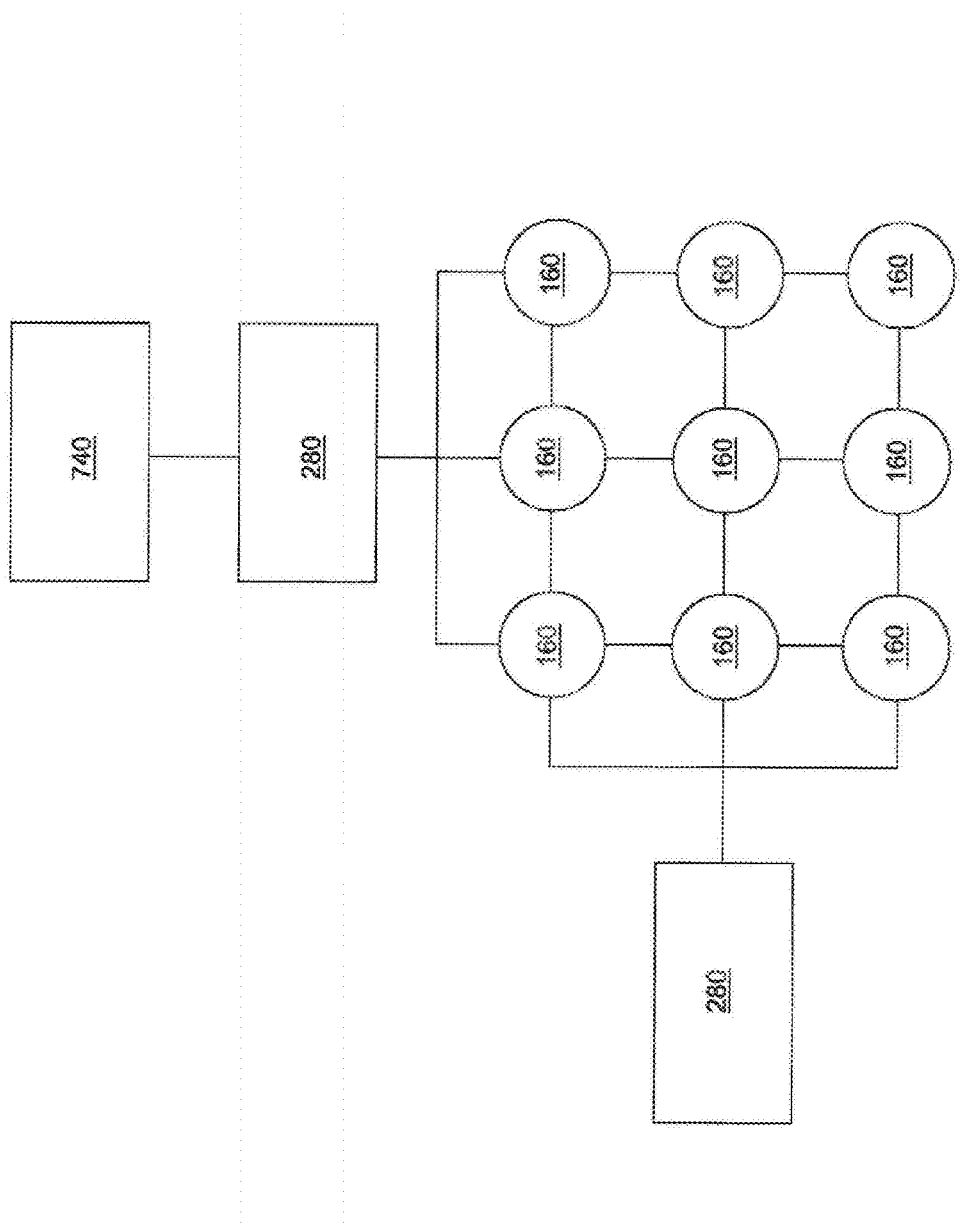

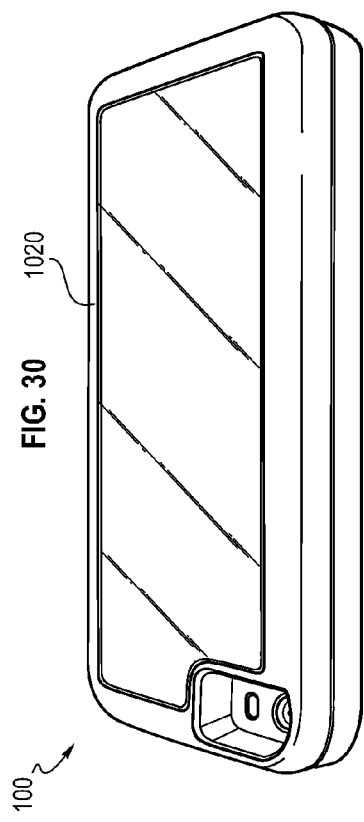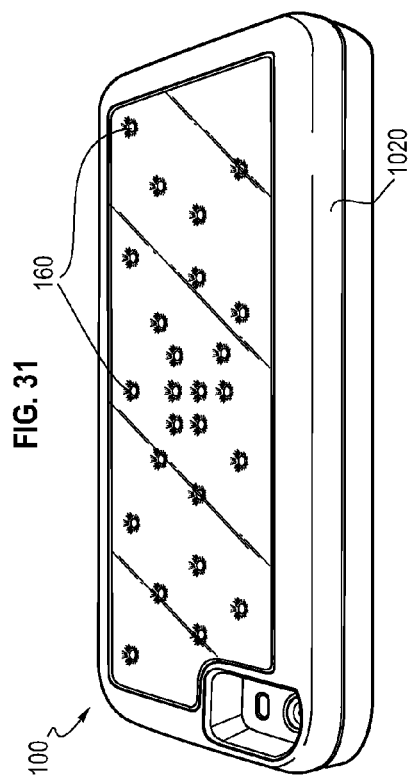

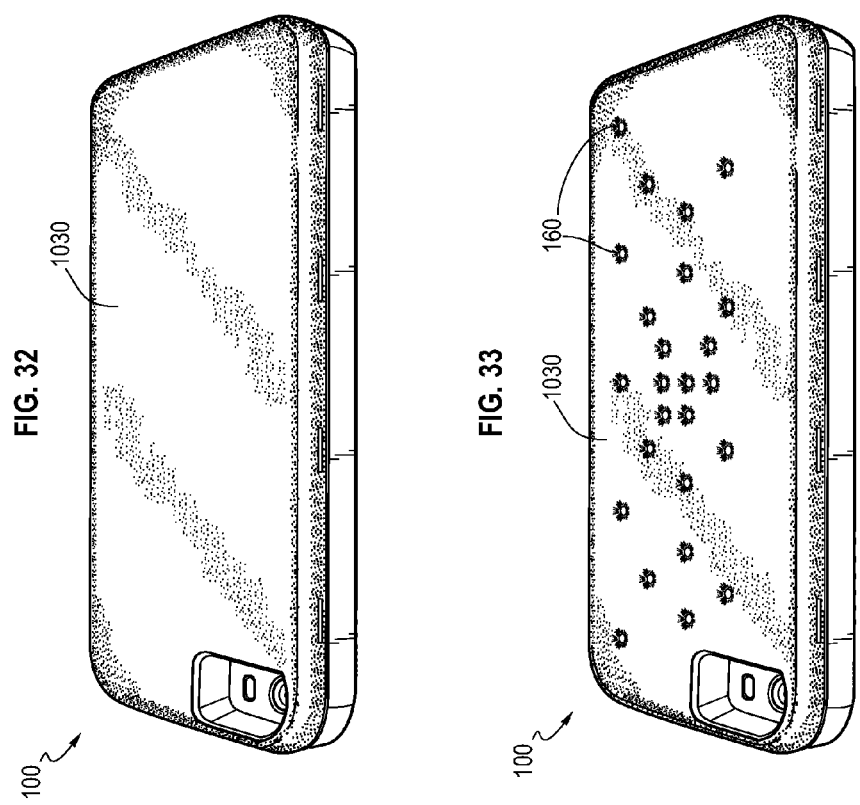

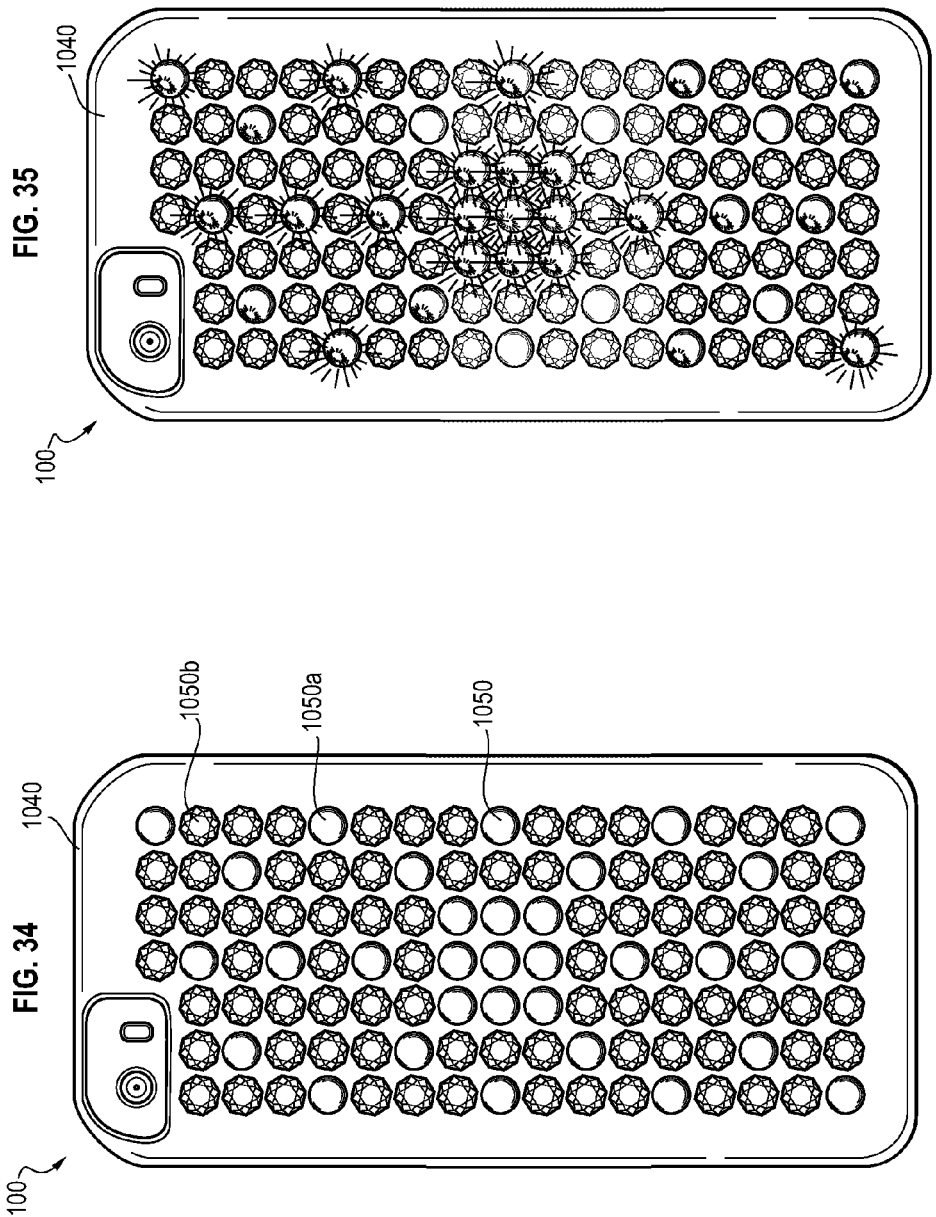

ACTIVE COVER FOR ELECTRONIC DEVICE

CROSS-REFERENCE TO RELATED APPLICATIONS/INCORPORATION BY REFERENCE

The present application is a continuation-in-part of U.S. application Ser. No. 14/077,826, filed Nov. 12, 2013, which is a continuation of U.S. application Ser. No. 13/450,458, filed Apr. 18, 2012, now U.S. Pat. No. 8,583,198. The above-identified applications are hereby incorporated by reference herein in their entirety.

FIELD OF THE DISCLOSURE

Some aspects of some embodiments of the present disclosure may relate to, for example, systems and methods for providing an active cover for an electronic device or equipment.

BACKGROUND OF THE DISCLOSURE

Conventional mobile phone covers are passive accessories to mobile phones. They can have static designs and can offer some measure of protection for the mobile phone.

Further limitations and disadvantages of conventional and traditional approaches will become apparent to one of skill in the art through the comparison of such systems with some aspects of some embodiments according to the present disclosure as set forth in the remainder of the present application with reference to the drawings.

BRIEF SUMMARY OF THE DISCLOSURE

Some aspects of some embodiments according to the present disclosure can relate to, for example, an active cover for an electronic device or equipment. In some embodiments according to the present disclosure, the active cover can be a mobile device cover that can include, for example, a processor and illumination or lighting devices (e.g., illumination devices, lights, light emitting devices, light emitting diodes (LEDs), liquid crystal displays (LCDs), organic light emitting diodes (OLEDs), OLED displays, LED displays, displays, etc.). The lighting devices can be operatively coupled to the processor. The processor can be configured, for example, to receive first signals based on second signals in which the second signals can be generated by a host mobile device. The second signals can be indicative of an incoming call, an incoming message, a pending message, a mobile device alert (e.g., a calendar alert, an upcoming appointment, an urgent reminder, a less-than-urgent reminder, a periodic reminder, etc.), a mobile application notification or information or data, a mobile device accessory notification (e.g., watch, speaker, lights, musical instruments, etc.), information, data, a music or other audio notification, or other notification, for example. The processor can be configured to cause the lighting of one or more of the illumination, display, or lighting devices based on the first signals. In one embodiment, the signal generated by the host mobile device is a digital signal and the processor can be configured to receive the digital signal from the host mobile device.

Some embodiments according to the present disclosure provide an active mobile device cover for use with a host mobile device. The mobile device cover includes, for example, an acoustic sensor, a processor, and illumination, display, or lighting devices. The processor can be operatively coupled to the acoustic sensor and the lighting devices. The acoustic sensor can be configured to receive sound, that can be generated by the host mobile device, for example, and to convert the sound into an analog signal. The processor can be configured to receive the analog signal and to determine whether the analog signal is similar to one of a plurality of digital signatures and values previously stored on the mobile device cover, wherein each of the previously stored digital signatures and stored values is indicative of a particular caller, a particular message sender, a particular alert, a general alert, information, data, etc. In some embodiments, the processor can be configured to compare the analog signal or the digital signal based on the analog signal to the stored digital signatures or values and to find the closest match that is also within acceptable tolerances. In some embodiments, the analog signal can be converted into a digital signal and then the processor can be configured to determine whether the digital signal is similar to one of the stored digital signatures and values. Based on the analog signal determination, the processor can be configured to cause lighting of the one or more illumination, display, or lighting devices corresponding to the indicated caller, indicated message sender, indicated alert, etc.

Some embodiments according to the present disclosure provide one or more circuits for use in an active mobile device cover for use with a host mobile device. The one or more circuits can include, for example, a microphone, a processor, and illumination, display, or lighting devices. The processor can be operatively coupled to the microphone and the illumination, display, or lighting devices. The microphone can be disposed near a speaker of the mobile cellular communication device and can be configured to receive the audio signal and to turn it into an analog signal. The processor can be configured to receive the analog signal and to determine whether the analog signal is similar to one of a plurality of digital signatures and values previously stored on the active mobile device cover. In some embodiments, the analog signal can be converted into a digital signal and then the processor can be configured to determine whether the digital signal is similar to one of the stored digital signatures and values. If the analog signal is similar to one of the previously stored digital signatures and values, the processor can be configured to cause the illumination, display, or lighting devices to be lit according to a particular pattern or sequence associated with the similar one of the previously stored digital signatures and stored values.

Some embodiments according to the present disclosure provide one or more circuits for use in an active mobile device cover for use with a host mobile device. The one or more circuits can include, for example, a microphone, a processor, and illumination, display, or lighting devices. The processor can be operatively coupled to the microphone and the illumination, display, or lighting devices. The microphone can be disposed near a speaker of the mobile cellular communication device and can be configured to receive the audio signal and to turn it into a digital signal. In some embodiments, the microphone can include an analog-to-digital converter. The processor can be configured to receive the digital signal and to determine whether the digital signal is similar to one of a plurality of digital signatures and values previously stored on the active mobile device cover. In some embodiments, the analog signal can be converted into a digital signal by the processor. In other embodiments, the analog signal can be converted by an analog-to-digital converter that is operatively coupled between the microphone and the processor. If the digital signal is similar to one of the previously stored digital signatures and values, the processor can be configured to cause the illumination, display, or lighting devices to be lit according to a particular pattern or sequence associated with the similar one of the previously stored digital signatures and stored values.

Some embodiments according to the present disclosure provide a method that provides an active mobile device cover for use with a host mobile device. The method can include, for example, one or more of the following: receiving, by a connector of the mobile device cover, a digital signal generated by the host mobile device; evaluating, by the processor of the mobile device cover, the digital signal compared to one or more of a plurality of digital signatures and values previously stored on the mobile device cover; and causing, by the processor of the mobile device cover, one or more of the illumination, display, or lighting devices of the mobile device cover to be lit according to a particular pattern or sequence associated with the similar one of the previously stored digital signatures and stored values.

These and other advantages, aspects, and novel features of the present disclosure, as well as details of an illustrated embodiment thereof, will be more fully understood from the following description and drawings.

BRIEF DESCRIPTION OF THE SEVERAL VIEWS OF THE DRAWINGS

FIG. 1A illustrates an embodiment of a mobile device cover according to some aspects of the present disclosure.

FIG. 1B illustrates a top view and a partially exploded side perspective view of an embodiment of the mobile device cover according to some aspects of the present disclosure.

FIG. 1C illustrates an exploded side perspective view of an embodiment of the mobile device cover according to some aspects of the present disclosure.

FIG. 10 illustrates a mobile device cover in accordance with an embodiment of the present disclosure.

FIG. 11 illustrates a waveguide configuration in accordance with an embodiment of the present disclosure.

FIG. 12 illustrates a microprism or prism as part of a diffuser in accordance with an embodiment of the present disclosure.

FIG. 13 illustrates an embodiment of a mobile device cover according to the present disclosure.

FIG. 26 illustrates an embodiment of some of the driver circuitry in a mobile device cover according to the present disclosure.

FIG. 30 illustrates an embodiment of a mobile device cover with a host mobile device in accordance with an embodiment of the present disclosure.

FIG. 31 illustrates an embodiment of a mobile device cover with a host mobile device in accordance with an embodiment of the present disclosure.

FIG. 32 illustrates an embodiment of a mobile device cover with a host mobile device in accordance with an embodiment of the present disclosure.

FIG. 33 illustrates an embodiment of a mobile device cover with a host mobile device in accordance with an embodiment of the present disclosure.

FIG. 34 illustrates an embodiment of a mobile device cover with a host mobile device in accordance with an embodiment of the present disclosure.

FIG. 35 illustrates an embodiment of a mobile device cover with a host mobile device in accordance with an embodiment of the present disclosure.

DETAILED DESCRIPTION

Figure 1D:
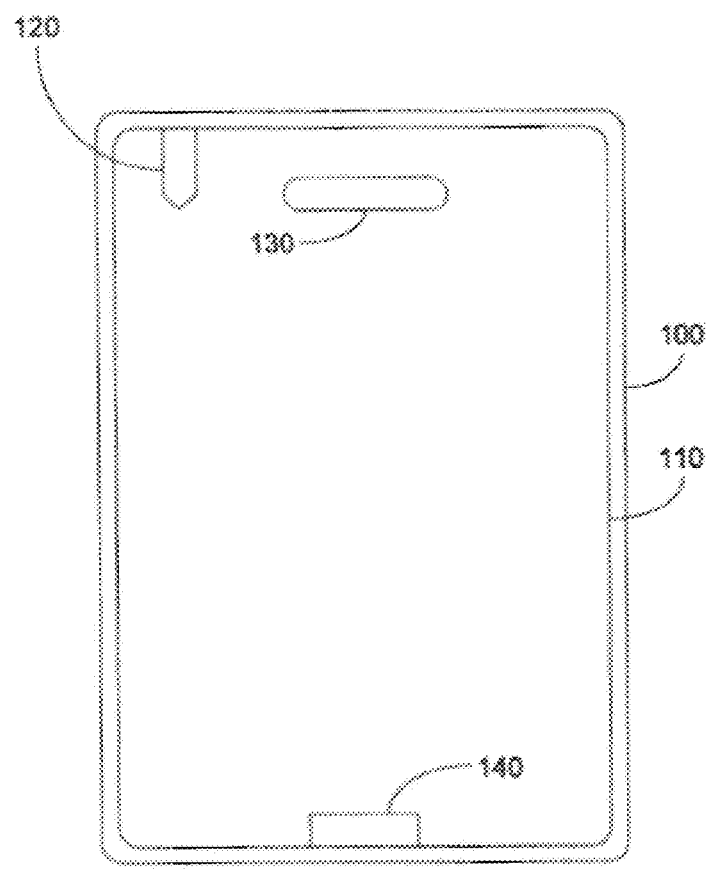
FIG. 1D illustrates a mobile device cover in accordance with an embodiment of the present disclosure.

Some aspects of some embodiments according to the present disclosure may relate, for example, to systems and methods that provide an active cover for an electronic device or equipment.

Some embodiments according to the present disclosure provide that the active cover can sense when the electronic device is generating an alert or receiving a message, notification, or an indication, and can provide an enhanced alert or indication instead of or in addition to the generated alert or indication of the electronic device.

Some embodiments according to the present disclosure contemplate that the active cover includes a mobile device cover for use with, for example, a host mobile device (e.g., a cellular handset, a cellular device, a wireless phone, a wireless device, a wireless handset, a multimode phone, a mobile phone compliant with multiple wireless communication standards, a mobile phone equipped with global positioning, a multiple-input-multiple-output phone, a wireless communication device, a two-way radio, communication devices with one or more antennas, etc.). The device and methods disclosed can also be used with, for example, tablets, tablet computers, laptops, computers, and other devices as well. The device can be used with stationary devices such as desktop computers and stationary monitors as well.

Some embodiments according to the present disclosure contemplate that, during a mobile device alert or event, an active mobile device cover can provide its own alert or indication according to the sound or alert data generated by the host mobile device. The device may also illuminate in a distinct or random pattern such as, for example, any arrangement, sequence, etc. utilizing illuminating, display, or lighting devices (ILD) in different colors, brightness, intensities, etc. that may form shapes, images, text, alphanumeric text, video, animation, text, messages, notifications, etc. and can be either static or moving, for example. In some embodiments, the distinct or random pattern can be illuminate according to the sound or alert data generated by the host mobile device, or according to a digital signal received by the active mobile device cover, for example. In some embodiments, a distinct pattern can be assigned to associated sounds or alerts. For example, a distinct pattern can be assigned to a particular ring tone of the host mobile device. A random pattern can be assigned to associated sounds or alerts. For example, a random pattern can be assigned to a particular ring tone of the host mobile device. The random pattern can also be assigned to unassigned numbers. The active mobile device cover can, for example, enhance the look and feel of the outside of the host mobile device, provide the user with superior sensory input over the host mobile device alone, or protect the host mobile device from drops, scratches, etc.

Some embodiments according to the present disclosure provide a mobile device cover with, for example, light emitting diodes (LEDs), illuminating or lighting devices (ILDs) which can include different types of displays, or other light sources or displays that are positioned at or near the edges or sides of a host mobile device. The mobile device cover can use waveguides, for example, to bring light from the LEDs to illuminate a distinct pattern. The distinct pattern can be facilitated by, for example, diffusers and prisms (e.g., microprisms) that are optically coupled to the LEDs, for example, via the waveguides. The diffusers and prisms can enhance and influence the light generated by the LEDs. In some embodiments, the mobile device cover does not use diffusers or waveguides to facilitate the LED illuminations on the mobile device cover.

Some embodiments according to the present disclosure provide a mobile device cover with, for example, LEDs, ILDs, or displays, etc. that are disposed in one or more bumper bands (e.g., a series of bumper bands) that are disposed, for example, around or substantially around or partially around the host mobile device. The LEDs, ILDs, etc. can facilitate, for example, edge lighting around one or more of the edges of a host mobile device.

Some embodiments according to the present disclosure provide, for example, suitable logic, circuitry, code, or combinations thereof that may be adapted to perform the functions or acts described herein.

FIG. 1A shows an embodiment of a mobile device cover 100 according to some aspects of the present disclosure. A mobile device cover 100 (e.g., a cover, a case, a shell, a protector, etc.) surrounds a host mobile device 110. In some embodiments according to the present disclosure, the host mobile device 110 (not shown) may be slipped inside or inserted into the mobile device cover 100 or the mobile device cover 100 can be snapped on or stretched around or otherwise can be fit around the host mobile device 110. In some embodiments, the mobile device cover 100 can be an accessory to the host mobile device 110. In some embodiments, the mobile device cover 100 can be an accessory separate from the host mobile device 110. In some embodiments, the mobile device cover 100 and the host mobile device 110 can be controlled via inputs (e.g., buttons, touch screens, capacitive touch, sliders, etc.) located on the mobile device cover 100, the host mobile device 110, a mobile application on the host mobile device 110, a mobile application on the mobile device case 100, a wired signal sent to the host mobile device 110, a wired signal sent to the mobile device cover 100, a wireless signal sent to the host mobile device 110, a wireless signal, such as Bluetooth signals, IEEE 802.11 signals, wireless local area network (WLAN) signals, etc., sent to the mobile device cover 100, etc.

Referring to FIG. 1A, the back cover 1030 of the mobile device cover 100 has illumination, display, or lighting devices (ILDs) 160. The ILDs 160 can form or can illuminate a screen (e.g., a main screen or display) and can emit different colors with different intensities. The ILDs 160 can also form or can illuminate another screen along a bumper band 320 of the mobile device cover 100. Further, the ILDs 160 can illuminate beads 180 with different colors. The beads 180 can be colored or not, and can be at least partially transparent, for example. In some instances, the beads 180 can take the configuration of letters and numbers.

In some embodiments, when the host mobile device 110 and the mobile device cover 100 are operatively coupled, the mobile device cover 100 can provide indicators and data from the host mobile device 110 to the user. In some embodiments, when the host mobile device 110 and the mobile device cover 100 are operatively coupled, the mobile device cover 100 and the host mobile device 110 are in one- or two-way digital or analog data communication. This allows the device cover to display information, data, and content received from the host mobile device 110. The information, data, or content can be received from the host mobile device 110 or from a third party, such as a mobile application.

Referring to FIG. 1A, when the host mobile device 110 is receiving an incoming call, for example, the beads 180c that form the word "CALL" on the back cover 1030 of the mobile device cover 100 can be illuminated, caused to flicker, flash, etc. If a calendar event notification is activated or received by the host mobile device 110, for example, the beads 180c that form the word "ALERT" can be illuminated, caused to flicker, flash, etc. If a text message is received by the host mobile device 110, for example, the beads 180c that form the word "TEXT" can be illuminated, caused to flicker, flash, etc. The beads 180c can also be illuminated different colors and with different intensities to indicate different degrees of urgency. For example, if the alert is urgent, the beads 180c that form the word "ALERT" can flash red and with increased intensity to indicate urgency. In another example, if the incoming call or text message is not from an important person, which can be designated via programming, user settings, user configurations, etc., the corresponding beads 180c can be illuminated a dim blue. In some embodiments, the mobile phone cover 100 can determine the identity of the caller or the message sender via electrical, sound, acoustic signals, etc. received from the host mobile device 110. Further, the user may be notified as to the name, number, email address, etc. of the sender or source of the alert, text, email, or other notification.

In some embodiments, the mobile device cover 100 can be configured to provide video (e.g., live streaming video, stored video, etc.) on one or more screens. The video can be provided via the host mobile device 110, for example, or some other source to which the mobile device cover 100 is operatively coupled. The video can be, for example, stored on the host mobile device 110 or can be streamed via a wireless link (e.g., cellular link, WIFI link, IEEE 802.11 link, wireless local area network (WLAN) link, Bluetooth link, radio frequency link, etc.) with a content provider or a third party application. In some embodiments, closed captioning or subtitles can scroll along one or more edges of the bumper band 320 screen. In some embodiments, the mobile device cover 100 can be configured to provide an alert of a received video message and to play the video message on the screen of the mobile device cover 100. The screen of the mobile device cover 100 can be substantially independent or can substantially mirror the screen of the host mobile device 110. Further, the screen of the mobile device cover 100 can be touch sensitive to enhance the user interface. Thus, for example, a user input via the touch sensitive screen of the mobile device cover 100 can provide an alternate user input to the host mobile device 110, especially when the screen of the mobile device cover 100 is mirroring the screen of the host mobile device 110. Content or material can also be displayed that is from an application on the host mobile device. For example, if the user has access to a sport application that shows sports videos or live events, the video may be displayed on the mobile device cover.

In addition to multimedia data, some embodiments provide that alphanumeric data can be received by the host mobile device 110, forwarded from the host mobile device 110 to the mobile device cover 100, and displayed on the mobile device cover 100. For example, the bumper band 320 screen (or any other ILD 160 screen on the mobile device cover 100) can be configured to scroll information relating to news, sports, live or recorded events or movies, stocks, weather, calendar events, text messages, alerts, and email. In some embodiments, the host mobile device 110 can be set to periodically receive or retrieve sports data (e.g., scores) or other types of data; the host mobile device 110 can send the sports data to the mobile device cover 100; and the mobile device cover 100 can display or scroll the data across the bumper band 320 screen of the mobile device cover 100. In some embodiments, the bumper band 320 screen can be touch sensitive, thereby allowing the user to tap an email notification and read a scrolling email on the bumper band 320 screen or on another display (e.g., the display on the back cover 1030) of the mobile device cover 100. In some embodiments, the data can flow across the bumper band 320 screen according to a finger sweeping motion along the bumper band 320 touch sensitive screen. In one embodiment, an incoming text message can be indicated by the beads 180c forming the word "TEXT" being illuminated by ILDs 160, the sender of the incoming text can be displayed on the bumper band 320 screen on the edge of the mobile device cover 100, and the text of the text message can be displayed on the main screen on the back cover 1030 of the mobile device cover 100. In one embodiment, alphanumeric letters are displayed on the screen on the back cover 1030 and the screen of the bumper band 320, either simultaneously or independently, indicating that a text message has been received and possibly displaying the sender's name, the sender's associated icon, the sender's associated image (e.g., sender's picture), etc.

The bumper band 320 screen can be configured to scroll all the way around the mobile device cover 100. In some embodiments, the bumper band 320 can be segmented so that the top edge portion is reserved for a first subject (e.g., stocks), the left edge portion is reserved for a second subject (e.g., sports), the bottom edge portion is reserved for a third subject (e.g., email), and the right edge portion is reserved for a fourth subject (e.g., calendar items, alerts, etc.), for example. In each segment, the screen can scroll the data on one respective edge of the mobile device cover 100. In some embodiments, the user can program which subject is displayed on each individual segments on the mobile device cover 100. In some embodiments, the user can program the mobile device cover 100 so that it decides on which segment to display a particular subject (e.g., incoming call, incoming text, mobile device notification, mobile device accessory notifications, music or other audio notifications, etc.)

FIG. 1B shows a top view and a partially exploded side perspective view of an embodiment of the mobile device cover 100 according to some aspects of the present disclosure. FIG. 1C shows an exploded side perspective view of an embodiment of the mobile device cover 100 according to some aspects of the present disclosure.

Referring to FIGS. 1B and 1C, the mobile device cover 100 can be adapted, for example, to provide physical vias (e.g., access openings and windows) through which various input interfaces and output interfaces of the host mobile device 110 can be accessed without detaching the mobile device cover 100 from the host mobile device 110. In some embodiments, the mobile device cover 100 may provide a physical opening to access a display, a camera, a button, a control, other output interfaces, other input interfaces, etc. of the host mobile device 110. In some embodiments, the mobile device cover 100 may provide a transparent cover portion, for example, over a display or other portions of the host mobile device 110. The transparent cover portion can be made of materials that, for example, do not interfere with the operation of any of the touch screens, speakers, or buttons of the host mobile device 110. In some embodiments, the materials can be substantially transparent to wireless communication links used by the host mobile device 110. The transparent cover portion may also protect areas of the host mobile device 110 such as touch screens from scratches or other damage.

Some embodiments according to the present disclosure may provide that the mobile device cover 100 is made of one or more of the following materials: silicone, rubber, metal, plastic, polymers, composites, cloth, metal, wood, acrylic, glass, plexiglass, or other materials. The cover material may be, at least in part, opaque or transparent. The cover material may assist a user in gripping the host mobile device 110 and may protect the host mobile device 110, for example. The cover material may be, for example, shock resistant, shock proof, shatter proof, shatter resistant, dust resistant, dust proof, water resistant, water proof, etc. In some embodiments, the mobile device cover 100 may be made up of multiple pieces (e.g., portions 100a, 100b, and 100c), as shown in FIGS. 1B and 1C. In some embodiments, the multiple pieces of the mobile device cover 100 interlock together to house the host mobile device 110.

Some embodiments according to the present disclosure may provide that the host mobile device 110 include, for example, an audio port 120 (e.g., an audio port, a visual port, an earphone port, a headphone port, etc.), a speaker 130, and a docking port 140 (e.g., a data port, a recharging port, etc.) as illustrated in FIG. 1D. Other components and ports of the host mobile device 110 might not be illustrated in the present application, but one of ordinary skill in the art would appreciate the various components and ports that are or can be part of a conventional mobile device.

Referring to FIGS. 1B and 1C, the mobile device cover 100 can include, for example, circuitry 150 and ILDs 160. In some embodiments, the circuitry 150 can include one or more of the following: one or more processors, one or more nontransitory memories, signal processors, ILD control circuitry, battery recharging circuitry, display control circuitry, sensors, input interface circuitry, output interface circuitry, and analog-to-digital converters. The one or more nontransitory memories can be configured to store, for example, data (e.g., input data, data received from the host mobile device 110, stored reference data, stored configuration data, stored personal data, etc.) and processor-executable instructions or code for use with the one or more processors. The circuitry 150 can be connected, for example, to the ILDs 160. Some embodiments provide that the ILDs can include any combination of flexible active-matrix organic LEDs (AMOLEDs), organic LEDs (OLEDs), phosphor-based LEDs, white LEDs (WLEDs), multi-color WLEDs, semiconductor LEDs, other types of LEDs, LCDs, LCD touch screens, electroluminescence, pixel displays, etc. and can be arranged or used in a specific pattern, array, sequence, etc.

The mobile device cover 100 can also include, for example, a battery 170 (e.g., a rechargeable battery, a watch battery, etc.) that can be used to power, for example, the circuitry 150, the ILDs 160, and any other circuitry or components in the mobile device cover 100. The battery 170 can also be used to power the mobile device 110 or to recharge a battery in the mobile device 110. Some embodiments according to the present disclosure provide that the battery 170 can be rechargeable or not rechargeable. If not rechargeable, the battery 170 can be replaced. Some embodiments of the battery 170 include, for example, a lithium battery, an alkaline battery, a silver-oxide battery, nickel cadmium battery, nickel metal hydride battery, lithium ion battery, lithium ion polymer battery, etc. If rechargeable, then the battery 170 can be recharged, for example, by drawing energy from the host mobile device 110 through the audio port 120, the docking port 140, or some other connection to the host mobile device 110. The battery 170 of the mobile device cover 100 can be charged by a piezoelectric battery charger, for example. In some embodiments, the piezoelectric battery charger can convert force (e.g., caused by pressure, movements, mechanical forces, etc.) into electrical energy for use by the battery 170. Some embodiments contemplate converting other types of energy (e.g., sound, light, electromagnetic, magnetic, thermal, moving air, etc.) into electrical energy to charge the battery 170. The battery 170 of the mobile device cover 100 can also be recharged when the host mobile device 110 is connected to a wall outlet, for example, such as when the docking port 140 is connected to a wall outlet. The battery 170 may receive energy directly from the wall outlet (e.g., via connecting the mobile device cover 100 directly to the wall outlet) or through the host mobile device 110. In addition, the battery 170 may receive energy when the docking port 140 is connected to a computer, for example, and may receive power when the host mobile device 110 or mobile device cover 110 is being synchronized. Some embodiments according to the present disclosure contemplate that the circuitry 150 receives power from the host mobile device 110 without using the battery 170. Thus, some embodiments according to the present disclosure might not have a dedicated battery as part of the mobile device cover 100, or might use the battery 170 as a back-up power source. In some embodiments, the mobile device cover 100 can utilize charging methods such as conductive and inductive charging.

In some embodiments, the circuitry 150 may be, for example, embedded in the mobile device cover 100. In some embodiments, the circuitry 150 may include, for example, one or more circuit boards 150a including, for example, one or more of the following: circuit elements or components, an integrated circuit, an integrated circuit chip, a system on a chip, etc. The circuitry 150 may also include, for example, one or more sensors 150b (e.g., an audio sensor, a signal sensor, an optical sensor, a wireless signal sensor, a wireless receiver, a wireless transceiver, an electrical sensor, an electromagnetic sensor, a vibration sensor, etc.). Components 150a and 150b can be part of the same circuit board or can be part of separate circuit boards, for example. A sensor can be part of components 150a, 150b, or both. In some embodiments, the circuit boards may have multiple layers.

Figure 1E:
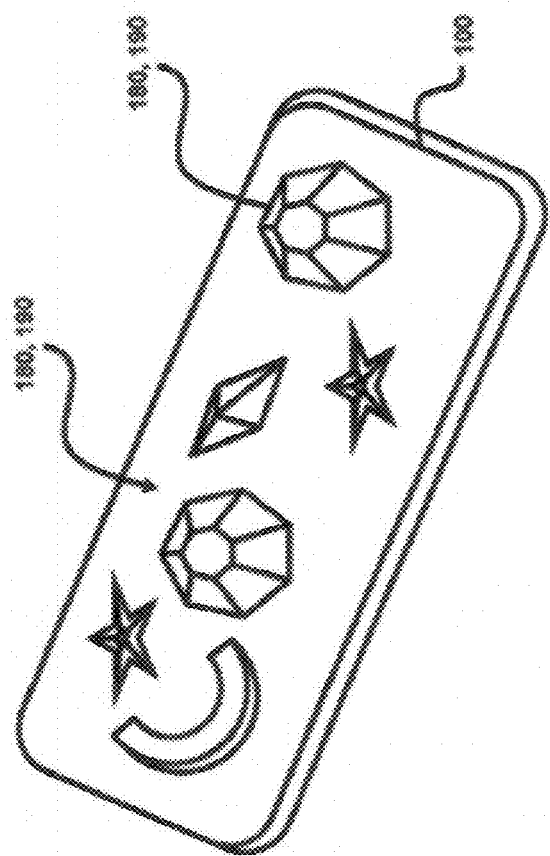
FIG. 1E illustrates a mobile device cover in accordance with an embodiment of the present disclosure.

Some embodiments according to the present disclosure provide that at least some of the ILDs 160 are covered by at least partially transparent beads 180 (e.g., covers for the ILDs). Some embodiments according to the present disclosure provide that the beads 180 extend outwardly, inwardly, or both from a surface of the mobile device cover 100 to provide texture (e.g., a three dimensional texture) and design to the mobile device cover 100. The beads 180 can be adapted to be or look like, for example, one or more of the following: logos (e.g., school logos, business logos, sports logos, etc.), mascots, artistic shapes, and whimsical shapes. FIG. 1E illustrates an embodiment of the mobile device cover 100 with different types of beads and shapes. The mobile device cover 100 can include, for example, other beads 190 that may or may not be similar to the beads 180, and that do not cover ILDs 160. The beads 180 and the beads 190 may be disposed on the front side, the back side, the inside, the outside, or any side of the mobile device cover 100 and may receive illumination (e.g., scatter illumination) from other beads (e.g., adjacent beads 180 and 190). Adjacent bead lighting may be enhanced by, for example, maintaining a space from the back of the host mobile device 110 to the interior side of the mobile device cover 100. This may allow stray light, for example, to shine from one bead to another.

Some embodiments according to the present disclosure may provide that the beads 180 and 190 may be made of or made to resemble, for example, one or more of the following: glass, rhinestones, stones, mineral, crystals, diamonds, one-way mirrors, logos (e.g., school logos, business logos, sports logos, etc.), mascots, artistic shapes, whimsical shapes, and may be made from crystal, glass, silicone, rubber, metals, plastic, polymers, composites, cloth, and other materials. The beads 180 and 190 may assist a user in gripping the host mobile device 110 and may protect the host mobile device 110, for example. The beads 180 and 190 may be of one or more materials that provide, for example, shock resistance, shatter protection, etc. In addition, the beads 180 and 190 may be adapted to enhance the look or design of the mobile device cover 100, particular when the ILDs 160 are activated.

Figure 2:
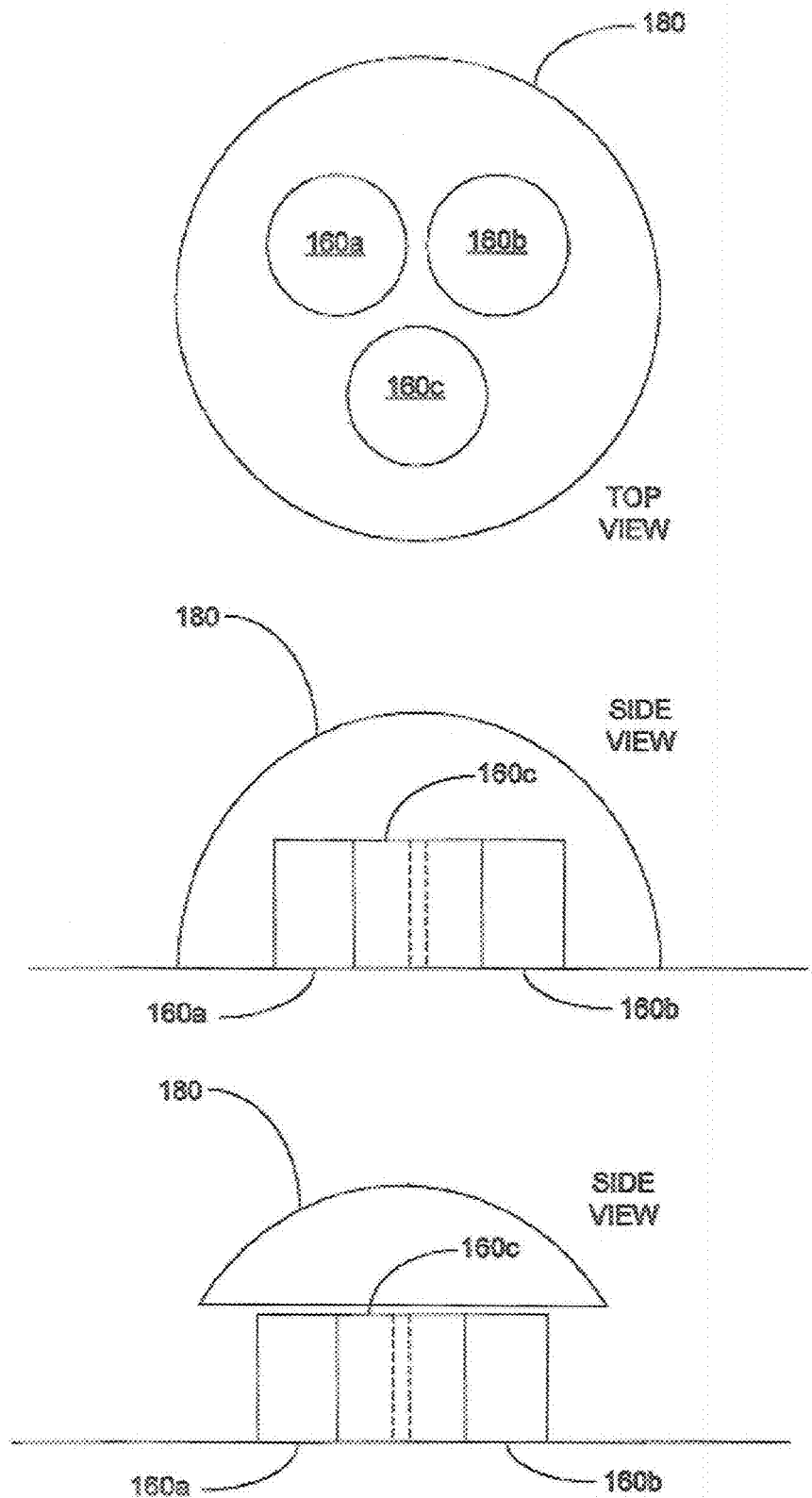
FIG. 2 illustrates three views of an illumination or lighting device (ILD) arrangement in multiple views in accordance with an embodiment of the present disclosure.

Some embodiments according to the present disclosure provide that the beads 180 and 190 can be colored or uncolored. Some embodiments according to the present disclosure provide that the ILDs 160 provide one or more colors. For example, FIG. 2 illustrates a colored or uncolored bead 180 covering a red ILD 160a, a green ILD 160b, and a blue ILD 160c. Circuitry 150 or other circuitry may be used to drive the red ILD 160a, the green ILD 160b, and the blue ILD 160c to generate any color with any intensity. Some embodiments provide that the beads 180 provide one or more colors when light from one or more ILDs are shown through the one or more colored beads 180, or the one or more colored beads 190 receives light scattered by beads 180 (e.g., adjacent beads).

Figure 18:
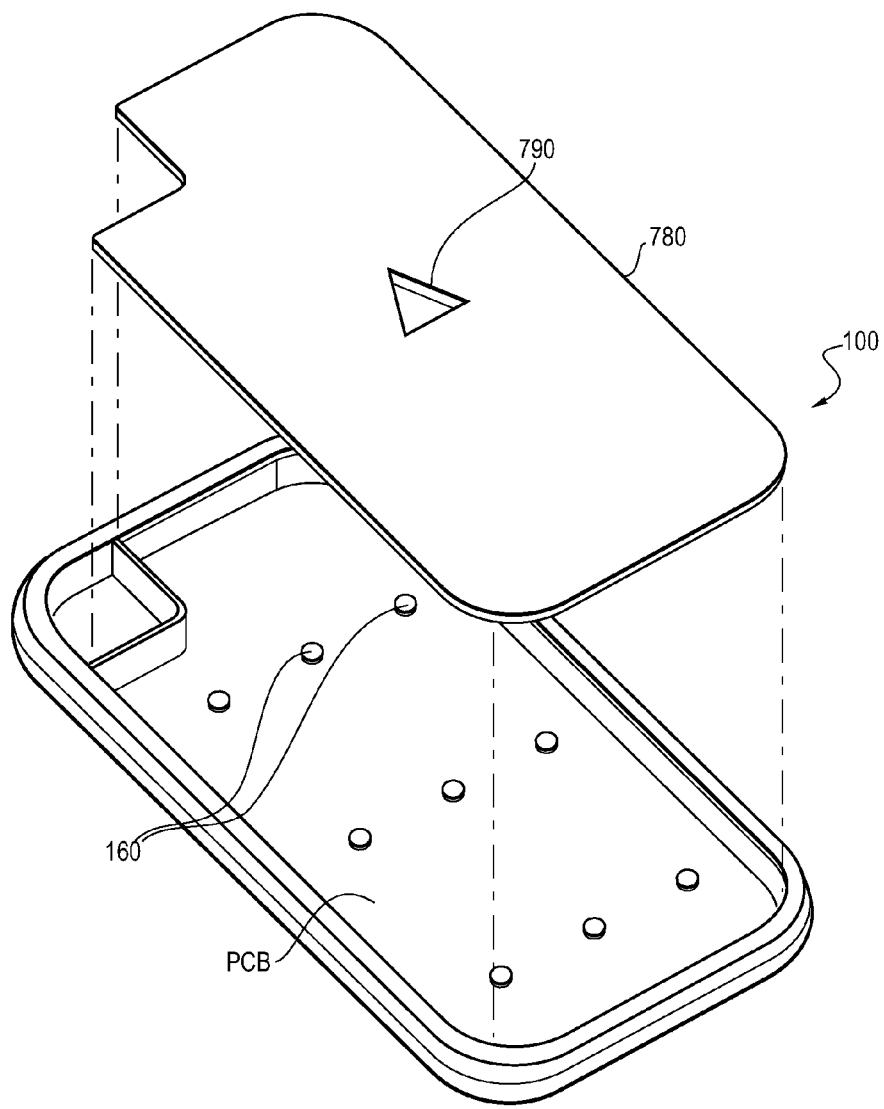
FIG. 18 illustrates a mobile device cover in accordance with an embodiment of the present disclosure.

FIG. 18 illustrates an embodiment of a mobile device cover 100 according to the present disclosure. The mobile device cover 100 includes a reflective or semi-transparent surface 780 such as, for example, a two-way acrylic mirror, a partially coated silver plastic, a mirror film, etc. that is illuminated from below by ILDs 160 or optical waveguides, which can be illuminated by ILDs 160 that are mounted on a printed circuit board, for example. In some embodiments according to the present disclosure, one or more ILDs 160 may be underneath or on a side of the surface 780. Although illustrated as nine ILDs 160 arranged symmetrically, some embodiments according to the present disclosure contemplate arranging the same or a different number of ILDs 160 into different patterns, logos, text, or shapes, for example. In some embodiments, the ILDs 160 can be arranged in any order or quantity, in order to display or illuminate specific logos, patterns, text, shapes, etc. to the incoming notification. In some embodiments, the ILDs 160 illuminate crystals that can be of different colors. In addition, some embodiments may provide a layer underneath the surface 780 with one or more shapes cut out 790 (e.g., logo, geometric shape, text, picture, etc.) that allow light to pass through. This layer can be manufactured out of plastic, metal, fiberglass, cloth, polymers, composites, etc. Some embodiments according to the present disclosure provide that an ILD matrix be employed can cover any location of the mobile device cover 100 that is not used by the main display or screen of the host mobile device 110.

Figure 20:
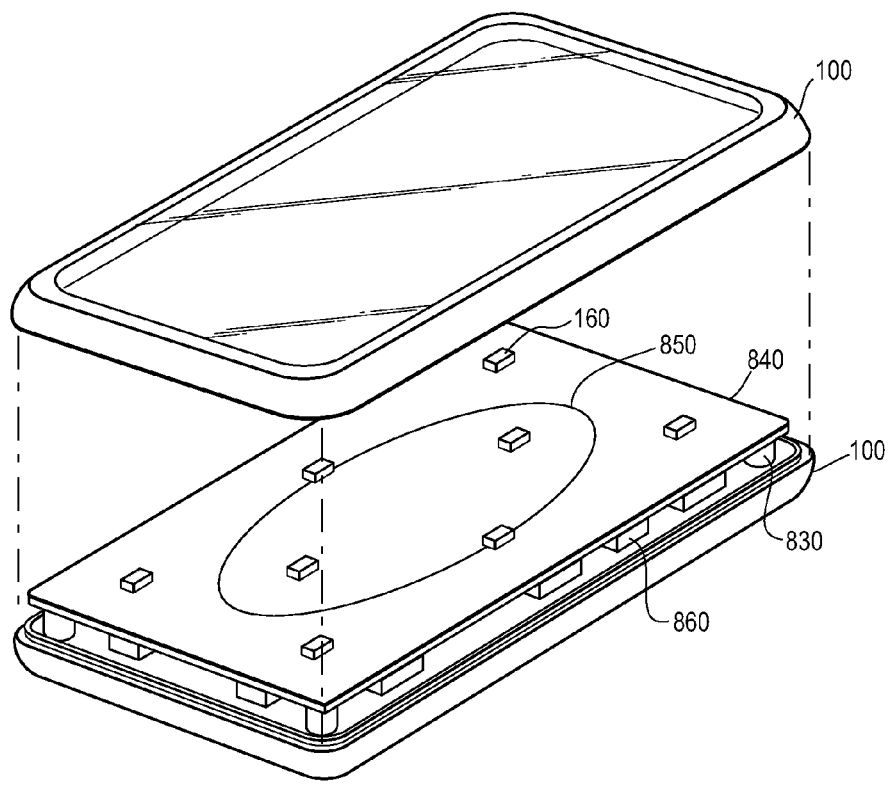
FIG. 20 illustrates an embodiment of a mobile device cover in accordance with an embodiment of the present disclosure.

FIG. 20 illustrates an embodiment of a mobile device cover 100 according to the present disclosure. The mobile device cover 100 can include, for example, supports 830 (e.g., spacers) extending from a back portion of the mobile device cover 100. The supports 830 can be, for example, in the shape of a cylinder or a prism to enable a screw to fasten to it. The supports 830 can include or work with, for example, a snap-lock mechanism or can provide a surface (e.g., a flat top surface) to enable fastening (e.g., gluing). The supports 830 can support a printed circuit board (PCB) 840, for example, and can provide additional space for any other circuitry 860 on the PCB 840. The other circuitry 860 can be, for example, one or more discrete components, integrated circuits, connectors, ILDs 160, and chips. In one embodiment, the circuitry is integrated in whole or in part into a system on a chip (SoC). The PCB 840 can be mounted, for example, to the supports 830 with screws, glue, snap locks, etc. The ILDs 160 can be mounted on a surface (e.g., a top surface) of the PCB 840 with some of the electronic components or circuitry being mounted on another surface (e.g., a bottom surface) of the PCB 840. A logo, picture, text, etc. 850 can be imaged on a top surface of the PCB 840 or on a layer above the PCB 840. The image can be applied using various techniques including etching, kinegram, vinyl sticker, silk screen, paint, etc. on the PCB 840.

In operation, some embodiments according to the present disclosure provide that the circuitry 150 enhances indications of a host mobile device 110 alert or event such as, for example, a low battery indication, a roaming indication, an incoming call, a calendar alert, a caller identification, mobile application alerts, news alert tailored to the user (e.g., game, sports, scores, photos, weather, traffic, soothing shapes or patterns, music, meditation or high energy patterns, exercise tracker, etc.), or an incoming or pending message (e.g., text message, video message, voicemail message, missed call message, etc.) by driving the ILDs 160 to light up in a particular method. For example, when the battery in the host mobile device 110 is getting low, a red bead 180 may become illuminated or may flash on and off at intervals. In some embodiments, the battery can be controlled via inputs located on the mobile device cover 100, a mobile application on the host mobile device 110, or a wireless signal sent to the mobile device cover 100. These controls can include, but are not limited to: enable discharge, disable discharge, enable automatic discharge at user determined host mobile device 110 battery level, enable automatic disable discharge at a user determined host mobile device 110 battery level, etc. In some embodiments, the battery's voltage can be displayed using any of the ILD 160 methods; a user may specify which, to the user via visual display or audio signals. In some embodiments, the battery's voltage ILDs 160 may not be displayed if the ILDs 160 for the battery's voltage are currently displaying a previous notification or start displaying another notification. In some embodiments, the inputs located on the host mobile device 110 may be: a push button, an electro-static button, a capacitive touch button, a touch screen, an audible command, etc. In some embodiments, the alerts can be through the form of text using any number of the ILDs 160 or even audio sounds generated by the mobile device cover 100 or the host mobile device 110.

Some embodiments according to the present disclosure provide that, when the host mobile device 110 receives an incoming call or message, the host mobile device 110 may generate a particular indicator (e.g., a particular ring, a particular audible indicator, a particular visual indicator, etc.). Some embodiments provide that the circuitry 150 can receive or detect a particular audible indicator from the speaker 130 and the audio port 120 (e.g., an earphone or headphone jack) using a sensor in the circuitry 150. Some embodiments provide that the circuitry 150 can receive or detect electrical signals from the audio port 120 and the docking port 140 that are indicative of, for example, an incoming call or incoming or pending message.

The circuitry 150 receives or detects the particular indicator and can generate a corresponding indicator to enhance the mobile device's particular indicator. Some embodiments according to the present disclosure provide that the circuitry 150 will light up the ILDs 160 in a particular sequence, pattern, color, intensity, etc. based on, for example, the particular indicator that is received or detected from the host mobile device 110. The beads 180 that cover the ILDs 160 can further enhance the indication generated by the mobile device cover 100 by providing, for example, different shapes and colors.

Some embodiments according to the present disclosure contemplate that the host mobile device 110 uses different indicators for different callers, different alerts, different types of messages, different senders of messages, etc., for example. The different indicators (e.g., different audio indicators, different electrical signal indicators, etc.) that are received or detected by the circuitry 150 cause the mobile device cover 100 to generate correspondingly different responses by lighting up the ILDs 160 or the ILDs 160 and the beads 180 in a respective sequence, pattern, color, shape, intensity, etc. Thus, for example, an incoming phone call from a first person would cause a first pattern of ILDs 160 to light up on the mobile device cover 100; an incoming phone call from a second person would cause a second pattern of ILDs 160 to light up on the mobile device cover 100; an incoming text message alert from a particular person would cause a third pattern of ILDs 160 to light up depending on the particular person, for example; and an incoming communication from an unknown caller, perhaps indicated by a particular caller or ringtone, for example, would cause a fourth pattern of ILDs 160 to light up. These ILD 160 patterns can be hardwired or programmed in the mobile device cover 100, the host mobile device 110, and a mobile application on the host mobile device 110. Some embodiments provide that the mobile device cover 100 and the host mobile device 110 are programmed with the patterns when the mobile device cover 100 and the host mobile device 110 are connected, or when the mobile device cover 100 or the host mobile device 110 are connected to a computer. Individual ILD 160 patterns or sets of patterns and their correspondence to various events can be set by a user, software, firmware, etc. or can be set automatically due to default settings stored on the mobile device cover 100, the host mobile device 110, and a mobile application on the host mobile device 110. Some embodiments allow the user to select specific ILD 160 methods: patterns, colors, brightness, images, text, etc. to any number of ILD 160 devices for any specific or general call, text, notification, indicator, alert, from a specific or general person, mobile application, mobile accessory, data, news, information, etc.

Some embodiments according to the present disclosure contemplate that the ILDs 160 or subsets of the ILDs 160 correspond to different frequencies (e.g., different ILDs 160 correspond to different musical notes such as A, B, C sharp, E flat, audio frequencies, etc.) and that the ringtone indicative of a particular caller or a particular type of message is played out by the different ILDs 160. The circuitry could also control particular ILD 160 intensities and duration, for example, to correspond to different types of musical notes (e.g., quarter note, eighth note, etc.), different audio frequencies, different musical dynamics (e.g., loud, soft), etc. Some embodiments can utilize this method for sound generated by or not by the host mobile device 110 or the mobile device cover 100.

Figure 3:
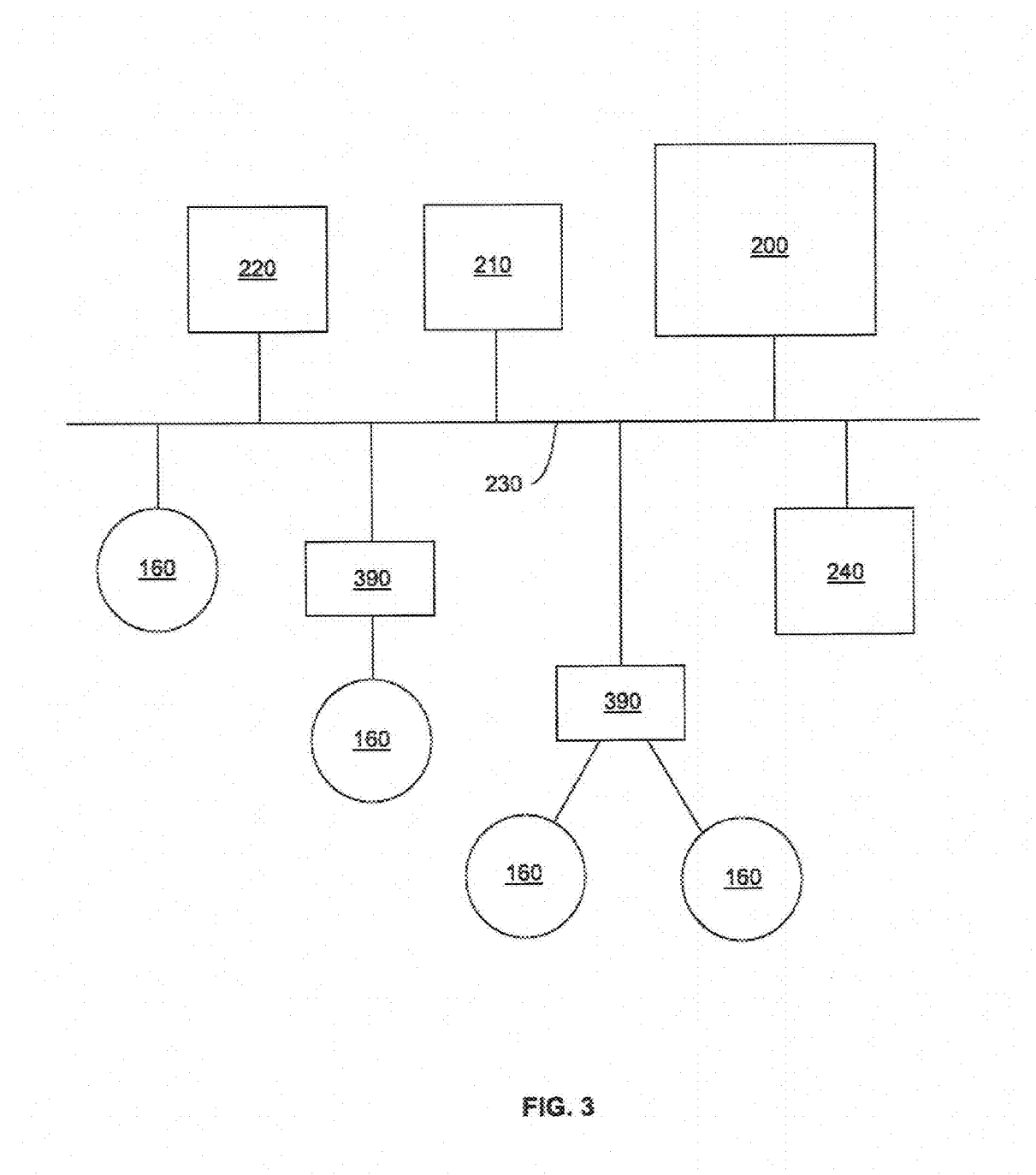
FIG. 3 illustrates a block diagram of some of the circuitry of the mobile device cover in accordance with an embodiment of the present disclosure.

FIG. 3 illustrates an embodiment of a circuit arrangement according to the present disclosure. The circuitry 150 may include, for example, a processor 200, a memory 210 (e.g., a nontransitory memory), a sensor 220, and one or more components illustrated in FIG. 3. The processor 200, the memory 210, and the sensor 220 are connected to a bus 230. The driver circuitry 390 can also be connected to the bus 230. Although illustrated as four ILDs 160, some embodiments according to the present disclosure contemplate using more or less than four ILDs 160. In some embodiments, the driver circuitry 390 can control any amount or arrangement of similar or different ILDs 160, including a full display. In some embodiments, the driver circuitry 390 can power any number or arrangement of similar or different ILDs 160. Driver circuitry 390 can, for example, be LED drivers, shift registers, constant current supply, constant voltage supply, switching supply, FET amplifier, BJT amplifier, etc. In addition, some embodiments according to the present disclosure contemplate using more or less than one sensor, one processor, one memory, or one driver circuitry.

The processor 200 may include, for example, one or more of the following: a general processor, a central processing unit, a digital filter, a microprocessor, a digital processor, a digital signal processor, a microcontroller, a programmable array logic device, a complex programmable logic device, a field-programmable gate array and an application specific integrated circuit, and a memory. Code, instructions, software, firmware and data may be stored in the processor 200, the memory 210, or both.

The memory 210 may include, for example, one or more of the following: a non-transitory memory, a non-transitory processor readable medium, a non-transitory computer readable medium, a read only memory (ROM), a random access memory (RAM), DRAM, EPROM, EEPROM, F-RAM, FIFO, NVRAM, SRAM, a cache, a semiconductor memory, a magnetic memory, an optical memory, a flash memory, a flash card, a compact flash card, memory cards, secure digital memory cards, a microcard, a minicard, an expansion card, a smart card, a memory stick, a multimedia card, a picture card, flash storage, a subscriber identity module (SIM) card, a hard drive (HDD), a solid state drive (SSD), etc. The memory 210 may be configured to store code, instructions, software, firmware and data for use by the processor 200 and may be external, internal, or both to the processor 200.

Some of the code, instructions, software, firmware and data may be hardwired (e.g., hardware implementations, hardwired into registers, etc.) and may be programmable according to some embodiments of the present disclosure. In some embodiments, the ringtones and illumination, display, or lighting patterns can be controlled by any combination of interfaces with the host mobile device 110, the circuitry 150, or software stored on, for example, the host mobile device 110 and the memory 210. In some embodiments, the host mobile device 110 and the mobile device cover 100 can be programmed when the host mobile device 110 or the mobile device cover 100 are synced or linked with a computing device (e.g., a computer).

In operation in accordance with some embodiments, the host mobile device 110 receives an incoming call or message. The host mobile device 110 may generate a particular audio indicator (e.g., a particular ring tone) that is received by the sensor 220. The sensor 220 senses (e.g., detects and processes) the particular ringtone and sends one or more signals to the processor 200 based on the sensed ringtone. In some embodiments, the one or more signals can be analog signals. In some embodiments, the one or more signals can be digital signals based on the analog signals. In some embodiments, the sensor 220 outputs analog signals which are then converted to digital signals by the processor 200, or are converted to digital signals by a signal processor or an analog-to-digital converter before being received by the processor 200. In some embodiments, the signals from the host mobile device 110 are digital and the processor 200 processes the digital signals from the host mobile device 110 or a third party application or the like. The processor 200 determines how to light the ILDs 160 based on the comparison of one or more sent signals with digital signatures and stored values. The processor 200 may have its own driver circuitry, for example, with which to drive the ILDs 160. Some embodiments provide that the brightness and duration of the illuminations of the ILDs 160 can be static, dynamic, variable, random, periodic, or aperiodic, or video.

The processor 200 may determine how to light ILDs 160 based on the one or more sent signals by accessing the memory 210. The memory 210 may include, for example, a table, single-dimensional array, multi-dimensional array, and any other memory arrangement that stores a correspondence between the one or more sent signals (or one or more values based on the one or more sent signals) and the respective sequences, patterns, colors, and intensities of one or more selected ILDs 160. The processor 200 can then execute the respective sequence, patterns, colors, and intensities of selected ILDs 160 as set forth in memory 210. In some embodiments, the processor 200 may determine to light the ILDs 160 at random, based on the one or more sent signals by accessing the memory 210. Which ILDs 160 can be turned on or which ILDs 160 should remain off as well as other illumination parameters of the ILDs 160 can be adjusted and programmed (e.g., manually or automatically) by the user.

In some embodiments, the one or more sent signals represent one or more musical notes. The memory 210 may include, for example, a table, single-dimensional array, multi-dimensional array, and any other memory arrangement that stores a correspondence between the one or more musical notes and the respective sequence, patterns, colors, and intensities of one or more selected ILDs 160. In other embodiments, the received signals corresponding to musical notes, sounds, and frequencies may be compared to stored values and frequencies with which can dictate the respective sequences, patterns, colors, and intensities to be lit for one or more selected ILDs 160. In some embodiments, these settings can be changed by the user.

Some embodiments according to the present disclosure contemplate lighting the ILDs 160 and the beads 180 into alphanumeric patterns that convey an indicator (e.g., one or more initials of the caller) or a message. In some embodiments, the ILDs 160 may utilize a display, LCD display, touch screen display, flexible display, flexible LCD display, and flexible touch screen or pressure sensitive display to convey an indicator, message, information, data, or video. In some embodiments, these ILDs 160 may be positioned around the edge of the mobile device cover 100.

The table, single-dimensional array, multi-dimensional array, and any other memory arrangement can be manually programmed by a user or can be programmed automatically by the processor 200. For example, a user can manually program processor 200 and the memory 210 such that all of the ILDs 160 blink red when a particular caller calls, blink random when a particular caller calls, or the processor 200 can automatically select a preset display of ILDs 160 when a different caller calls or texts.

Some embodiments according to the present disclosure provide that mobile device circuitry 240 is connected to the bus 230. The connection can be wired via the audio port 120, the docking port 140, or the connection can be wireless from one or more antennas of the host mobile device 110, for example. The host mobile device 110 may generate a signal (e.g., electrical signal, digital signal, analog signal, data signal, wireless signal, etc.) that is an indicator (e.g., a particular ring tone) that is received either by the sensor 220 or by the processor 200. The processor 200 can include, for example, an analog-to-digital converter. In some embodiments, the signal generated by the host mobile device 110 is received by the processor 200 which then determines in which manner to light or illuminate one or more selected ILDs 160 based on the received signals. When the ILDs 160 include a display, video, such as stored video may be displayed. The display may also show who is calling or sending a message or may display other information or data.

Figure 6:
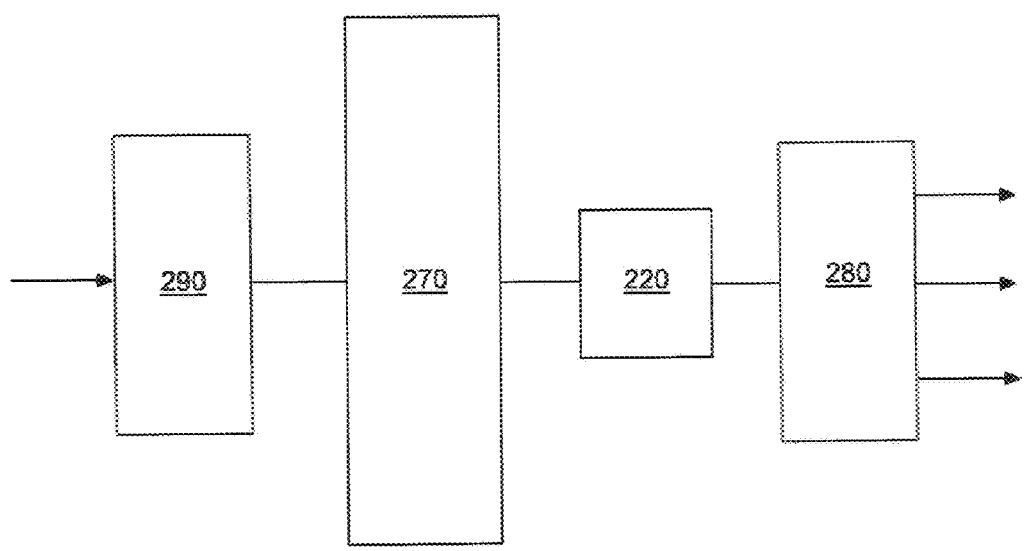
FIG. 6 illustrates a block diagram of circuitry in accordance with an embodiment of the present disclosure.

FIG. 6 illustrates an embodiment according to the present disclosure in which a digital signal processor 270 is used with an analog-to-digital converter 290, a processor 200, and one or more drivers 280. Similar in some aspects to FIG. 3, FIG. 6 shows an embodiment in which an analog-to-digital converter 290 converts the analog input signals from the sensor 220 or the mobile device circuitry 240 to digital input signals. The digital signal processor 270 processes the digital input signals in a similar manner as described before with respect to the processor 200. The digital signal processor 270 then sends out signals to the processor, which in turn sends a signal to the driver 280 which, in turn, drives the ILDs 160. There may be multiple drivers 280 for one or more sets of ILDs 160. There also, may be one or more ILDs 160 for a single driver 280. For example, one or more drivers 280 can drive a set including a red LED 160a, a green LED 160b, and a blue LED 160c as illustrated in FIG. 2.

As with the processor 200, the digital signal processor 270 may include, for example, one or more of the following: a general processor, a central processing unit, a digital filter, a microprocessor, a digital processor, a microcontroller, a programmable array logic device, a complex programmable logic device, a field-programmable gate array and an application specific integrated circuit, and a memory. In some embodiments, the digital signal processor 270 or the analog-to-digital converter 290 may be included in the processor 200 or SoC.

Figure 4:
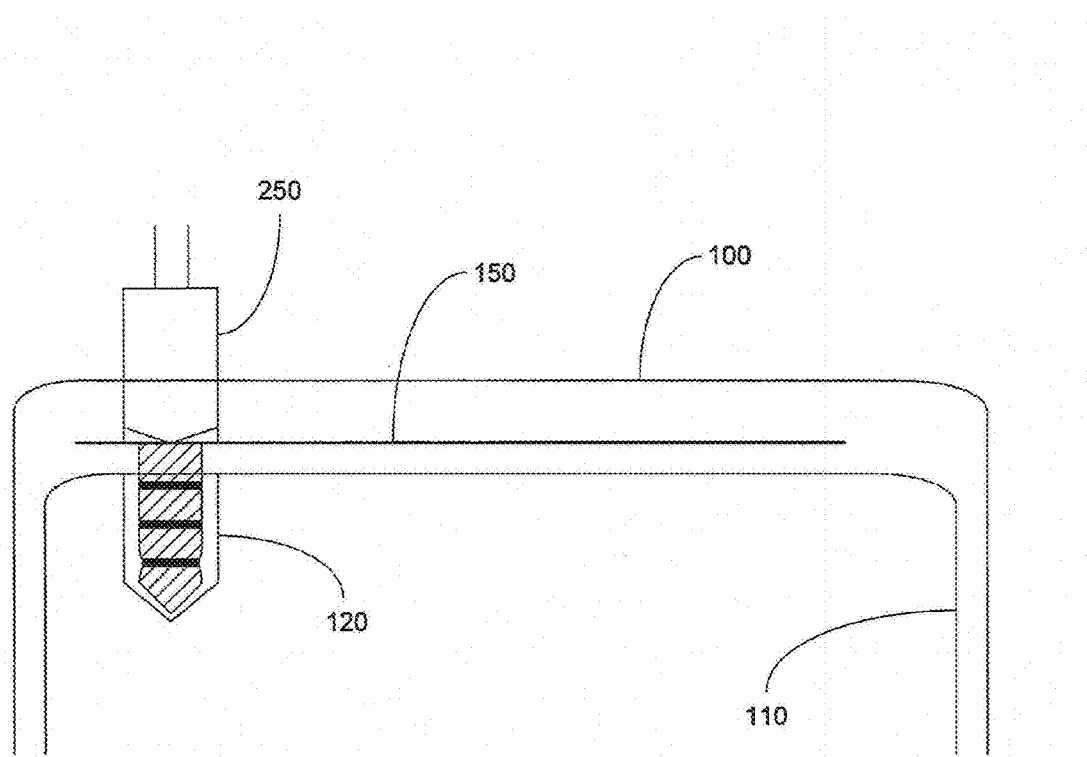
FIG. 4 illustrates an audio port, circuitry and an audio connector in accordance with an embodiment of the present disclosure.

FIG. 4 illustrates an embodiment of a portion of the mobile device cover 100 according to the present disclosure. The mobile device cover 100 includes circuitry 150 that may be, for example, embedded, at least in part, in the mobile device cover 100. Some embodiments according to the present disclosure also contemplate that the circuitry 150 can be partially on the inside or the outside of the mobile device cover 100. The circuitry 150 includes a circuit board, for example, that is disposed above the audio port 120. The circuit board may include, for example, a physical via through which an audio connector 250 (e.g., an earphone connector, a headphone connector, a speaker connector, a headset connector, etc.) passes to connect to the audio port 120 and the other circuitry of the host mobile device 110. In some embodiments, the circuitry 150 can be connected to the audio connector 250. In some embodiments, the circuitry 150 can be connected to the audio port 120.

Some embodiments according to the present disclosure provide that, when the host mobile device 110 receives an incoming call or message, the host mobile device 110 generates an audio signal through the audio port 120 and the audio connector 250. The audio signal may represent, for example, a particular ringtone or other type of audio indicator. The audio signal may be, for example, an electrical signal, a data signal, a digital signal, an analog signal, or an audio output. The circuitry 150 can be connected to the audio port 120 or the audio connector 250, and can receive or sense the audio signal. As described above, the circuitry 150 then determines the manner in which to light one or more selected ILDs 160 based on the signals.

Figure 5:
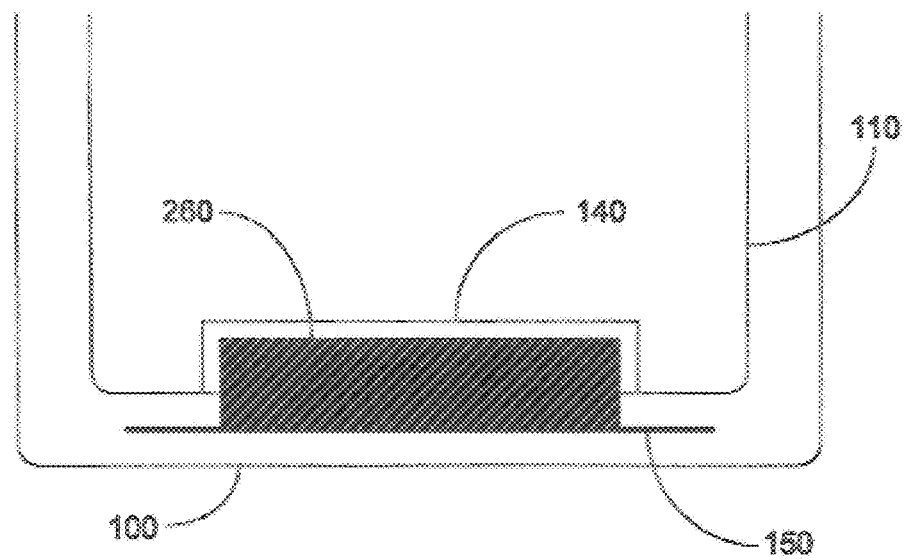
FIG. 5 illustrates a docking port, circuitry and a docking connector in accordance with an embodiment of the present disclosure.
Figure 5A:
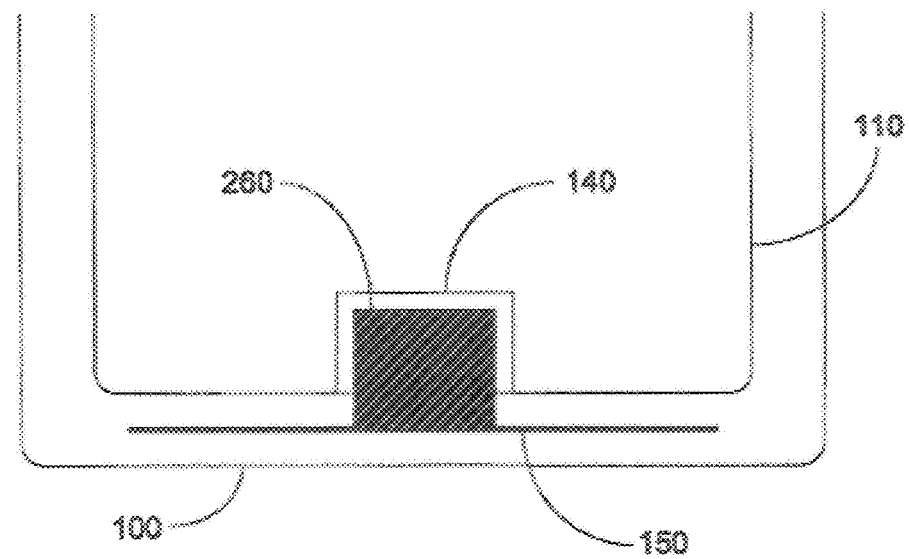
FIG. 5A illustrates a docking port, circuitry and a docking connector in accordance with an embodiment of the present disclosure.

FIGS. 5 and 5A illustrate embodiments of a portion of the mobile device cover 100 according to the present disclosure. The mobile device cover 100 includes circuitry 150 that may be, for example, embedded, at least in part, in the mobile device cover 100. Some embodiments according to the present disclosure also contemplate that the circuitry 150 can be partially on the inside or the outside of the mobile device cover 100. The circuitry 150 illustrated in FIGS. 5 and 5A may be in addition to or instead of the circuitry illustrated in FIG. 4. The circuitry 150 includes a circuit board, for example, that is disposed under the docking port 140. Some embodiments according to the present disclosure provide for a docking connector 260 extending from the circuit board 150 to the docking port 140. The circuit 150 is connected to the docking port 140, the docking connector 260, or both. The docking connector 260 can be attached to the circuitry 150 or can be part of the circuitry 150. In addition, the docking connector 140 can be part of a docking cable (e.g., a USB cable) that, similar to the audio connector 250 in FIG. 4, passes through a via (e.g., a physical window) in the circuit board of the circuitry 150 to connect to the docking port 140 and the circuitry of the host mobile device 110. Some embodiments can accomplish the same communication between the mobile device cover 100 and the host mobile device 110 via wireless communication (Wi-Fi, Bluetooth, etc.). Some embodiments can accomplish the same power between the mobile device cover 100 and the host mobile device 110 via power from an external battery, from inductive charging, etc.

Figure 24:
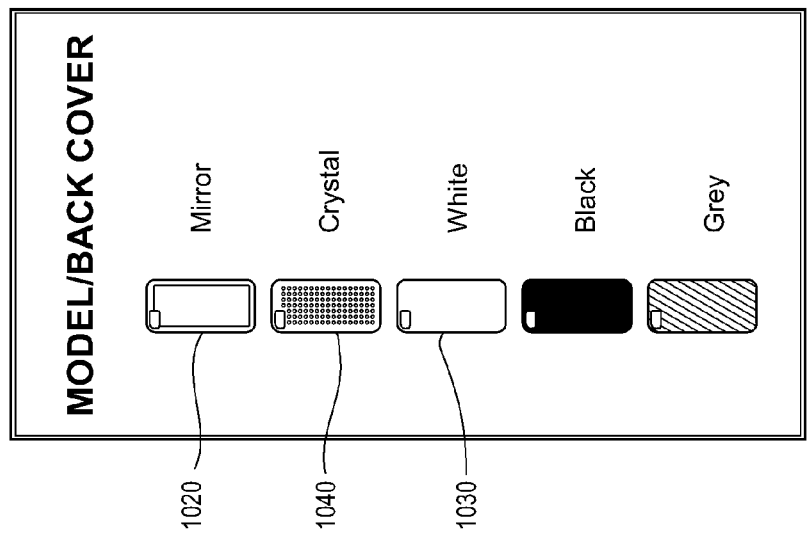
FIG. 24 illustrates an embodiment of a mobile application functionality and layout in accordance with an embodiment of the present disclosure.
Figure 29:
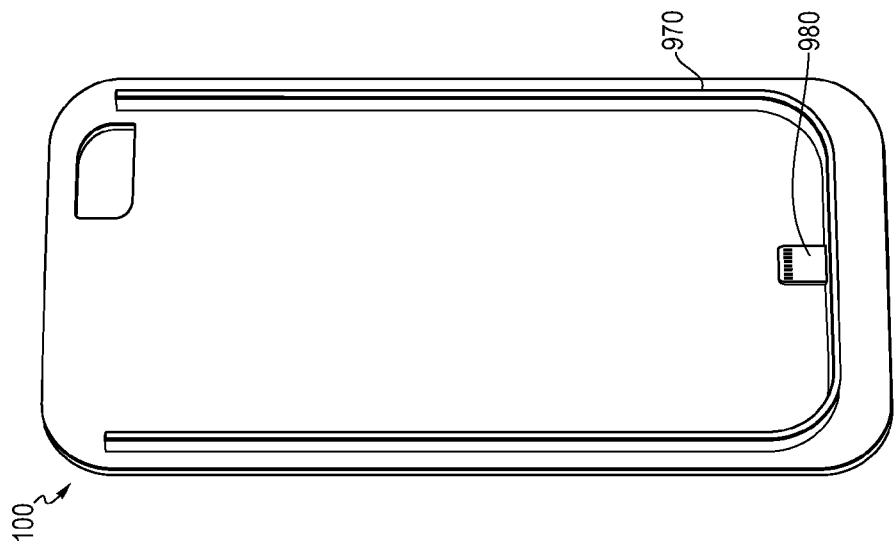
FIG. 29 illustrates an embodiment of a portion of the mobile device cover in accordance with an embodiment of the present disclosure.
Figure 28:
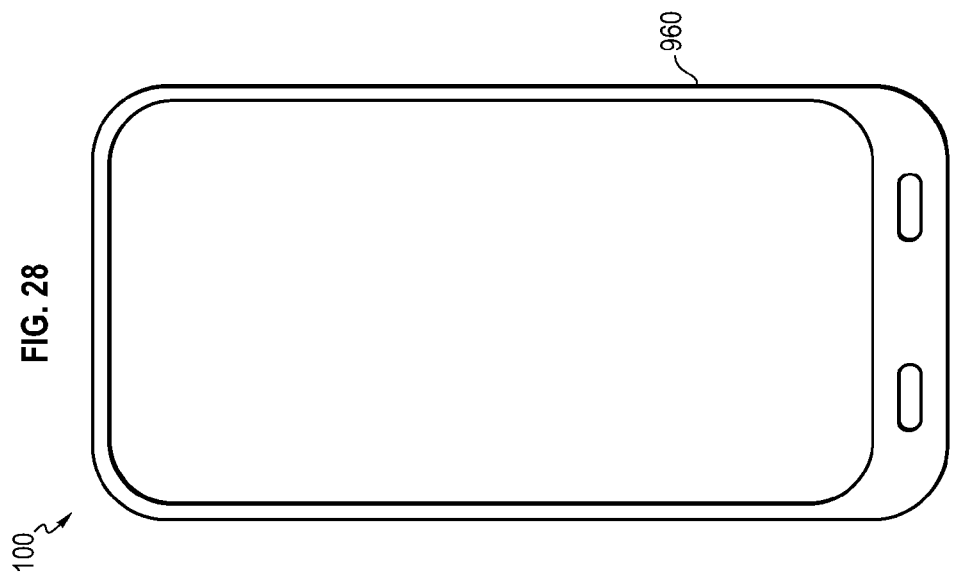
FIG. 28 illustrates an embodiment of a portion of the mobile device cover in accordance with an embodiment of the present disclosure.

FIG. 24 illustrates an embodiment of a screen of an application that runs on an operating system (e.g., iOS, Android, Linux, Windows, etc.) of the host mobile device 110. In some embodiments, the screen of the application can be displayed on a screen of the host mobile device 110. In some embodiments, the screen of the application can be displayed on a screen of the mobile device cover 100. In some embodiments, the screen of the application can be displayed both on a screen of the host mobile device 110 and on a screen of the mobile device cover 100. In some embodiments, the screen of the application that is being displayed both on a screen of the host mobile device 110 and on a screen of the mobile device cover 100 can look different, have different content, etc. The application allows the user to create new light patterns (e.g., ILDs 160) and ringtones that can be associated with each other. The associated light pattern and ringtone can be used as an indicator (e.g., a particular type of communication, a particular alert, a particular phone number, a particular sender or caller, etc.). In some embodiments, the light patterns are associated with a particular event (e.g., a particular type of communication, a particular alert, a particular phone number, a particular sender or caller, etc.). In some embodiments, the ringtones are associated with a particular event (e.g., a particular type of communication, a particular alert, a particular phone number, a particular sender or caller, etc.). The application also can allow the user to assign one or more light patterns or videos (e.g., ILDs 160) to specific contacts or notifications. The associated light pattern can be used as an indicator (e.g., a particular type of communication, a particular alert, a particular phone number, a particular sender or caller, etc.). As shown in FIG. 24, the application provides a user interface for generating or editing individual light patterns, ringtones, or associations to be displayed by the ILDs 160. Some embodiments of the application include different layouts and functionality. Such features can include switches provided by the application to enable, disable, or set various indications (e.g., alerts) for different types of notifications, duration of light patterns, colors of lights, intensity of lights, videos, display patterns, etc. Some embodiments provide that these different light patterns, colors of lights, intensity of lights, flashing of lights, etc. can be indicative of a specific notification. This may include incoming information. Some embodiments provide that the application running on the host mobile device 110 can communicate with the circuitry and components on the mobile device cover 100 via a USB port (e.g., a micro USB port), a Lightning port, a serial port, a parallel port, a wireless port (e.g., an IEEE 802.11 port, a Bluetooth port, a wireless local area network port, a personal area network port, and a ZigBee port), etc. For example, FIGS. 28 and 29 show a front portion 960 and part of a back portion 970, respectively, of the mobile device cover 100 that fit around a host mobile device 110 (not shown). In particular, the back portion illustrated in FIG. 29 shows a Lightning connector 980 that connects circuitry (not shown) of the mobile device cover 100 to circuitry of the host mobile device 110 (not shown) via a Lightning port of the host mobile device 110. As shown in FIG. 24, some embodiments allow the user to upload their contact list from their host mobile device 110, in order to assign one or more light patters and ILD 160 colors, lights, and intensities to specific contacts. Other embodiments allow the user to upload their mobile application list from their host mobile device 110, in order to assign one or more light patterns, videos, and ILD 160 colors, lights, and intensities to specific notifications.

In some embodiments, the application can allow the user to customize different alert preferences as well as ILD 160 display alerts. The associated light pattern or video can be used as an indicator (e.g., a particular type of communication, a particular alert, a particular phone number, a particular sender or caller, etc.). In some embodiments, the light patterns are associated with a particular event (e.g., a particular type of communication, a particular alert, a particular phone number, a particular sender or caller, content of information, etc.) and can be specific text, icons, graphics, video, etc. that illustrate or are similar to the particular event or notification. The application also can allow the user to assign one or more light patterns (e.g., via ILDs 160) to specific contacts or incoming notifications. The associated light pattern can be used as an indicator (e.g., a particular type of communication, a particular alert, a particular phone number, a particular sender or caller, etc.). For example, a text message could be displayed word for word on the mobile device cover 100 as it would appear on the host mobile device 100 to the user. In some embodiments, the particular event or notification can be displayed word for word as well as have additional graphics or light patterns, videos, intensities, etc. set by the user on the application. Some embodiments of the application include different layouts, functionality, and ILD 160 display methods for alerts and notifications. Such features can include switches provided by the application to enable, disable, or set various indications (e.g., alerts) for different types of notifications, duration, colors, intensities, graphics, layout, etc. Some embodiments provide that these different display methods selected by the user can be specific to calls, texts, mobile device notifications, mobile application notifications, mobile device accessory notifications, particular callers, particular texts, particular group texts, particular mobile device notifications, particular mobile application notifications, particular mobile device accessory notifications, etc.

Figure 25:
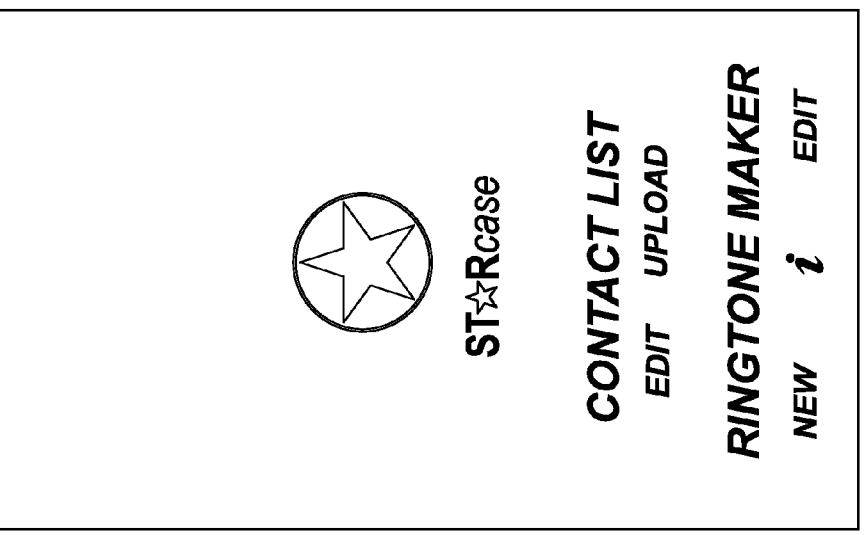
FIG. 25 illustrates an embodiment of a mobile application functionality and layout in accordance with an embodiment of the present disclosure.

In some embodiments according to the present disclosure, the application is configured depending upon the type of model and back cover that is used in the mobile device cover 100. The back covers can be replaceable and can be fastened (e.g., snapped) onto or around the host mobile device 110 and onto or around the front cover of the mobile device cover 100. Referring to FIG. 25, and by way of example only, the device can be configured for a plurality of model back cover designs including, for example, a mirror back cover, a crystal back cover, a white model back cover, a black model back cover, and a grey model back cover. Model back cover designs can be in any color (e.g. blue, pink, red, purple, etc.) and can be selected by the user via a color wheel. In some embodiments, the user has the ability to select multiple colors in multiple patterns and variations. Some embodiments depict the ability for a user to upload their own image to be illuminated on their back cover. This could be accomplished by etching, fastening stickers onto the back cover, or other methods. Some embodiments allow the user to select features to be added, such as crystals, one-way mirrors, etc. to be added to the back cover. These features may be placed in any location by the user to accent the case design or even to be used when customizing alert notifications by the case.

However, other types of covers can be used and the list is not exhaustive. FIG. 25 shows exemplary embodiments of a crystal back cover 1040, translucent back cover 1030, and a mirror back cover 1020. The hole at the top left corner of each back cover provides a via that is adapted for use with a camera, a flash, or a sensor, for example, of the host mobile device 110. FIGS. 30 and 31 show an exemplary embodiment of the mobile device cover 100 with a mirror back cover 1020 in which the light pattern via ILDs 160 is not lit and lit, respectively. The mirror back cover 1020 allows light from the ILDs 160 to pass through and mirrors images external to the mobile device cover 100. FIGS. 32 and 33 show an exemplary embodiment of the mobile device cover 100 with a translucent back cover 1030. The translucent back cover 1030 can have and be made up of any combination of colors, designs, transparencies, etc. Further, the translucent back cover 1030 allows light from the ILDs 160 to pass through when the ILDs 160 are on and substantially hides the ILDs 160 and any inner circuitry of the mobile device cover 110 when the ILDs 160 are off. FIGS. 34 and 35 show an exemplary embodiment of the mobile device cover 100 with a crystal back cover 1040. The crystal back cover 1040 uses an array of different colored crystals 1050a, 1050b. Underneath the crystals 1050 are ILDs 160 which can illuminate the crystals. FIG. 34 shows the mobile device cover 100 when the crystals 1050 are not illuminated by the ILDs 160 and the FIG. 35 shows the mobile device cover 100 when the different colored crystals are illuminated by the ILDs 160.

In some embodiments, once the back cover has been selected, the application guides the user in selecting a particular light display and in selecting or customizing a ringtone. The application can then associate the selected light display and the ringtone for a particular event such as, for example, a particular type of communication (e.g., voice mail, message, phone call, video call, email, etc.), a particular alert (e.g., missed call, message waiting, calendar alert, appointment alert, unknown caller, particular caller, etc.), a particular phone number, a particular sender or caller, a particular mobile application alert (e.g., news update, stock information, strike price or sell info alert, weather update, traffic information, etc.) or some other indicator.

Figure 19:
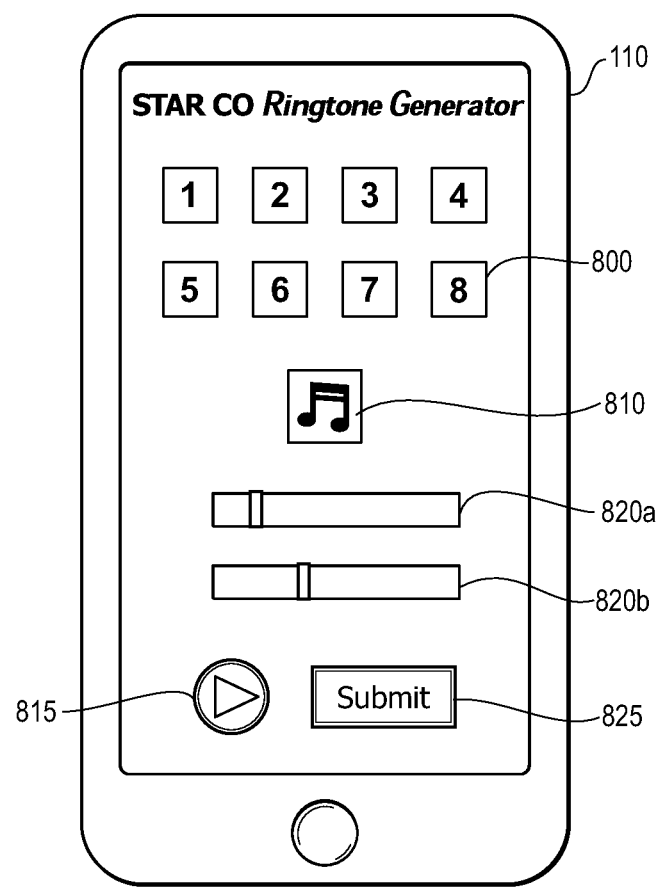
FIG. 19 illustrates a mobile application functionality and layout in accordance with an embodiment of the present disclosure.

In FIG. 19, an embodiment of the application assists the user with selecting a particular light display. In some embodiments, the application is displayed on a screen of the host mobile device 110. In some embodiments, the application is displayed on a screen, ILDs 160, etc. of the mobile device cover 110. The application provides one or more graphical buttons 800 whereby each button 800 represents a different light pattern that is available for display by the mobile device cover 100, for example. Each button 800 can be selected, for example, by a touch-sensitive display, remote control, audio control, voice command control, etc. In some embodiments, the buttons are assigned particular numbers and a user selects a particular button by speaking or selecting the particular number corresponding to the button 800. A user can browse through or test the various stored light patterns by selecting one of the buttons causing the corresponding light pattern to be displayed on the mobile device cover 100 for a select amount of time to show the user the selected option. The light pattern selected by the user can be used in association with a particular customized ringtone.

Some embodiments of the application provide assistance to the user with selecting a particular ILD 160 light display (e.g., a particular light show, light patterns, etc.). A plurality of choices can be presented for a selected model back cover. Some of the choices can have descriptive names that the user can choose from by pressing the graphical button 800 or saying or typing the descriptive name, for example. At least one of the choices can be a random pattern. A random pattern can include, for example, randomly choosing one of the light displays or choosing any ILD 160 light pattern at random (e.g., lighting the ILDs at random) instead of choosing any of the other ILD 160 light displays (e.g., preset light displays). The application can also graphically display the choice of the light pattern on the choice of the back cover on the screen of the host mobile device 110. The application can also cause the mobile device cover 100 to light up according to the selected light display so that a user can actually see the selected light display. In some embodiments, the application may allow the user to control the ILDs 160 directly. These controls may include, but are not limited to, utilizing a light pattern to display information, displaying specific text, pictures, etc. for a notification or alert, displaying text from a notification, incoming information, or alert, arranging which ILDs 160 display what type of information, etc. In some embodiments, the user is able to program his own patterns, text, image, video, etc. to be displayed on the mobile device cover 100 via ILD 160 per any set call, text, alert, notification, mobile application alert, etc. In some embodiments, the user can select random and allow the mobile device cover 100 to decide how to use the ILDs 160 to display the alert, incoming information, or notification.

Once the ILD 160 light pattern has been selected, the application guides the user in selecting and customizing a ringtone. In some embodiments, the application can allow the user to set it to different modes, including simple, random, self-learning, etc. based on their preferences. If a display is utilized, the user may program videos to play instead of a light pattern.

Referring to an embodiment illustrated in FIG. 19, by selecting the music symbol 810, music stored on the host mobile device 110 is accessed. The music can also be stored in a server or a network (e.g., a cloud network, a storage area network, etc.) to which the host mobile device 110 has access via wired or wireless links. The accessible music can be a listing according to playlist, artist, song title, album, recent play history, personal recommendation, other recommendations, alphabetical order, etc. and can be shown in the same format as the music library is displayed on the host mobile device 110. A particular song can be selected for the basis of a ringtone, for example, by using the touch-sensitive screen of the host mobile device 110 or by other means for selecting screen options on a mobile device.

Once the music has been selected, the ringtone can be customized from the selected music. Referring to FIG. 19, sliders 820a and 820b can be moved along corresponding graphical bars to determine the particular portion of the selected music to serve as the ringtone. In one embodiment, the slider 820a can move along its bar corresponding to a particular time in the duration of the selected music. The ringtone would begin where indicated by the slider 820a at this particular time in the selected music. The slider 820*b* can move along its bar corresponding to another particular time in the selected music. The ringtone would end where indicated by the slider 820*b* at this other particular time in the selected music. Alternatively, the slider 820*b* can represent a time duration determined by the position of the slider 820*b* on its bar. In such a case, the ringtone would begin in the selected music as indicated by the slider 820*a* and continue to play the selected music for the particular duration as determined by the slider 820*b*. The customized ringtone can be sampled or played using the play button 815. Once the customized ringtone or text-tone has been created, the user can save the file. The file that is saved has an indicator tone inserted directly before the user's created ring-tone or text-tone in that saved file. This file can then later be downloaded by the user and then uploaded into the host mobile device 110 as a specific notification, ringtone, text-tone, etc.

Figure 27:
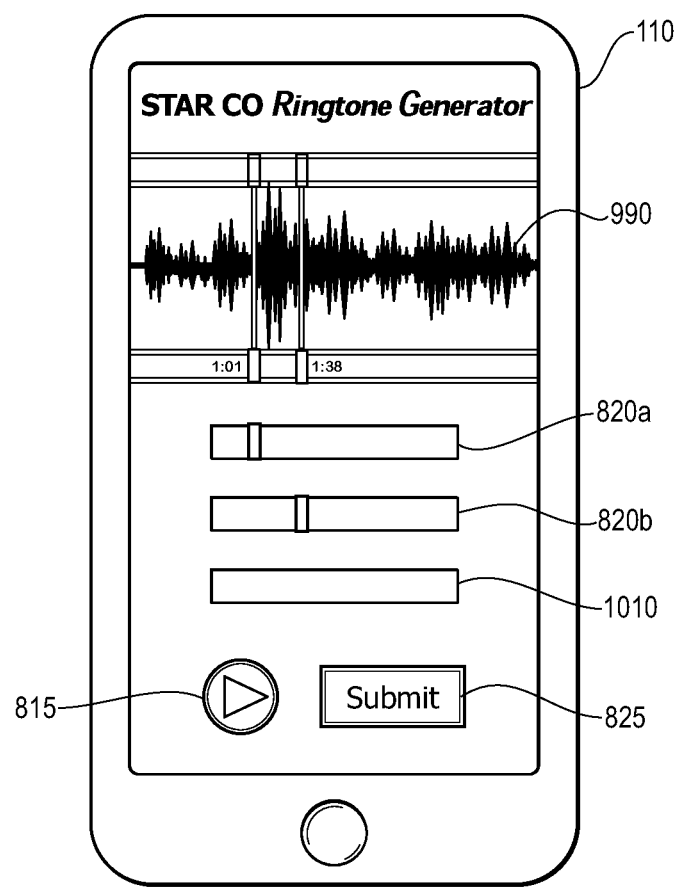
FIG. 27 illustrates an embodiment of a mobile application functionality and layout in accordance with an embodiment of the present disclosure.

FIG. 27 shows another embodiment of the application used to customize a ringtone from a selected song. A portion of the selected song is windowed 990 for use in a ringtone. As illustrated, the portion of the selected song from time 1:01 to time 1:36 is designated for use in a ringtone by moving the two sliders 820. The application can provide, for example, a graphical representation of an audio signal in time that corresponds to the selected song that can facilitate windowing and signal conditioning within the window. Other graphical representations (e.g., over frequency) are also contemplated so that a user can condition the music in either the time domain or the frequency domain. For example, the user can condition the windowed signal by adjusting fade, equalization, volume, bias, sampling rate, band pass filtering, band stop filtering, channel selection, channel filtering, high pass filtering, low pass filtering, etc. Text given by the user 1010 can also be associated with the ringtone such as a person's name, a file name, a song's name, etc. Such contextual information can be used to save the ringtone and to associate the ringtone with one or more certain events. In some embodiments, the name or ID can be displayed when receiving a call, text, notification, etc.

Figure 7:
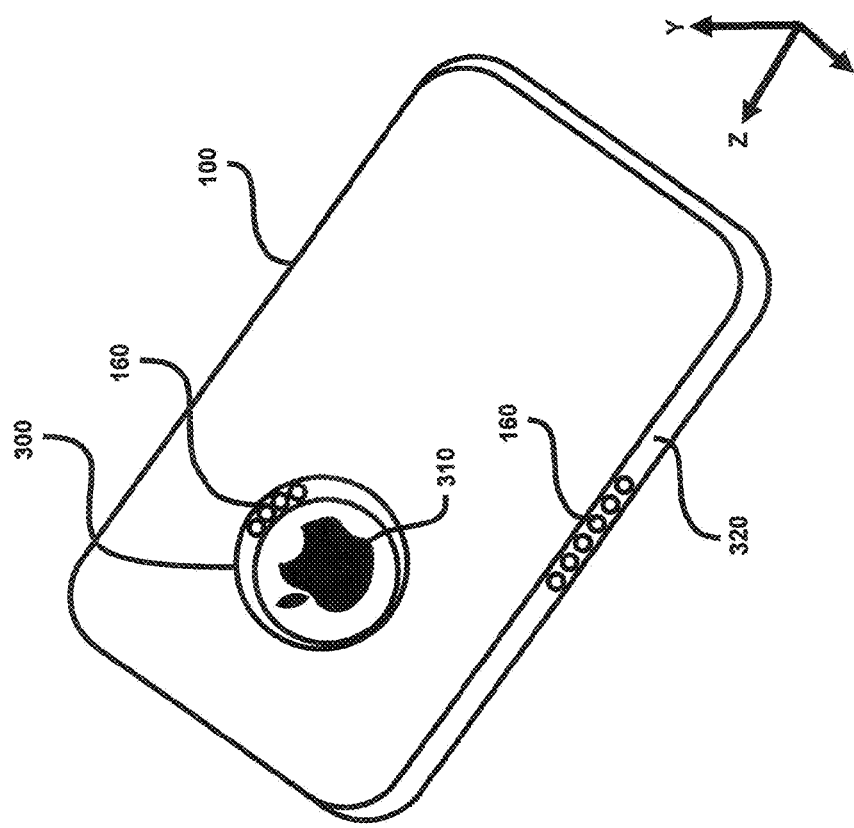
FIG. 7 illustrates a mobile device cover in accordance with an embodiment of the present disclosure.

FIG. 7 illustrates an embodiment of a mobile device cover 100 according to the present disclosure. The mobile device cover 100 can use ILDs 160 for edge lighting and signaling. Referring to FIG. 7, the mobile device cover 100 can be configured with a window 300 that includes ILDs 160 along the edge of the window 300. The window 300 can be a physical opening or a transparent portion of the mobile device cover 100. The window 300 provides visual access to a logo 310 of the host mobile device 110. The logo 310 can be printed or attached to the host mobile device 110 or the mobile device cover 100. The ILDs 160 are disposed in the edge of the window 300 so that, when the ILDs 160 light up, the logo 310 is illuminated. The ILDs 160 can be lit up according to different patterns, intensities, colors, etc. as is disclosed herein. In some embodiments, the edge lit ILDs 160 can point outward or inward with respect to the host mobile device 110. The edge lit ILDs 160 can be slightly raised above the surface of the host mobile device 110 and can point in a direction along an adjacent surface of the host mobile device 110. In some embodiments, the edge lighting can generate scrolling text on the mobile device case 100.

Some embodiments provide that the ILDs 160 can be located along the edge of the mobile device cover 100 to provide edge illumination. In some embodiments, edge illumination can be in the form of an ILD 160 alphanumeric display, LCD display, LED array, etc. The ILDs 160 can be disposed in a bumper portion (e.g., a bumper band 320) of the mobile device cover 100. In some embodiments, the bumper band 320 can be raised on a back side, front side, etc., for example, so that the ILDs 160 are exposed. The bumper band 320 can be edge lit by the ILDs 160, for example. The number of ILDs 160 illustrated in FIG. 7 is merely exemplary. There can be more or less that the illustrated ILDs 160. For example, the ILDs 160 can be located around the periphery of the bumper band 320, or can be arranged in groups according to different lighting configurations. In some embodiments, these ILD 160*s* can be flexible LCD display(s) around the edge of the mobile device cover 100.

In one embodiment, the ILDs 160 illustrated in FIG. 7 can direct lighting substantially in the x-direction. In another embodiment, the ILDs 160 illustrated in FIG. 7 can direct lighting substantially in the y-direction. In yet another embodiment, the ILDs 160 illustrated in FIG. 7 can direct lighting substantially in the z-direction. In some embodiments, the ILDs 160 can direct lighting substantially along any combination of the x-, y-, and z-directions. The direction of the lighting from the ILDs 160 can be influenced, for example, by the location and direction of the ILDs 160 as well as other influencers such as waveguides, lenses, diffusers, beads 180, reflectors, prisms, and other optical influencers. The ILDs 160 can be lit up according to different patterns, intensities, colors, logos, etc. as is disclosed herein.

Figure 8:
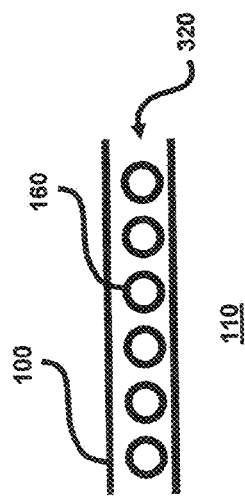
FIG. 8 shows a cross-section of a mobile device cover with a bumper portion in accordance with an embodiment of the present disclosure.

FIG. 8 shows a cross-section of an embodiment of a mobile device cover 100 according to the present disclosure. In this configuration, the ILDs 160 can be disposed on the front portion (illustrated), the back portion (not illustrated), or both, of the bumper band 320 disposed along the edge of the mobile device cover 100. The ILDs 160 can be facing, for example, the y-direction using the direction convention illustrated in FIG. 7. Thus, the ILDs 160 on the front side of the bumper band 320 and the logo 310 would both face the same direction, for example. A similar ILD 160 configuration can also be located on the back portion of the same section of the bumper band 320 to illuminate in a different direction. In addition, the lighting of the ILDs 160 and the lighting of the bumper band 320 can provide different patterns, intensities, colors, logos, information, text, video, etc. as is disclosed herein.

Figure 9:
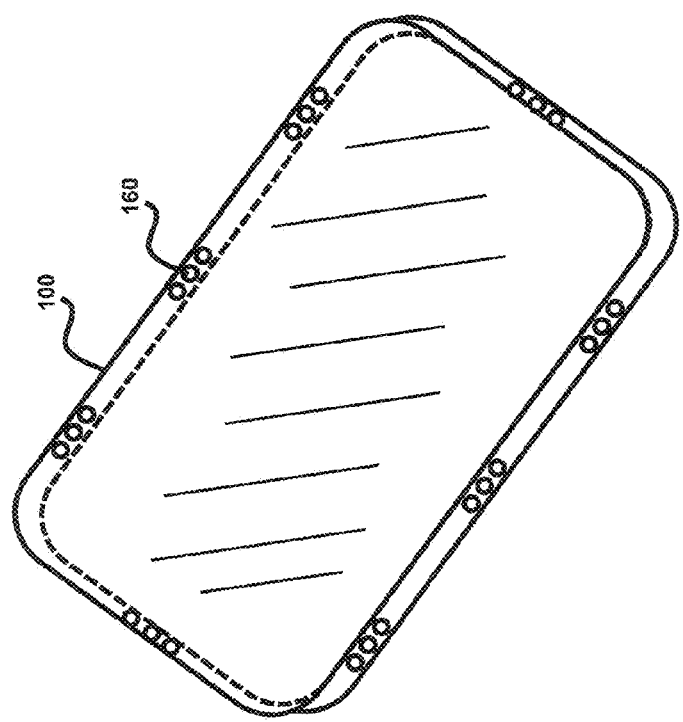
FIG. 9 illustrates a mobile device cover in accordance with an embodiment of the present disclosure.

FIG. 9 shows an embodiment of a transparent or opaque mobile device cover 100 with edge-lit ILDs 160 according to the present disclosure. The mobile device cover 100 can be configured with different waveguides, prisms, reflectors, lenses, diffusers, and any other optical influencers. In one embodiment, the case (e.g., an opaque case) can act as a diffuser, for example, and the light from one or more of the ILDs 160 when illuminated will be visible throughout the mobile device cover 100. Some embodiments provide that the illumination of ILDs 160 illuminates the mobile device cover 100. Some embodiments provide that the illumination of ILDs 160 illuminates the edge of a mobile device cover 100. Some embodiments provide that the illumination of individual ILDs 160 can be seen through a transparent mobile device cover 100.

FIG. 10 illustrates an embodiment of a mobile device cover 100 according to the present disclosure. The mobile device cover 100 has ILDs 160 that are used to illuminate an optical configuration arranged in the shape of a logo 330, for example, a version of a Miami Hurricanes logo of the University of Miami. Referring to FIG. 10, the one or more ILDs 160 are optically coupled to waveguides 340. A portion 350 of the waveguides 340 is also configured in the shape of the logo 330. The waveguides 340 can be configured so that, when the ILDs 160 are lit, the entire wave guide 340 is illuminated from an external point of view. The waveguides 340 can be configured so that, when the ILDs 160 are lit, only the logo portion 350 of the waveguides 340 is illuminated from an external point of view. Except for the logo portion 350, the rest of the waveguides 350 might not be easily visible from an external point of view. In addition, the ILDs 160 can be different colors. For example, the Miami Hurricanes logo is orange on the left side and green on the right side. Some embodiments provide that one or more ILDs 160 can generate the orange or green colors. Some embodiments can employ using colored waveguides or colored prisms to illuminate the logo portion 350 in the appropriate color. Some embodiments provide that a colored logo is printed on the host mobile device 110 or the mobile device cover 100 and illuminated by the ILDs 160.

Although illustrated with edge-lit ILDs 160, the ILDs 160 can be located next to the logo portion 350 of the waveguides 340. Thus, the ILDs 160 can directly illuminate the logo portion 350. In addition, although illustrated as a logo, the portion 350 of the waveguides 340 that is illuminated need not be limited to logos, but can be any shape, design, or physical structure.

FIG. 11 illustrates an embodiment of a waveguide configuration arranged in a logo according to the present disclosure. The waveguide 340 can end in a termination point 360. The termination point 360 can be, for example, a reflector that keeps the light within the waveguide 340. The termination point 360 can also be an exit point for light. The waveguide configuration can also include a diffuser 370. The illustrated diffuser 370 includes a plurality of microprisms having a triangular shape to diffuse, scatter, spread light out, etc. to be viewed externally with respect to the mobile device cover 100. In some embodiments, the diffuser 370 can have, for example, a bumpy or highly modulated surface. The diffuser 370 can, for example, form part of the logo portion 350 of the logo 330 illustrated in FIG. 10. The diffuser 370 can be configured to diffuse, scatter, spread the light, etc. brought to it by the waveguide 340 to generate an illumination arranged in the form of the logo 330, for example.

FIG. 12 illustrates an embodiment of a prism or microprism of a diffuser according to the present disclosure. The diffuser 370 can include, for example, an arrangement of prisms 380 (e.g., microprisms). The diffuser may comprise, for example, rows and rows of prisms, or a matrix of individual light diffusers in the shape of diamonds or beads.

Some embodiments according to the present disclosure provide that, when the host mobile device 110 receives an incoming call or message, for example, the host mobile device 110 generates a data signal through the docking port 120 and the docking connector 250. The data signal may represent, for example, a particular ringtone, another other type of audio indicator, a visual indicator, caller identification information, message identification information, etc. The data signal may be, for example, an electrical signal (e.g., an analog or a digital signal). The circuitry 150 can be connected to the docking port 140, the docking connector 260, or both, and can receive and sense the data signal. As described above, the circuitry 150 then determines the manner in which to light one or more selected ILDs 160 based on the data signals.

Some embodiments according to the present disclosure provide that the host mobile device 110 can be set to silent mode, for example, and that the host mobile device 110 can generate the electrical or wireless signal, for example, that is an indicator of a particular caller or a particular text sender, for example. As described above, the mobile device cover 100 (e.g., the circuitry 150, the processor 200, the memory 210, etc.) can then use the received electrical or wireless signal, for example, to determine in which manner to light one or more selected ILDs 160.

Some embodiments according to the present disclosure provide that the host mobile device 110 can be set to silent mode, for example, and that the host mobile device 110 can generate an optical indicator, for example, that is an indicator of a particular caller or a particular text sender, for example. As described above, the mobile device cover 100 (e.g., the circuitry 150, the processor 200, the memory 210, etc.) can then sense the optical indicator using the sensor 220, for example, to determine in which manner to light one or more selected ILDs 160.

Some embodiments according to the present disclosure contemplate that the mobile device cover 100 can receive indications from the host mobile device 110 that the host mobile device 110 is receiving an incoming call or message, for example, and then generate audio output, for example, via a speaker that is part of the mobile device cover 100. Some embodiments according to the present disclosure contemplate that the mobile device cover 100 can receive indications from the host mobile device 110 that the host mobile device 110 is receiving an incoming call or message, for example, and then generate audio output, for example, via a speaker that is not a part of the host mobile device 110. In some embodiments, the mobile device cover 100 could provide an audio signal to the user which announces the specific caller, notification, alert, message, information, etc.

Some embodiments according to the present disclosure contemplate that the mobile device cover 100 can receive indications from the host mobile device 110 that the host mobile device 110 is receiving an incoming call or message and then generate a message or other indicator on one or more ILD 160 displays (e.g., LCD screen, LED screen, touch-sensitive screen, etc.) that, for example, is part of the mobile device cover 100 and not a part of the host mobile device 110. Some embodiments according to the present disclosure contemplate that the mobile device cover 100 can receive indications from the host mobile device 110 that the host mobile device 110 is receiving an incoming call or message and then generate a message or other indicator on one or more ILD 160 displays (e.g., LCD screen, LED screen, touch-sensitive screen, etc.) that, for example, is part of the mobile device cover 100 and a part of the host mobile device 110. In some embodiments according to the present disclosure, the display of the mobile device cover 100 might be visible on the opposite side as the display of the host mobile device 110. A message, as described herein, may include, for example, data, information, video, or other incoming information.

Some embodiments according to the present disclosure contemplate that the ILDs 160 can selectively light up other structures instead of or in addition to the beads 180. For example, the ILDs 160 can selectively light up lines, strips, rectangular box-like structures, cylindrical-type structures, or waveguide-like structures disposed on or in the mobile device cover 100. The ILDs 160 can also light up the entire mobile device cover 100, one or more entire sides, or one or more portions of entire sides of the mobile device cover 100 (e.g., at least partially transparent back portion) in a flashing or pulsating manner, for example.

Some embodiments according to the present disclosure may relate to, for example, a mobile device cover 100 that includes a processor 200 and ILDs 160. The ILDs 160 may be operatively coupled to the processor 200. The processor 200 may be configured, for example, to receive first signals based on second signals in which the second signals are generated by the host mobile device 110. The second signals may be indicative an incoming call, an incoming message, a pending message, a calendar alert (e.g., an upcoming appointment), or other notification, for example. The processor 200 may be configured to cause one or more of the ILDs 160 to light based on the first signals and their comparison to the digital signatures and stored values on the processor 200 or the memory 210. In some embodiments, the processor causes one or more of the ILDs 160 to light in a display to provide information including alphanumeric text and present multimedia information (e.g., video, animation, etc.).

FIG. 13 illustrates an embodiment of a mobile device cover 100 according to the present disclosure. The mobile device cover 100 includes sound channels 400. The first sound channel 400a is configured to provide access to a microphone 410 of the host mobile device 110. The second sound channel 400b is configured to provide access to a speaker 420 of the host mobile device 110. The host mobile device 110 can have one or more speakers 420 and one or more microphones 410 located in different locations on the host mobile device 110 other than or in addition to those locations shown in FIG. 13.

Some embodiments provide that the sound channels 400 are physical vias that extend completely through mobile device cover 100. Some embodiments provide that the sound channels 400 are partial physical vias that extend only partially through the mobile device cover 100. The partial physical vias protect the microphone 410 and the speaker 420, for example, of the host mobile device 110 from the outside environment, but still allow sufficient sound to pass through the sound channels 400. Some embodiments provide that the sound channels 400 are physical vias that extend completely through the mobile device cover, but also include with via covers (e.g., via covers made of porous material, via covers made of a mesh-type material, via covers made of materials that do not obstruct acoustic waves, etc.) that provide protection from the outside environment without substantially obstructing sound passing through the sound channels 400. The via covers can be integrated with the mobile device cover 100.

Some embodiments provide that the mobile device cover 100 include one or more acoustic sensors 425 (e.g., a microphone) that is located near the speaker 420. The acoustic sensor 425 can be located near or in the physical via 400b near the speaker 420. The acoustic sensor is positioned to receive sounds provided by at least the speaker 420 and is configured to convert the sounds into signals that are sent to the circuitry 150 in the mobile device cover 100 for analysis.

Some embodiments according to the present disclosure provide that the mobile device cover 100 includes a connector 430. The connector 430 can include, for example, a housing 440, circuitry 450, a first coupler 460 on one side, and a second coupler 470 on another side (e.g., an opposite side) of the housing 440. The connector 430 can be integrated with the mobile device cover 100 so that when the mobile device cover 100 is attached to the host mobile device 110, the connector 430 physically and electrically connects with a docking port 480 of the host mobile device 110. The connector 430 can also be a separate device that can be inserted into the docking port 480 of the host mobile device 110.

Some embodiments provide that the second coupler 470 of the connector 430 is configured to mimic that of the docking port 480 of the host mobile device 110. Thus, if the docking port 480 is a female, multiple-pin connector, then the second coupler 470 is also a female, multiple-pin connector. If the docking port 480 is a USB port or connector, then second coupler 470 is also a USB port or connector. If the docking port 480 is a Lightning connector (e.g., used by Apple, Inc.), then the second coupler 470 is also a Lightning connector. Thus, the connector 430 can provide connections through the second coupler 470 to outside cables and devices that mimic direct connections to the host mobile device 110.

Some embodiments provide that the second coupler 470 of the connector 430 is different from the docking port 480 of the host mobile device 110. For example, the docking port 480 can be a multiple-pin connector or a Lightning connector, and the connector 430 can provide a USB connector as the second coupler 470. Thus, the connector 430 can adapt the type of connector of the docking port 480 to a particular cable and device. The circuitry 450 in the housing 440 can include one or more circuits (e.g., circuitry on a printed circuit board or integrated chip) that can configure data and signals received in a first format (e.g., data and signals received from a multiple-pin connector or a Lightning connector) into data and signals transmitted in a second format (e.g., data and signals for transmission on a USB connector). Some embodiments provide that the connector 430 of a first type (e.g., with a particular first coupler 460 and second coupler 470) can be switched or replaced by another connector 430 of a second type (e.g., with a different first coupler 460 and the same or a different second coupler 470). In some embodiments, the connector 430 being switched can be separate from the mobile device cover 100. In other embodiments, the connector 430 being switched can be part of the mobile cover 100 and can be removed from the mobile device cover 100 and replaced. Some embodiments provide that particular mobile device covers 100 permanently have particular connectors 430 such that interchangeable mobile device covers 100 are used to effect changes in the first coupler 460, the second coupler 470, or both. Some embodiments provide that any configuration of any coupler, connector, etc. can work, including wireless communication.

Some embodiments provide that the connector 430 is configured to provide one or more signal connections between the mobile device cover 100 and the host mobile device 110. For example, the circuitry 150 of the mobile device cover 100 can send signals (e.g., data, voltages, currents, digital, wireless, etc.) to and receive signals from the host mobile device 110 over one or more wires or other signal carriers (e.g., conductors, waveguides, etc.) connecting the circuitry 150 and the connector 430 when the connector 430 is connected to the docking port 480 of the host mobile device 110.

The connector 430 can be configured to provide one or more power connections between the host mobile device 110 and the mobile device cover 100. For example, the circuitry 150 can be powered by the host mobile device 110 through the connector 430 over one or more wires or power carriers. The host mobile device 110 can provide an additional or back-up source of energy for the mobile device cover 100. The mobile device cover 100 can provide an additional or back-up source of energy for the host mobile device 110. Some embodiments provide that the host mobile device 110 and the mobile device cover 100 have respective rechargeable batteries that can provide a back-up or additional source of energy for the other. Some embodiments provide that the rechargeable battery in the host mobile device 110 or the rechargeable battery in the mobile device cover 100 can power the circuitry 150 including the processor 500 of the mobile device cover 100. Some embodiments provide that the mobile device cover 100 and the host mobile device 110 can re-charge batteries in the other. The accessing of the energy source of the mobile device cover 100 or the host mobile device 110 can occur automatically or can be manually set up.

In operation in accordance with some embodiments, when, for example, a phone call is received or missed, a message is received, an alert event has occurred, the host mobile device 110 can produce one or more sounds through its speaker 420. The sounds produced by the speaker 420 can be, for example, beeps, music, tones, spoken words, etc. and can be used to identify the caller or sender, the type of communication, the type of alert, etc., for example. Thus, for a particular caller identified by the host mobile device 110, the host mobile device 110 can produce a particular ringtone, for example. The acoustic sensor 425 of the mobile device cover 100 receives the sounds produced by the speaker 420 and converts the sounds into signals (e.g., digital signals, analog signals, etc.) The signals are sent to the circuitry 150 (e.g., one or more processors) for processing. Some embodiments provide that, based on a comparison of the signals or processed signals with the digital signatures and stored values, the circuitry 150 of the mobile device cover 100 determines which output (e.g., a particular pattern, sequence of colors, intensities, etc.) to implement in the ILDs 160 and other output devices (e.g., speakers, LCD or other type of display screen, vibration, etc.). In some embodiments, the circuitry 150 of the mobile device cover 100 also passes along information about an identified incoming caller or message sender, for example, and displays that information and possibly the text itself on a screen (e.g., illuminated by the ILDs 160) of the mobile device cover 100. In some embodiments, the circuitry 150 of the mobile device cover 100 also generates information about an identified incoming caller or message sender, for example, and displays that information and possibly the text itself on a screen (e.g., illuminated by the ILDs 160) of the mobile device cover 100. In some embodiments, the circuitry 150 of the mobile device cover 100 also passes along and generates information about an identified incoming caller or message sender, for example, and displays that information and, in some embodiments, the text itself on a screen (e.g., illuminated by the ILDs 160) of the mobile device cover 100.

Some embodiments provide that, when the connector 430 is connected to the docking port 480 of the host mobile device 110, the circuitry 150 of the mobile device cover 100 is connected to the circuitry of the host mobile device 110. For example, data and programming can be synchronized between the mobile device cover 100 and the host mobile device 110. The host mobile device 110 can be used to program various features of the mobile device cover 100. For example, the host mobile device 110 can be used to program the lighting, display, or sound effects provided by the mobile device cover 110 based on an identity of a particular caller, message sender, or type of alert. In another example, software resident on the mobile device cover 100 can be upgraded by the host mobile device 110 downloading the upgrade and transferring the downloaded upgrade to the mobile device cover 100.

In addition, if the connector 430 through the second coupler 470 is connected to a cable which, in turn, is connected to a computer, for example, then the computer can be used to program the mobile device cover 100 and the host mobile device 110. The computer can also be used to download upgrades of software used by the mobile device cover 100 and the host mobile device 110. The computer can also be used to charge the host mobile device 110 and the mobile device cover 100. Similarly, the host mobile device 110 and the mobile device cover 100 can be charged individually or simultaneously using a cable connected to the second coupler 470 and to a wall socket or a connector plugged into a wall socket, for example.

Some embodiments provide that the mobile device cover 100 can operate without the connector 430 being inserted into the docking port 480. Thus, some embodiments provide that the mobile device cover 100 can operate without the circuitry 150 of the mobile device cover 100 being in electrical connection with the circuitry of the host mobile device 110. The mobile device cover 110 can operate as described above using its own battery (e.g., rechargeable battery). When the host mobile device 110 provides a particular ring tone, for example, through its speaker 420, the audio sensor 425 can receive sounds and convert them into signals that are sent to the circuitry 150 of the mobile device cover 100. The mobile device cover 100 can then provide a corresponding output through the controlling of the ILDs 160 of the mobile device covers 100. Thus, the mobile device cover 100 need not be electrically connected to the host mobile device 110 to be acoustically, vibrationally, or wirelessly coupled to the host mobile device 110. Such an operation does not preclude the connector 430 be used also for the various reasons as set forth above. Thus, some embodiments provide that particular operations can be performed by the mobile device cover 100 with or without the connector 430.

Figure 14:
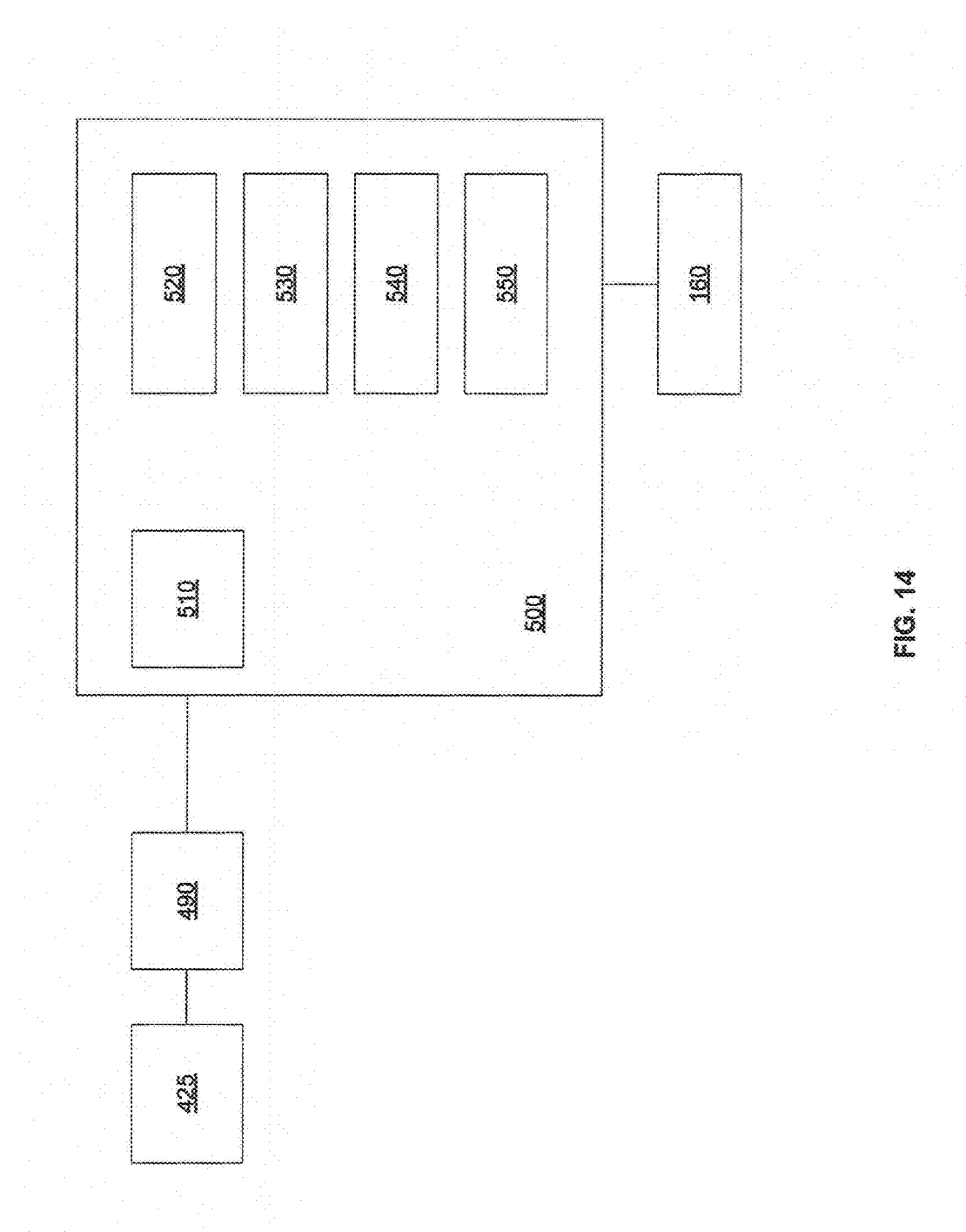
FIG. 14 illustrates an embodiment of some of the circuitry in a mobile device cover according to the present disclosure.

FIG. 14 illustrates an embodiment of some of the circuitry 150 in a mobile device cover 100 according to the present disclosure. The circuitry 150 can include, for example, one or more acoustic sensor 425 (e.g., an omnidirectional microphone), one or more analog circuits 490, one or more processors 500, and one or more ILDs 160. In some embodiments, the circuitry 150 includes an acoustic sensor 425 that is coupled to the analog circuits which, in turn, are coupled to the processor 500 which, in turn, is coupled to the ILDs 160. In some embodiments, the circuitry 150 includes a processor 500 that is coupled to the ILDs 160. In some embodiments, one more drivers 280 are coupled (e.g., coupled directly) to one or more ILDs 160.

Figure 21:
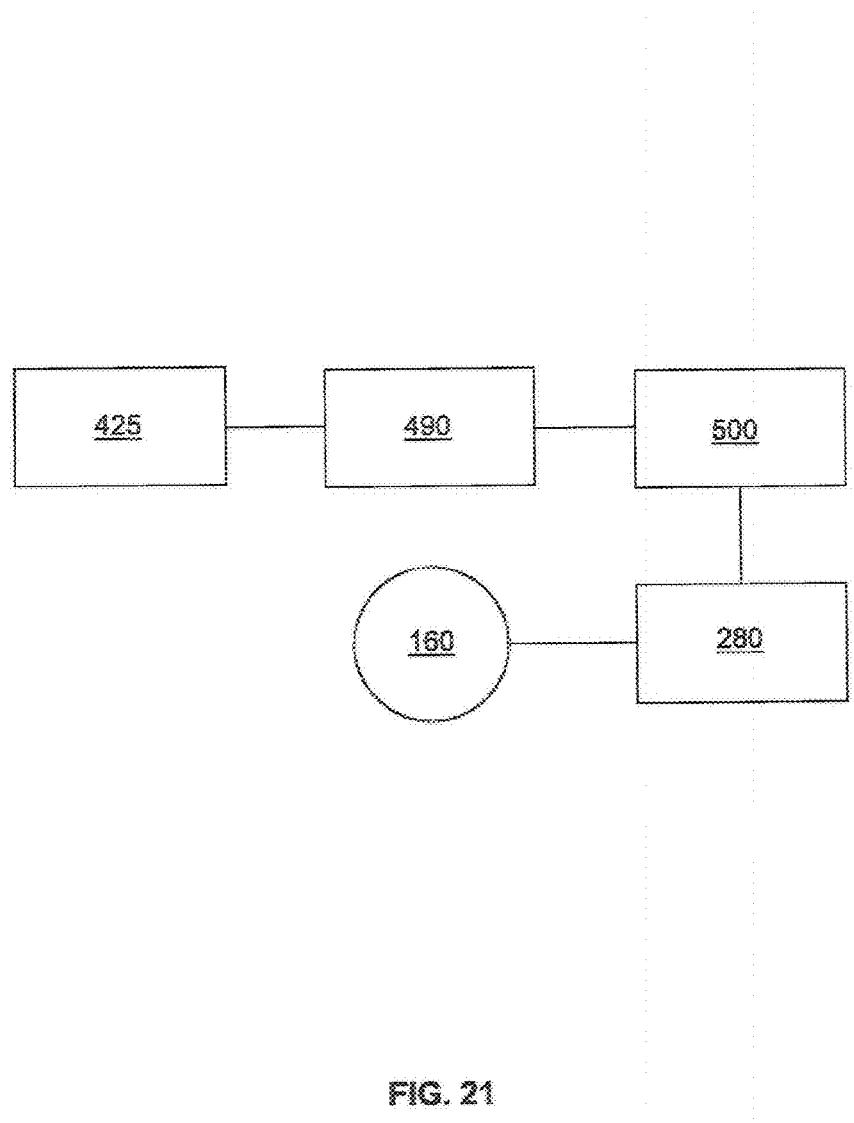
FIG. 21 illustrates an embodiment of some of the circuitry in a mobile device cover according to the present disclosure.

FIG. 21 illustrates an embodiment of some of the circuitry 150 in a mobile device cover 100 according to the present disclosure. The circuitry 150 can include, for example, one or more acoustic sensors 425, one or more analog circuits 490, one or more processor 500, one or more drivers 280, and one or more ILDs 160. In some embodiments, the acoustic sensor 425 is coupled to the analog circuits 490 which, in turn, are coupled to the processor 500. The processor 500 is coupled to the drivers 280, and the drivers 280 are coupled to the ILDs 160. Some embodiments contemplate using a system on a chip (SoC) by integrating one or more of the elements illustrated in FIG. 21. Some embodiments contemplate connecting various elements illustrated in FIG. 21 via one or more buses. In addition, a battery (e.g., a rechargeable battery) or a power line (e.g., a power bus) can be included in the circuitry of FIG. 21 to power one or more of the illustrated elements. In some embodiments, the battery may be used to partially or even fully recharge the host mobile device 110. In some embodiments, the battery may be used to allow the mobile device case 100 to function without drawing power from the host mobile device 110. In some embodiments, the battery may be used to charge the host mobile device 110. In some embodiments, the battery may be used to charge the host mobile device 110 as well as power the mobile device cover 100.

Some embodiments provide that the one or more analog circuits 490 can include, for example, one or more of the following: an analog signal amplifier and an analog signal filter. Some embodiments of the one or more processors 500 can include, for example, one or more of the following: a main processor, a ROM, a RAM, an analog-to-digital converter, and a PWM module. The one or more processors 500 can be separate circuits or an integrated circuit. The integrated circuit can be part of, for example, a controller (e.g., a microcontroller). Some embodiments of the one or more processors 500 can provide, for example, one or more of the following functions: analog-to-digital converting, digital filtering, Fourier processing (e.g., Fast Fourier Transform (FFT) processing), frequency detection, and PWM driving. The analog-todigital converting and other functions can be performed separately from the processor 500.

In operation according to some embodiments, and referring to FIG. 14, the acoustic sensor 425 of the mobile device cover 100 receives sounds from the speaker 420 of the host mobile device 110. In other embodiments, the acoustic sensor 425 of the mobile device cover 100 can receive sounds from the environment as well. The acoustic sensor 425 converts the sounds into analog signals. The analog circuits amplify and filter the analog signals. The filter can include, for example, an active low pass filter that prevents aliasing (e.g., digital aliasing). Some embodiments provide that the filter can suppress or remove higher frequencies and harmonics. The amplified and filtered analog signals are received by the processor 500. The processor 500 converts the analog signal into a digital signal in functional block 510. In some embodiments, an analog-to-digital converter circuit is used and the output is fed to the processor 500. The analog-to-digital converter circuit or the analog-to-digital converter function of the processor 500 reads in or samples the analog signal. The digital signal is then digitally filtered in functional block 520 before being sent to the FFT processing block in function block 530.

The processor 500 performs FFT processing on the digitally filtered signal. In some embodiments, the processor 500 performs a 128-sample FFT using a particular algorithm (e.g., a Cooley-Turkey type algorithm). During the FFT processing, a frequency spectrum of the signal is calculated. The signal spectrum is then analyzed by the processor 500 in the frequency detection functional block 540. The processor 500 compares the signal spectrum against signal spectrums previously stored in the circuitry 150 (e.g., memory or storage accessible to or part of the processor 500). The stored signal spectrums each corresponds to sounds that correspond to particular callers, particular senders of messages, particular alerts, etc. Stored information about or associated with the particular callers, senders, alerts can also be accessed and possibly displayed or output in some form. Thus, the processor 500 is effectively identifying the particular caller, particular message sender, or the particular alert by matching the received signal with one of the stored digital signatures and stored values corresponding to the particular caller, particular message sender, or the particular alert. For example, a particular caller can correspond to a particular ringtone being provided by the speaker 420 of the host mobile device 110. The generated frequency spectrum corresponding to the particular ringtone can be stored in the circuitry 150 and associated with a particular ILD 160 response (e.g., a particular sequence, pattern, intensities, etc.). When the particular caller calls, the processor 500 can compare the received signal spectrum with the stored spectrum and, based on that comparison, the processor 500 can implement the associated ILD 160 response using the PWM modulator in functional block 550 to drive the ILDs 160. In some embodiments, when the particular caller calls, the processor 500 can compare the received signal spectrum with the stored spectrum and, if there is a match, the processor 500 can implement the associated ILD 160 response using the PWM modulator in functional block 550 to drive the ILDs 160. The associated ILD 160 response can be indicative of the identity of the particular caller.

In operation according to some embodiments, the acoustic sensor 425 converts the sounds into analog signals. The analog circuit 490 amplifies the analog signal which is then read by an analog-to-digital converter (ADC) port on the processor 500. The ADC can be separate from or part of the processor 500. A set number of samples will be taken in a relatively short amount of time which can then analyzed be the processor 500. For each audio signal (e.g., ringtone), there is a signal tone (may or may not be noticeable by the user), which has been inserted in the ringtone (e.g., in front of the ringtone; can be accomplished by the application), that unlocks or that corresponds to a specific light pattern (e.g., selected and associated automatically or by user selection via the application). The signal tone can be, for example, a single frequency tone. In some embodiments, the signal tone that unlocks the corresponding light pattern can include a combination of several different frequency tones that occur sequentially or with at least some overlap (e.g., simultaneously, sequentially adjacent tones overlapping, some tones overlap with some tones but not with other tones, etc.).

In some embodiments, the processor 500 finds at least one of the patterns that the processor 500 recognizes, then the processor 500 causes the light pattern display corresponding to that recognized pattern to be displayed on the mobile device cover 100. In some embodiments, the processor 500 can analyze the samples taken from the analog signal to find a set number of peaks in a timeframe (e.g., a preset time frame) which are a specific time apart. The sampled audio signal patterns and the associated ILD 160 responses can be stored on the host mobile device 110, on the mobile device cover 100 in non-transitory memory located in the host mobile device 110, and on the mobile device cover 100 in non-transitory memory located in the mobile device cover 100. In some embodiments, the patterns can be stored remotely from the host mobile device 110 and the mobile device cover 100 such as in, for example, cloud storage, network storage, etc. In some embodiments, the processor 500 can store the patterns as a series of 32-bit data packages, for example, which are then sent to the drivers 280 that are coupled to the ILDs 160. The associated ILD 160 response is indicative of a particular event (e.g., the identity of the particular caller or sender, a calendar event, etc.).

In some embodiments, the processor 500 performs analog-to-digital conversion on the amplified signal received from the microphone 410 on the mobile device cover 100. The processor 500 can take a large number of samples in a short time to create a digital representation of the analog signal (e.g., an audio signal curve). The obtained digital representation (e.g., digital image, digital data, etc.) is then compared to a set of reference parameters (e.g., stored parameters) to check for a match. If there is a match or a substantial match, the processor 500 activates the light display pattern that corresponds (e.g., is associated) with the matched reference pattern, which can, for example, correspond or be associated with a particular ringtone. The processor 500 can analyze the digital representation of the analog signal for one or more of the following for comparison: time elapsed between peaks, amplitude of peaks, average amplitude of peaks, DC offset, frequency composition, etc. In some embodiments, the processor 500 uses one or more of the above parameters (or others) to evaluate if the sample audio is at the correct frequency corresponding to a pattern or not. In such a manner, the processor 500 of the mobile device cover 100 can identify a particular event (e.g., a particular caller or sender, alert, notification, type of communication, etc.) by the ringtone or sound that is played by the host mobile device 110. In other embodiments, the processor 500 uses one or more of the above parameters (or others) to evaluate and compare the sample audio. In such a manner, the processor 500 of the mobile device cover 100 can identify a particular event by the sound that is captured by the microphone 410. Once a particular event is identified, the processor 500 can cause information to be output by the mobile device cover 100. In some embodiments in which the mobile device cover 100 has one or more screens, the processor 500 can cause, for example, a text message to appear on the mobile device cover 100 if the processor 500 identifies an incoming text message. In some embodiments, the processor 500 can cause incoming information to be displayed, for example, the text of a news story or a sports score or update to appear on a screen of the mobile device cover 100 if the processor 500 identifies an incoming news story alert or an incoming sports score or update alert.

Some embodiments can provide a direct serial link, for example, between the mobile device cover 100 and the host mobile device 110 using the connector 460, thereby enabling data being shared between the mobile device cover 100 and the host mobile device 110.

The application running on the host mobile device 110, in some embodiments, enables the user to select a specific light pattern or video with a specific caller. In some embodiments, this can be accomplished by entering the phone number of the specific caller or sender or directly selecting the person from a contacts list on the host mobile device 110. In some embodiments, when the host mobile device 110 receives a call or text message from the specific caller, for example, the application can send data (e.g., name of caller, message content, time received, etc.) to the mobile device cover 110 which can display the message on the ILDs 160. This can occur independently of the use of an acoustic sensor 425 and analog circuit 490, for example. In other embodiments, when the host mobile device 110 receives a call, text, email, from the specific caller, for example, the application can send data (e.g., name of caller, message content, time received, etc.) to the mobile device cover 110 to be processed by the processor 500, compared to stored values, and then displayed based on that comparison and any user set settings via ILDs 160. In some embodiments, the mobile device cover 100 may receive a TV, cable, satellite, video, multimedia, application, etc. signal and display it on any a number of its ILD 160 (e.g., in the form or as part of an LED array, LCD screen, OLED display, etc.), on a screen of the host mobile device 110, or both.

In some embodiments, the application can provide functionality including, but not limited to, changing the color of the ILDs 160, changing the timing or speed of lighting of the ILDs 160, changing the brightness of the ILDs 160, assigning ring or text tones to a contact, choosing and assigning ILDs 160 and light pattern(s) to specific contacts, specific notifications, etc., assigning a song as a ringtone or text-tone, cutting the chosen song to a specific size, choosing from a pattern and ringtone combination from an existing selection, testing a ringtone or text-tone, saving the created ringtone or text-tone, etc. The application can be adapted to run on a plurality of platforms such as iOS, Android, Windows Phone, Blackberry OS, etc.

Figure 15:
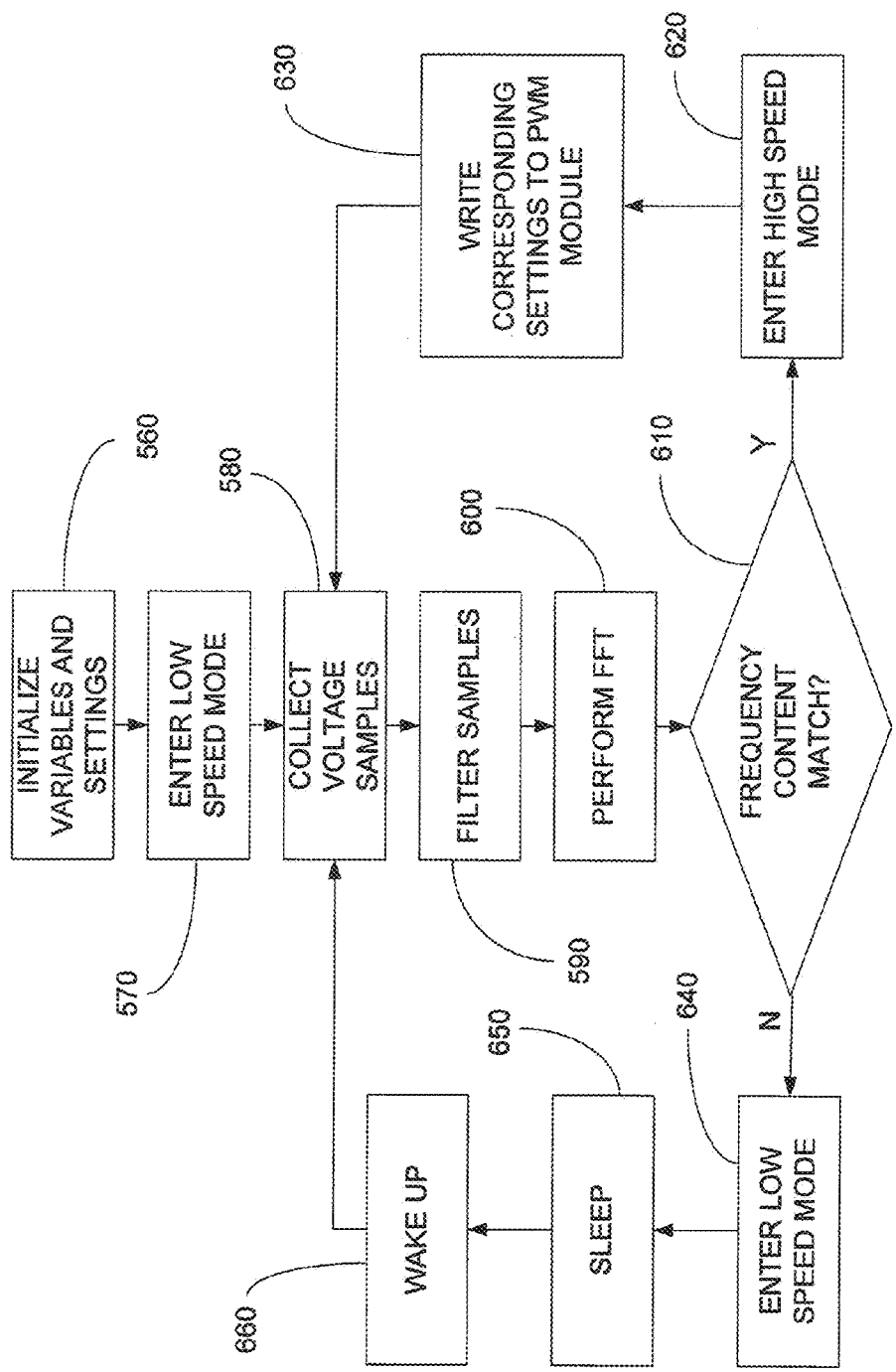
FIG. 15 illustrates a flow diagram of an embodiment of a process performed in a mobile device cover according to the present disclosure.

FIG. 15 illustrates a flow diagram of an embodiment of a process performed in a mobile device cover 100 according to the present disclosure. Some embodiments provide that the processor 500 executes a program that follows one or more of the steps in FIG. 15. The program can be stored, for example, in the processor 500, non-transitory memory, etc. In step 560, at start up, the processor 500 (e.g., a microcontroller) initializes relevant variables and settings. Initialization can occur, for example, when a switch or button on the mobile device cover 100 or the host mobile device 110 is actuated, thereby restarting or powering up the mobile device cover 100, the host mobile device 110, or both. In step 570, the processor 500 sets one of its oscillators or clocks to a low speed mode (e.g., low frequency mode, low clock rate mode, low power mode, etc.) to conserve power. The processor 500 then operates in the low speed, power saving mode. In step 580, an analog signal received from the acoustic sensor 425 is sampled. For example, the processor 500 collects voltage samples of the analog signal (e.g., audio signal, acoustic signal, etc.). In step 590, the processor 500 digitally filters the collected samples. In step 600, the processor 500 performs an FFT on the filtered samples and determines the frequency spectrum of the filtered samples. The frequency spectrum is representative of the frequency content of the sounds generated by the speaker 420 of the host mobile device 110. In query 610, the processor 500 determines whether the frequency content of the determined frequency spectrum matches or substantially matches, in whole or in part, the frequency content of a coded signal (e.g., a stored frequency spectrum of the coded signal).

If there is a match between the frequency content of the determined frequency spectrum of the current sounds being generated by the speaker 420 and the stored frequency spectrum, then, in step 620, the processor 500 sets one of its oscillators or clocks to a high speed mode (e.g., high frequency mode, high clock rate mode, high power mode, etc.). The processor 500 then operates in a high speed, high power mode. In step 630, the processor 500 writes control settings to the PWM module, which might or might not be part of the processor 500, to drive the ILDs 160 according to the output (e.g., a particular sequence, colors, and intensities) associated with the matched coded signal. For example, a particular ring tone of a particular caller is frequency-spectrum or frequency-content matched with the frequency spectrum or frequency content of a stored coded signal representing the particular ring tone which, in turn, is associated with a particular sequence, pattern of ILDs 160, colors, intensities, etc. The particular sequence, pattern, color, intensities, etc. of ILDs 160 are then used by the processor 500 to drive the ILDs 160. The high speed mode of the processor 500 and the particular output of the mobile device cover 100 continue while the processor 500 receives the coded signal as shown in the loop back to step 580.

If there is not a match between the frequency content of the determined frequency spectrum of the current sounds being generated by the speaker 420 and the stored frequency spectrum, then, in step 640, the processor 500 sets one of its oscillators or clocks to a low speed mode (e.g., low frequency mode, low clock rate mode, low power mode, etc.) or the oscillator or clock continues to operate in the low speed mode. The processor 500 operates in the low speed mode. In step 650, the processor 500 enters a sleep mode for a set amount of time. In step 660, the processor 500 wakes up from the sleep mode and checks for a coded signal in step 580. The process then loops if no coded signal is matched.

Some embodiments provide that noise or sounds from the ambient environment can be detected and sampled, but will not cause any ILDs 160 to light up since the ambient noise or sounds do not match any of the digital signatures and stored values in the mobile device cover 100 or the host mobile device 110 or because the user has turned off this function. In some embodiments, the noise or sounds from the environment can be detected and sampled, in order to cause any ILDs 160 to light up based on digital signatures and stored values in the mobile device cover 100 or the host mobile device 110. This feature can require the user to specify when this is on and working by using a push button, voice activation, mobile application, etc.

Some embodiments provide that only some of the ringtones, other sounds generated by the speaker 420 of the host mobile device 110, or specific callers or notifications along with ILD controls, etc. are stored as coded signals in the mobile device cover 100 and the host mobile device 110. Thus, the enhanced indication or alerts provided by the ILDs 160, for example, of the mobile device cover 110 can be reserved for a subset of identified callers, message senders, or alerts.

Some embodiments provide that the stored coded values and digital signatures including, for example, the frequency spectrum of the coded signals, specific callers or notifications along with ILD controls, etc. can be downloaded into the mobile device cover 100 from the host mobile device 110, a computer connected to the mobile device cover 100, or the host mobile device 110 through a wired or wireless connection. In some embodiments, this allows the host mobile device 110 to overwrite, change, replace, add, etc. any previously stored digital signatures and stored values. This can be done via a mobile application running on the host mobile device 110.

Some embodiments provide that the stored coded signals, digital signatures, and stored values including, for example, the frequency spectrum of the coded signals can be obtained by training the mobile device cover 100 for each coded signal. For example, if an enhanced alert or indication is desired for a particular ring tone associated with identity of a particular caller, then the mobile device cover 100 can be trained with the particular ringtone. The mobile device cover 100 can save the frequency spectrum or frequency content of the particular ring tone as a coded signal in a non-transitory memory of the mobile device cover 100 and the host mobile device 110. This can be done for all or a subset of all possible sounds generated by the speaker 420. Furthermore, some embodiments provide for associating the stored coded signal with a set of stored ILD 160 lighting patterns and sequences. The stored ILD 160 lighting patterns and sequences or the code related thereto can be stored in the mobile device cover 100, the host mobile device 110, or both. Some embodiments provide that the stored ILD 160 light patterns and sequences or the code related thereto can be downloaded from the host mobile device 110, which can be connected to a communication network (e.g., a telecommunications network, the Internet, a hotspot, etc.) or from a desktop connected to the host mobile device 110 or the mobile device cover 100 and to the communication network.

Some embodiments provide that the mobile device cover 100 can access non-transitory memory or storage in host mobile device 110. Thus, coded signals, ILD 160 lighting patterns and sequences, and related code or instructions can be stored in the mobile device cover 100 and in the host mobile device 110. Signal communications can be facilitated, for example, through the connector 430.

Figure 22:
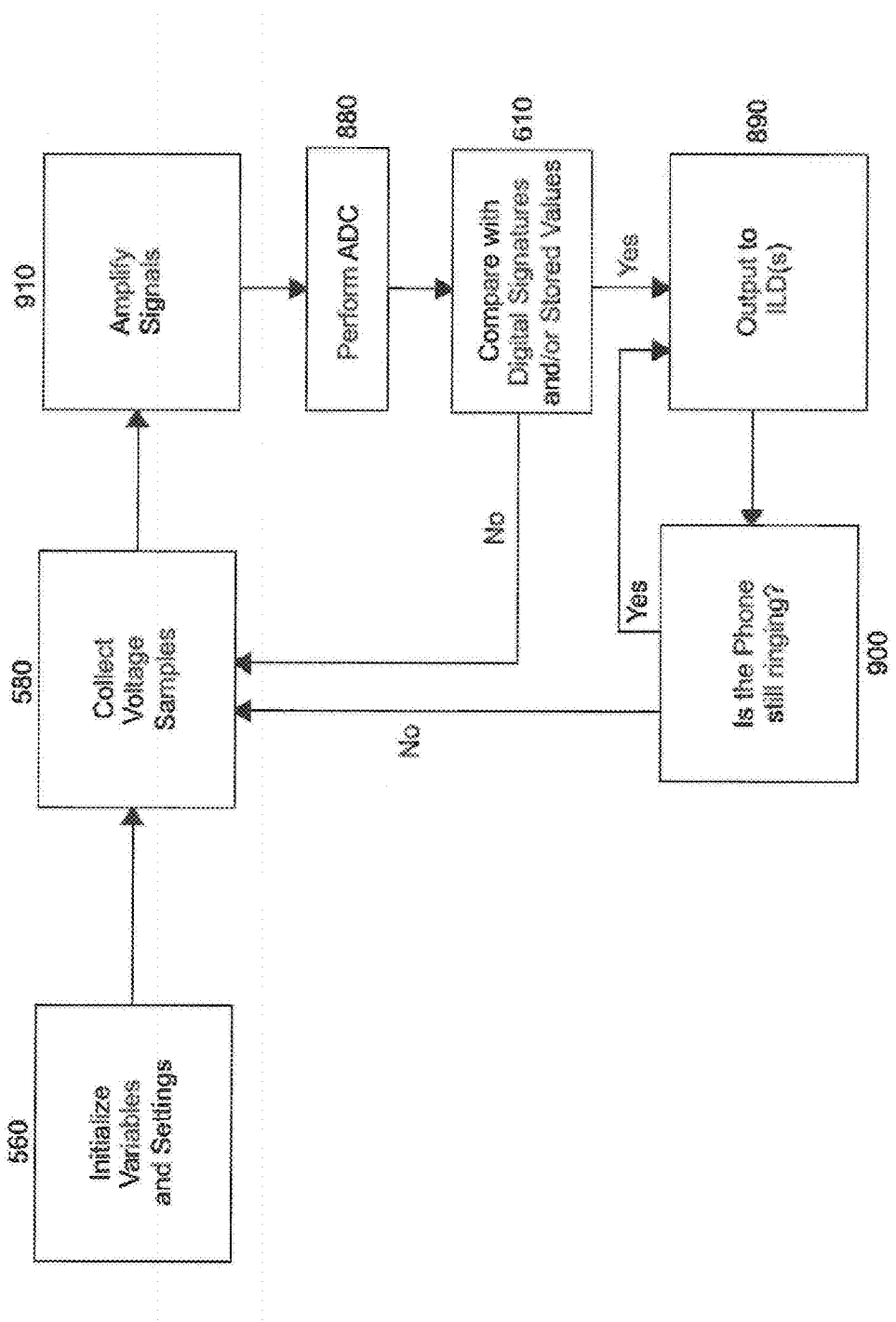
FIG. 22 illustrates a flow diagram of an embodiment of a process performed in a mobile device cover according to the present disclosure.

FIG. 22 illustrates a flow diagram of an embodiment of a process performed in a mobile device cover 100 according to the present disclosure. Some embodiments provide that the processor 500 executes a program that follows one or more of the steps in FIG. 22. Some embodiments provide that the processor 500 executes the program according to at least some of the steps in FIG. 22, but not necessarily in the order shown.

The program can be stored, for example, on the processor 500, non-transitory memory, or both. In step 560, at start up, the processor 500 initializes relevant variables and settings. Initialization can occur, for example, when the host mobile device 110 wakes up from a sleep state. In some embodiments that employ a lighting connector, initializations can include IAP2 communication between an Apple device and the mobile device cover 110. In step 580, an analog signal received from the acoustic sensor 500 (or possibly from the host mobile device 110 as an electrical signal, analog signal, digital signal, message, etc.), is collected (e.g., received, sampled, etc.). Before being passed onto the processor 500, the collected signal is amplified in step 1000 which may include passing it through an operational amplifier 490. In step 880, the processor 500 performs ADC on the amplified signal and analyzes the digital signal. In some embodiments, the analysis can include, for example, counting the number of peaks detected in the wave, amplitude of the peaks, time elapsed between them, etc. Using this information, in step 610, the processor 500 can evaluate and compare this processed digital signal to one or more of the digital signatures and stored values according to some embodiments.

In some embodiments, the comparison of the identifiers listed above, such as number of peaks and time elapsed between them, then, in step 890, the processor 500 can then determine the pattern sequence that corresponds to the matched identifiers and write the corresponding pattern sequence into the drivers 280. The drivers 280 are linked directly to the ILDs 160 and cause the ILDs 160 to display the corresponding pattern or video. In some embodiments, the driver 280 can be a shift register. In some embodiments, after the pattern has met a condition (e.g., played once, a preset number of times, a certain duration, etc.), the processor 500 checks, in step 900, if the host mobile device 110 is still ringing. This can be accomplished in some embodiments by sending a query to the respective host mobile device 110 in use. If the response is positive and the host mobile device 110 is still ringing, the processor can rewrite the corresponding sequence onto the drivers 280 described in step 1000. This loop can continue until the host mobile device 110 responds with a negative outcome in step 900. The processor 500 can then loop back to step 580 where the process starts again with collecting audio signals (e.g., voltage, voltage samples, etc.).

In some embodiments, the loop shown in FIG. 22 can continue until the host mobile device 110 enters a sleep mode after a predetermined amount of time. In some embodiments, if no audio signals are received by the audio sensors 425 or if no frequency matches occur in step 610 for a predetermined amount of time, the mobile device cover 110 enters the sleep mode. In sleep mode, the power to the mobile device cover 100 is turned off or reduced, and the circuitry on the mobile device cover 100 is turned off or using less power. In some embodiments, the processor 500 on the mobile device cover 100 can run at a slower speed to conserve energy. When the host mobile device 110 exits its sleep mode, the processor 500 will initialize again as described in step 560. In some embodiments, the processor 500 can run at a faster speed.

Figure 16:
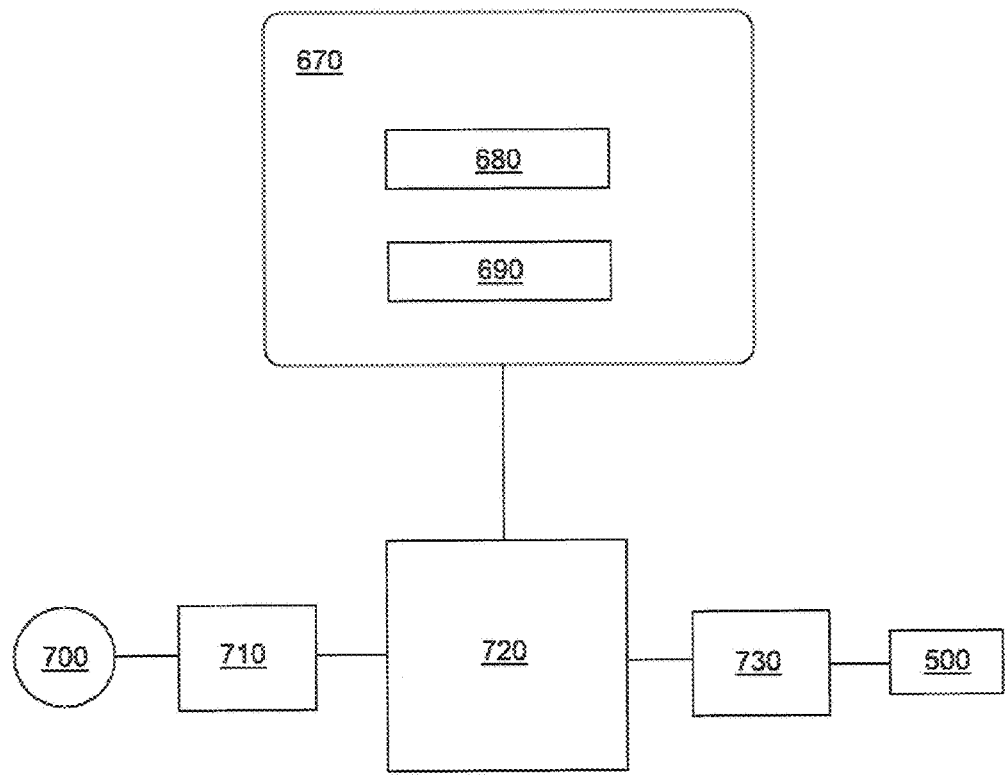
FIG. 16 illustrates an embodiment of some of the circuitry in a mobile device cover according to the present disclosure.

FIG. 16 illustrates an embodiment of some of the circuitry 150 in a mobile device cover 100 according to the present disclosure. The circuitry 150 can include, for example, a power circuit 670 that includes connections 680 configured for a first button or switch and connections 690 configured for a second button or switch. In some embodiments, the first button or switch is part of the mobile device cover 100 and turns the power on or off for the mobile device cover 100; and the second button or switch is part of the mobile device cover 100 and turns the host mobile device 110 on or off. In other embodiments, the first button or switch 670 can enable the battery 170 to power either the mobile device cover 100 or the host mobile device 110, and the second button or switch 680 can disable the battery 170; and this embodiment may be arranged on the circuitry 150 in the mobile device cover 100 differently than shown.

The circuitry 150 can include connections 700 configured for receiving signals from the acoustic sensor 425 (e.g., a microphone). The connections 700 is also configured to connect to an input of an analog signal amplifier 710 which, in turn, is connected to an input of an analog filter 720 (e.g., an active analog low pass filter, an anti-aliasing filter, etc.). The analog signal amplifier 710 and the analog filter 720 can be part of the one or more analog circuits 490. The circuitry 150 can include connections 730 configured for connecting to an input to the processor 500.

Figure 17:
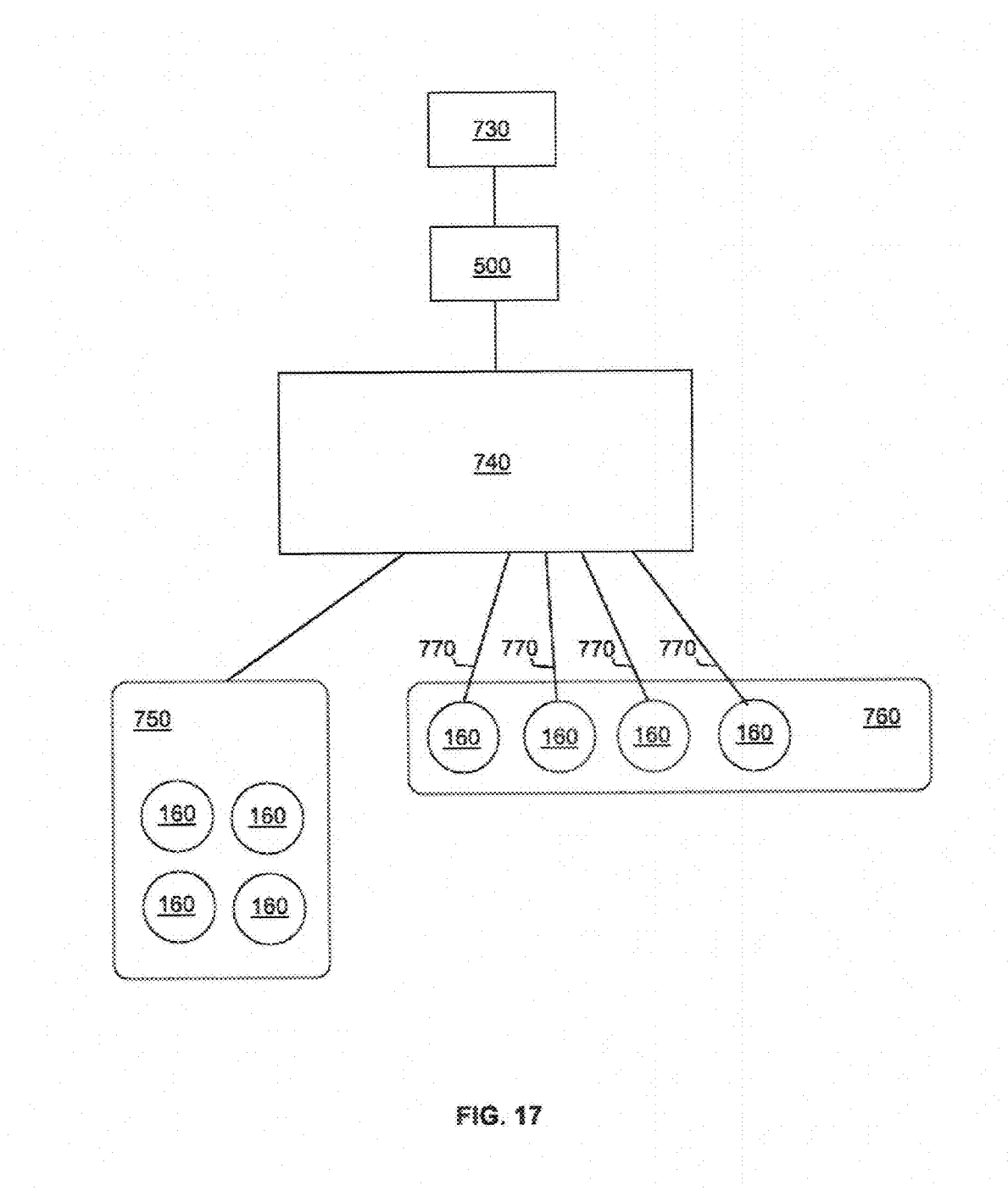
FIG. 17 illustrates an embodiment of some of the circuitry in a mobile device cover according to the present disclosure.

FIG. 17 illustrates an embodiment of some of the circuitry 150 in a mobile device cover 100 according to the present disclosure. The circuitry 150 can include the connections 730, which is also shown in FIG. 16. Some embodiments provide that the circuitry 150 include that the processor 500 includes a controller 740 (e.g., a microcontroller). In some embodiments, the controller 740 is connected to a first set 750 of ILDs 160 and a second set 760 of ILDs 160. The first set 750 of ILDs 160 are controlled and driven by the controller 740. In some embodiments, up to eight LEDs can be driven at a time by the one demultiplexer. Some embodiments use demultiplexers to conserve output ports of the controller 740. The second set 760 of ILDs 160 are individually controlled and driven by the controller 740 through individual control lines 770. Some embodiments use group-controlled LED, individually controlled LED, or some combination thereof. Some embodiments use LED drivers 910 that are separate from the controller 740 to drive individual LEDs or groups of LEDs. In some embodiments, as shown in FIG. 26, combinations of similar or different drivers 280 may be utilized in order to arrange and control each ILD 160 individually in a grid format.

Figure 23:
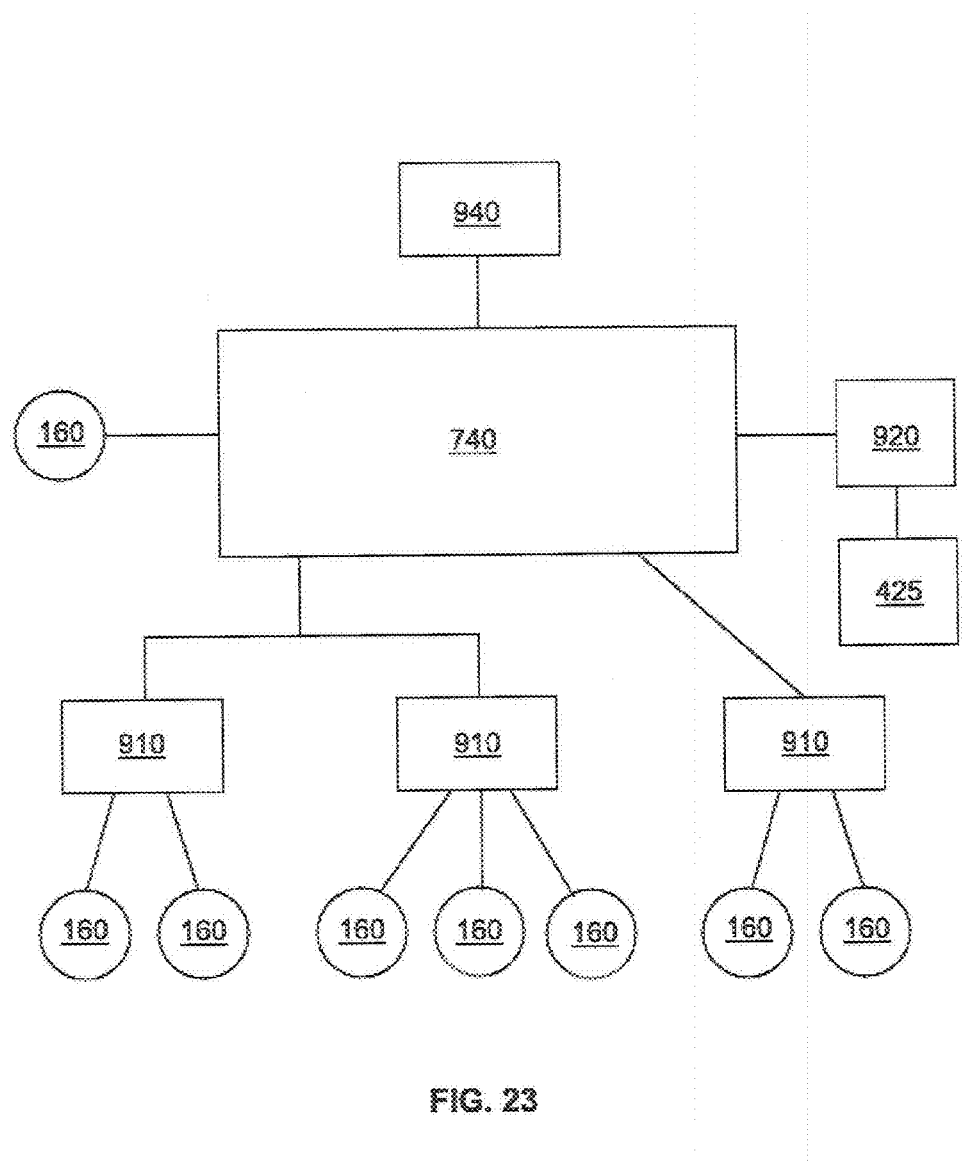
FIG. 23 illustrates an embodiment of some of the circuitry in a mobile device cover according to the present disclosure.

FIG. 23 illustrates an embodiment of some of the circuitry 150 in a mobile device cover 100 according to the present disclosure. Some embodiments provide that one or more of the elements illustrated in FIG. 23 be part of a single integrated circuit chip or a system on a chip (SoC).

Some embodiments provide that the circuitry 150 includes that processor 500 includes a controller 740 (e.g., a microcontroller). The controller 740 is connected to the drivers 280 which are linked to the ILDs 160. In some embodiments, there is a single data line to the drivers 280 as they are linked in series. In some embodiments the drivers can drive a plurality of LED ILDs 160. The Lightning connector 940 is connected to the controller 740 to enable power from the host mobile device 110 to flow to the circuitry 150. The operational amplifier circuitry 920 connects to an acoustic sensor 425 to amplify the signals received by the acoustic sensor 425 before the signal is passed through to the controller 740 for analysis.

Some embodiments according to the present disclosure may relate to, for example, a mobile device cover that includes an acoustic sensor, a processor 500, and ILDs 160. The processor 500 can be operatively coupled to the acoustic sensor 425 and the ILDs 160. The acoustic sensor 425 is configured to receive sound generated by the host mobile device 110 and to convert the sound into an analog signal. The processor 500 is configured to receive the analog signal and to determine whether the analog signal is similar to one of a plurality of digital signatures and values previously stored on the mobile device cover 100, wherein each of the previously stored digital signature and value can be is indicative of a particular caller, a particular message sender, or a particular alert. Based on the determination, the processor 500 is configured to cause lighting of the one or more ILDs 160 corresponding to the indicated caller, indicated message sender, or indicated alert.

Some embodiments provide that the ILDs 160 on the mobile device cover 100 may allow users to scroll through or change the ILD 160 information via commands. These commands can be in the form of touch, verbal, motion, etc. and in some embodiments, can allow the user to open and engage in a notification even further via the host mobile device's 110 main screen or the mobile device covers 100 ILDs 160.

Some embodiments provide that the ILDs 160 on the mobile device cover 100 may be utilized as advertising space for companies, mobile applications, etc. In some embodiments, this advertising space may be decided based on user preferences or user specified preferences or usage.

Figure 40:
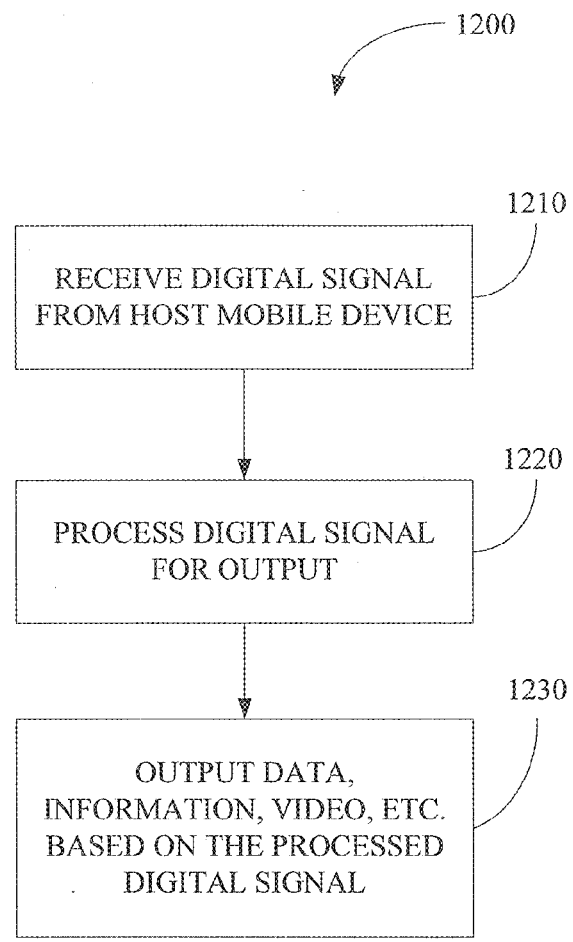
FIG. 40 illustrates a flowchart of an embodiment of a method for outputting information, data, or content on a mobile device cover according to the present disclosure.

FIG. 40 shows a flowchart of an embodiment of a method 1200 for outputting information, data, or content on a mobile device cover 100 according to the present disclosure.

In step 1210, the mobile device cover 100 receives a digital signal from the host mobile device 100. The digital signal can include, for example, information, data, or content. In some embodiments, the digital signal can include, for example, one or more of the following: an incoming message, an email, a text message, a video message, a voicemail message, a missed call message, caller identification information, sender identification information, content information, phone number information, communication type information, an alert, a missed call alert, a message waiting alert, a calendar alert, an appointment alert, a meeting alert, a mobile application alert, a notification, an indicator, a message, a picture, an image, a text, an icon, a graphic, live streaming video, stored video, a video message, a sports video, multimedia content, audio content, music content, animated content, voice content, tone content, etc. In some embodiments, the digital signal is received by processor 200 via one or more buses 230 and via one or more ports of the mobile device cover 100, for example, when the host mobile device 110 is inserted into the mobile device cover 100 and is in communication with the mobile device cover 100. In some embodiments, since the digital signal is received by the processor 200 from the host mobile device 110, it does not have to pass through an analog-to-digital converter.

In step 1220, the digital signal is processed by the processor 200 for output on the ILDs 160, other output devices, or a combination thereof. In step 1230, the processor 200 causes mobile device cover 100 to provide one or more outputs based on the digital signal.

In some embodiments, the ILDs 160 can form or can illuminate one or more screens (e.g., a main screen or display) and can emit different colors with different intensities. In some embodiments, the ILDs 160 can form pixels of a display. In some embodiments, the ILDs 160 can form or can illuminate one or more screens on the side of the mobile device cover 100 that faces away from the host mobile device 110. See, e.g., FIGS. 37 and 38. In some embodiments, the ILDs 160 can form or can illuminate one or more screens that run along the bumper band 320, side, or edge of the mobile device cover 100. Thus, for example, the digital signal can include different types of information or data in which the different types of information or data can be displayed on the main screen (e.g., a first screen) and the other screen (e.g., a second screen) that runs along the bumper band 320. In some embodiments, the digital signal can include, for example, video content and other data or information. The video content can be displayed on the first screen, and the other data or information can concurrently be displayed on the second screen. The second screen can support, for example, scrolling data that moves from one end side of the screen to another end side of the screen on the same side of the mobile device cover 100, or scrolling data that moves from one side of the mobile device cover 100 to different side of the mobile device cover 100. Thus, for example, sports scores, stock prices, weather data, notifications, message data, email data, data, information, indicators, etc. can be received as a digital signal from the host mobile device 110 and displayed in a scrolling manner and, possibly, in a repeating scrolling manner across the second screen, which might cover more than one side of the mobile device cover 100.

In some embodiments, the two screens can act in concert or can act independently. As noted above, for example, video can be displayed on the main screen while data is independent displayed on the second screen. In some embodiments, the two screens can act together to display the information. For example, the main screen may display the body of a text message or may display the video of a message and the second screen can display information such as the sender and time stamp on the text message or video message. In another example, the main screen may display a movie, television program, satellite program, or cable program, and the second screen may display subtitles.

As noted in step 1220, the digital signal is processed by the processor 200 for output via other output devices. For example, other output devices can include a speaker of the mobile device cover 100. The processor 200 can process the digital signal and cause the speaker to produce sounds, tones, music, etc. which can serve as alerts, notifications, indicators, etc. based on data in the digital signals such as caller identification, data sender, calendar alerts, etc. Further, the ILDs 160 can form individual lights or groups of lights. The processor 200 can process the digital signal and cause one or more lights on the mobile device cover 100 to light up to indicate, for example, an incoming call, a missed call, an incoming text, an incoming video message, an alert, a notification, etc.

Further, as noted in step 1220, the digital signal can be processed by the processor 200 for output in a combination of output devices. For example, the processor 200 can receive a digital signal that includes a video that can be displayed on the main screen and also output on the speaker of the mobile device cover 100. In another example, an incoming text can light up one or more lights to indicate an incoming text, display the body of the text on the main screen, and display other information (e.g., time stamp information, date information, sender information, etc.) on the second screen of the mobile device cover 100.

In some embodiments, the screens or other output devices of the mobile device cover 100 can operate instead of or in combination with the screens or other output devices of the host mobile device 110. The screens or the other output devices of the host mobile device 110 can concurrently either not provide output or can provide a different output than the output of the mobile device cover 100. For example, a movie can be watched on the mobile device cover 100 while other data or information is displayed on a screen of the host mobile device 110. In another example, a movie that was being watched on the host mobile device 110 can be "pushed" or transferred to being watched on the main screen of the mobile device cover 100. In yet another example, the movie can be displayed on the screens of both the mobile device cover 100 and the host mobile device 110. In some embodiments, the screens or other output devices of the mobile device cover 100 can operate in concert with each other. For example, an email alert can be sounded using a speaker of the host mobile device 110, while the text of the email can be displayed on one or more screens of the mobile device cover 100.

Figure 36A:
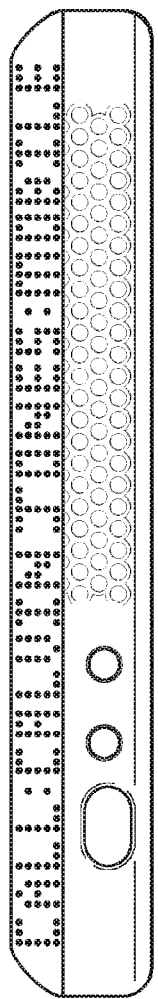
FIG. 36A illustrates an edge view of an edge display of the mobile device cover in accordance with an embodiment of the present disclosure.
Figure 36B:
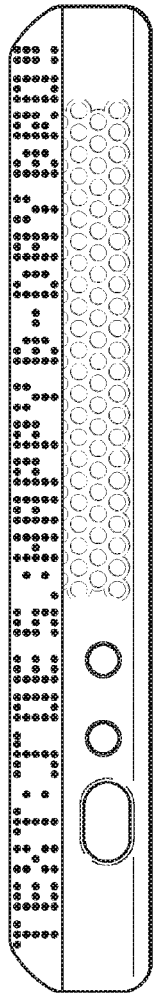
FIG. 36B illustrates an edge view of an edge display of the mobile device cover in accordance with an embodiment of the present disclosure.
Figure 36C:
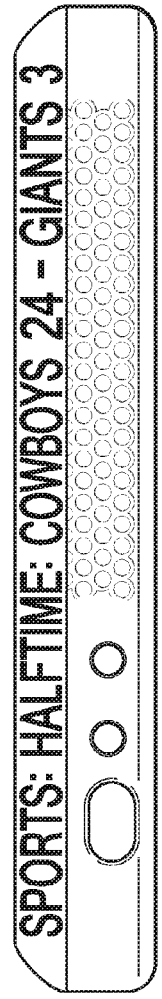
FIG. 36C illustrates an edge view of an edge display of the mobile device cover in accordance with an embodiment of the present disclosure.

FIGS. 36A-C illustrate embodiments of the mobile device cover 100 according to some aspects of the present disclosure. Depicted are edge-lit ILDs 160 according to disclosure. The mobile device cover 100 can be configured with different waveguides, prisms, reflectors, lenses, one-way mirrors, diffusers, and other optical influencers. In one embodiment, the case (e.g., an opaque case) can act as a diffuser, for example, and the light from one or more of the ILDs 160 when illuminated will be visible throughout the mobile device cover 100. Some embodiments provide that the illumination of ILDs 160 may be in the form of text or video that can display specific information to the user about the incoming message, alert, notification, etc. Some embodiments provide that the user can specifically select how each incoming message, alert, notification, etc. should be displayed on the mobile device cover 100. In some embodiments, the edge-lit ILDs 160 wrap around the entire case and can scroll text, images, icons, graphics, etc., or can provide video. Some embodiments allow the user to control which message, alert, notifications, etc. are displayed on which part of the mobile device case 100. Some embodiments allow the user to set the edge-lit ILDs 160 to scroll information across the mobile device case 100. Some embodiments allow the user to change or sort through multiple notifications via voice, hand gestures, or swiping on the notifications.

Figure 37:
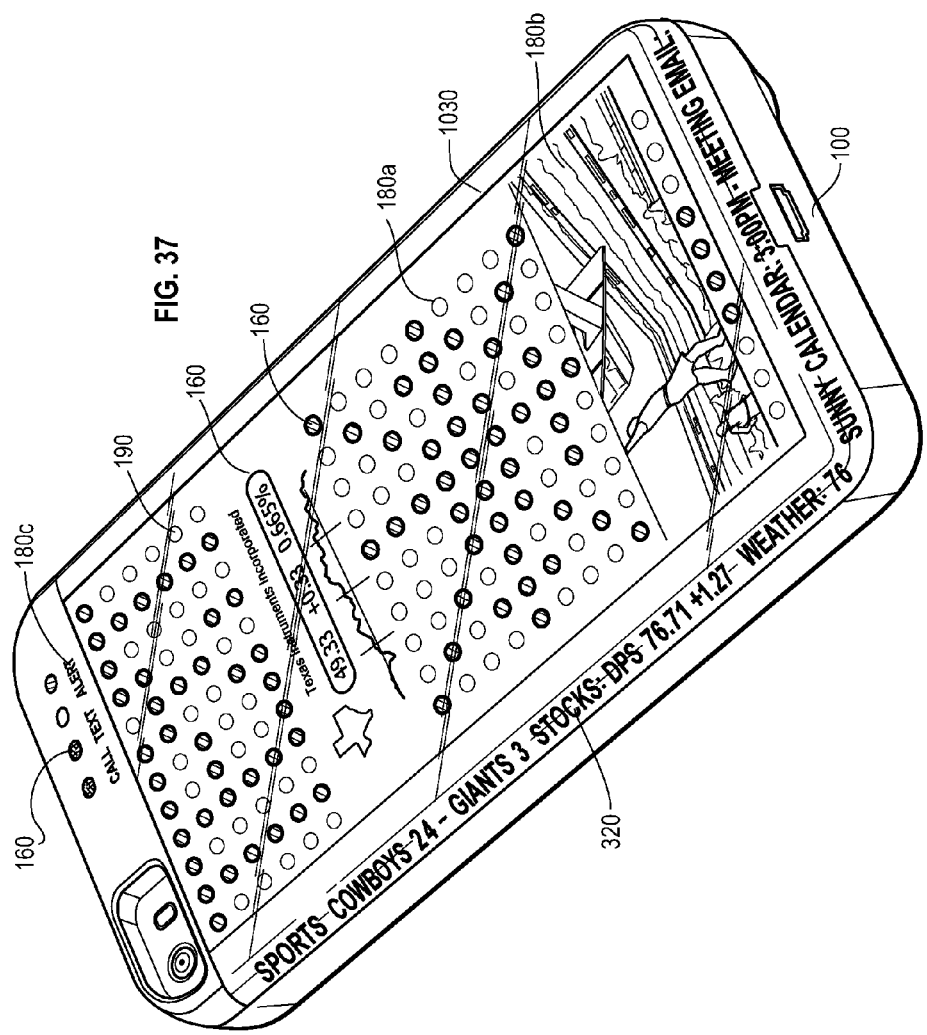
FIG. 37 illustrates a mobile device cover in accordance with an embodiment of the present disclosure.
Figure 38:
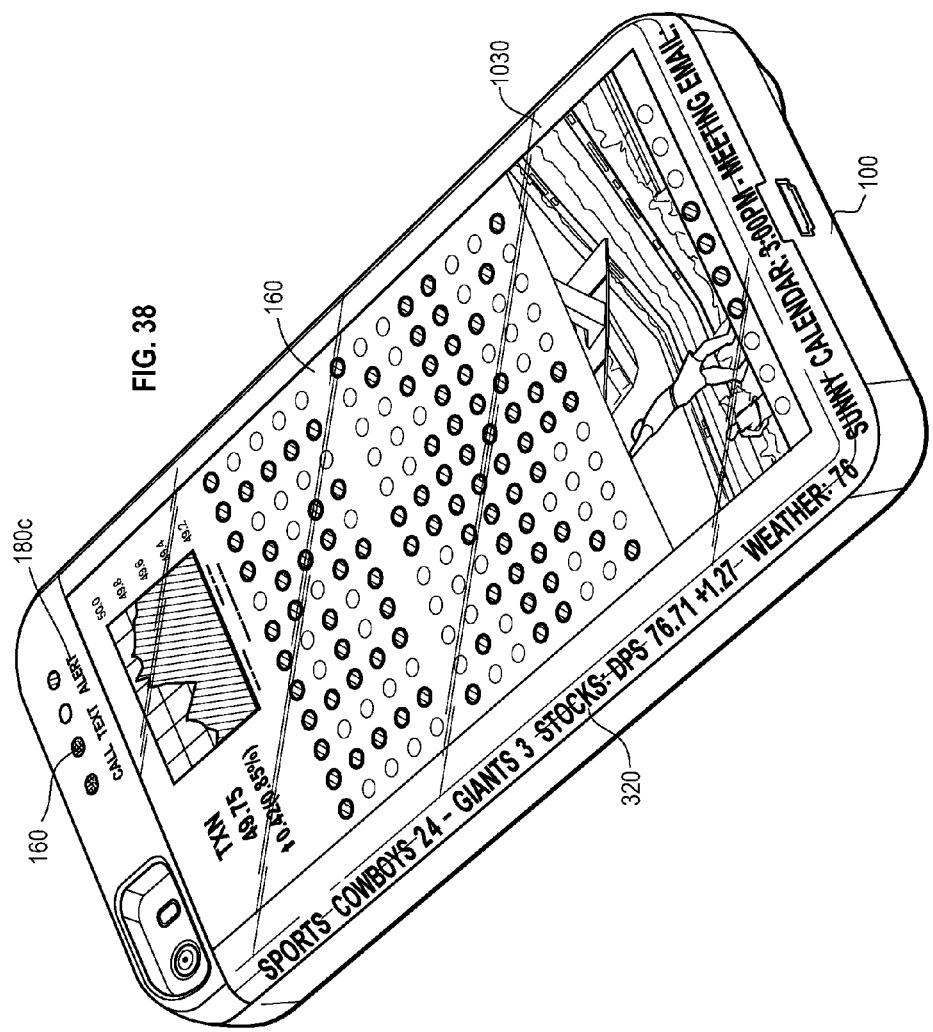
FIG. 38 illustrates a mobile device cover in accordance with an embodiment of the present disclosure.

FIGS. 37 and 38 illustrate some embodiments of the mobile device cover 100 according to some aspects of the present disclosure. Referring to FIGS. 37 and 38, a translucent back cover 1030 with multiple different ILDs 160, multiple beads 180*a*, 180*b*, 180*c*, and 190, and bumper band 320. The ILDs 160 can take many forms (e.g., LEDs, LCD display, LCD touch screen display, RGB LEDs, etc.) and are illuminated through the translucent back cover 1030 and possibly the beads 180*a*, 180*b*, 180*c*, and 190 as well, to be displayed to the user on the mobile device case 100. Bead 180*a* is depicted as a translucent cover. Bead 180*b* is depicted as a translucent cover or a one-way mirror cover. Bead 180*c* is depicted as a waveguide. Bead 190 is depicted as a crystal, prism, or jewel cover. The bumper band 320 utilizes ILDs 160 (e.g., LEDs, RBG LEDs, LCD display, touch screen display, etc.) to display text and information about notifications or alerts to the user. In some embodiments, the ILDs 160 can be user programmed to display certain information, notifications, or alerts at any given time in response to received information, notifications, or alerts, for example. In one embodiment, ILDs 160 that are at the top right of the mobile device case 100 are programmed to light up in different colors. The user, for instance, can set up the mobile device cover 100 to provide red illumination via the ILDs 160 for an incoming call. The user can also set up the mobile device cover 100 to have a bead 180*c* light up the corresponding text (e.g., call, text, and alert) when receiving that particular incoming call, text, or alert on the host mobile device 110. In one embodiment, for example, the beads 190 in view of user preference can light up the word "TEXT" to indicate that a text message has been received by the host mobile device 110. The incoming text message information can then be scrolled along the ILDs 160 (e.g., on a display on the back cover 1030 or on a display along the edge of the mobile device cover 100). In some embodiments, one or more of the screens of the mobile device cover 100 can display personal information such as upcoming calendar appointments, reminders, weather, etc. and is able to be scrolled by the user via voice commands, host mobile device 110 buttons, mobile device cover 100 buttons, or via the touch screen of the host mobile device 110, the mobile device cover 100, or both. The beads 180*a* can be programmed by the user to display different ILD 160 patterns based on incoming notifications.

Figure 39:
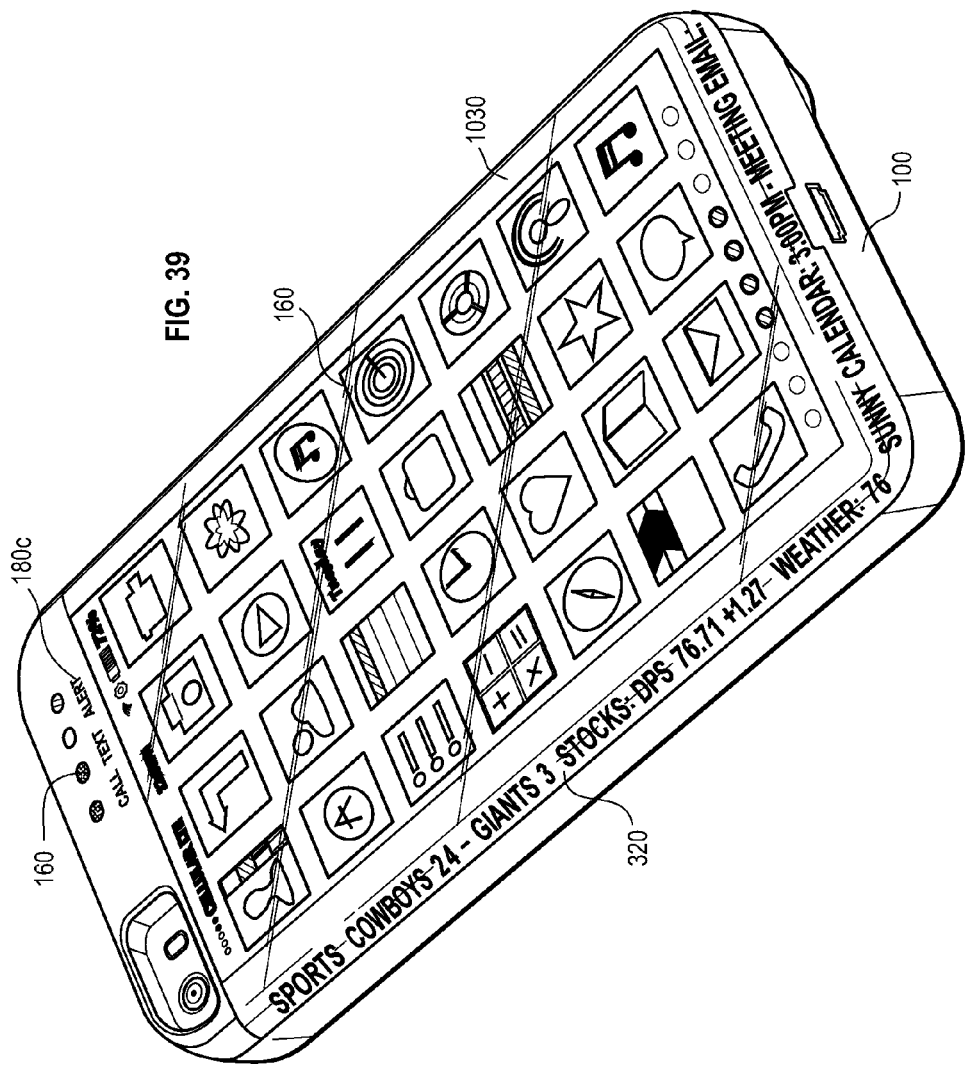
FIG. 39 illustrates a mobile device cover in accordance with an embodiment of the present disclosure.

The mobile device cover 100 can have one or more screens (e.g., displays, ILD 160*s*, etc.). The screen, illustrated at the bottom of the mobile device cover 100 in FIGS. 37 and 38, can be programmed (e.g., configured, set up, etc.) by the user to be a screen that uses less power than the screen of the host mobile device 110 and can have specific information, video, pictures, etc. on it. The screen of the mobile device cover 100 can be configured to be a copy (e.g., an exact or similar copy) of the screen of the host mobile device 110 and to act (e.g., exactly or similarly) like the screen of the host mobile device 110. In some embodiments, the screen configuration can be controlled by the user via an application to set specific design, layout, notifications, etc. FIG. 39 shows an embodiment of the mobile device cover 100 in which the ILD 160 illuminates or forms a screen on the back cover 1030 of the mobile device cover 100 that mirrors the screen of the host mobile device 110. In one embodiment, the screen of the mobile device cover 100 can be a touch screen and the illustrated icons can be manipulated and function just as on the touch screen of the host mobile device 110. In one embodiment, the screen on the mobile device cover 100 need not mirror the screen on the host mobile device 110. The screens can act independently of each other or can selectively function in similar ways. In one embodiment, the user can use the screen of the mobile device cover 100 to watch a live or recorded televised sports game or other videos. In some embodiments, videos, pictures, mobile applications, etc. can be selected by the user to be "pushed" from the screen of the host mobile device 110 to the ILD 160 screen of the mobile device cover 100 depicted in FIGS. 39 and 1A. By "pushing" this content to the back, in some embodiments, this allows the user to have additional features such as: a larger screen, more options displayed, more input options, customized input options using the touch screen, capacitive touch, other buttons, etc. In some embodiments, the application can allow the users create specific input options, display options, etc. In some embodiments, the "pushed" video, pictures, mobile applications, etc. from the host mobile device 110 to the mobile device cover 100 may have different designs, styles, layouts, filters, etc. applied to them that are customizable by the user. In some embodiments, the customizations described above may be programmed by the user on the application. The row of ILDs 160 underneath the screen at the bottom of the mobile device case 100 can be used, for example, to display an energy level of the battery 170. The bumper band 320 can be programmed by the user to display sports, stock, weather, calendar, and email notifications to him in a scrolling form around the mobile device case 100. This can be set to occur at specific times such as when notifications arrive, predetermined times, when certain conditions are satisfied, or at random times. All of the different ILDs 160 can be manipulated and changed by the user as described above. In some embodiments, the layout of the ILDs 160 in the mobile device case 100 can be different. The user may also selectively turn off ILDs 160 that the user does not want to use and can choose to display the same information across multiple different ILDs 160. In some embodiments, some or all ILDs 160 can be on at the same time; however, all of the ILDs 160 can be off at one time as well.

In some embodiments, the application may have a picture, video messaging or video sharing platform built in. Both the picture or video messaging platform and the picture or video sharing platform may utilize the back camera and flash of the host mobile device 110 and display in real-time the image that the camera is seeing on an ILD 160 display of the mobile device cover 100 or a screen on the host mobile device 100. Both the picture and video messaging platform and the picture and video sharing platform may utilize a camera and flash of the mobile device cover 100 and display in real-time the image that the camera is viewing on an ILD 160 display of the mobile device cover 100 or a screen on the host mobile device 110. The application may allow users to take pictures, start and stop video recording, activate photo sharing, do image rendering (e.g., apply filters, crop, rotate, zoom, etc.), post or share photos or videos, scroll through their shared pictures or videos, navigate through the picture and video messaging platform, navigate through the picture and video sharing platform, etc., utilizing buttons on the host mobile device 110, the front display touch screen of the host mobile device 110, voice commands received by the host mobile device 110, buttons on the mobile device cover 100, capacitive touch on the mobile device cover 100, any touch screen on the mobile device cover 100, voice commands received by the mobile device cover 100, etc. In some embodiments, this picture or video messaging platform and picture or video sharing platform can be more user-friendly than conventional picture or video messaging and sharing applications in that it may require fewer clicks by the user, utilize a better pixel density camera, utilize a flash mechanism, be able to display in real-time the image the user is taking, be able to display the image in the direction that the camera is facing, allow the user to use the application without having to unlock or lock host mobile device 110, etc.

Some embodiments according to the present disclosure may be realized in hardware, software, firmware or a combination of hardware, software or firmware. Some embodiments according to the present disclosure may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

Some embodiments according to the present disclosure may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: (a) conversion to another language, code or notation; and (b) reproduction in a different material form.

While some embodiments according to the present disclosure have been described with reference to certain embodiments, it will be understood by those skilled in the art that various changes may be made and equivalents may be substituted without departing from the scope of the present disclosure. In addition, the present disclosure contemplates that aspects or elements from different embodiments may be combined into yet other embodiments according to the present disclosure. Moreover, many modifications may be made to adapt a particular situation or material to the teachings of the present disclosure without departing from its scope. Therefore, it is intended that the present disclosure not be limited to the particular embodiments disclosed, but that the present disclosure will include all embodiments falling within the scope of the appended claims.

What is claimed is:

1. A mobile phone cover for use with a mobile phone, comprising:
a processor; and
one or more displays operatively coupled to the processor, wherein the processor is configured to receive one or more electrical signals, wherein the one or more electrical signals include information, and wherein the processor is configured to display the information on one or more of the displays.

2. The mobile phone cover according to claim 1, wherein the one or more displays include one or more flexible active-matrix organic light emitting diodes or one or more organic light emitting diodes.

3. The mobile phone cover according to claim 1, wherein the one or more displays include one or more touch sensitive displays or one or more pressure sensitive displays.

4. The mobile phone cover according to claim 1, wherein the one or more displays include one or more light emitting diode displays or one or more liquid crystal displays.

5. The mobile phone cover according to claim 1, wherein the one or more displays comprises a first display and a second display, wherein the first display of the mobile phone cover is configured to be arranged on an opposite side of the display of the mobile phone.

6. The mobile phone cover according to claim 5, wherein the second display is configured to be arranged on at least one side of the mobile phone cover.

7. The mobile phone cover according to claim 5, wherein the second display is configured so that content can scroll from along a first side of the at least one side to a second side of the at least one side of the mobile phone cover.

8. The mobile phone cover according to claim 5, wherein the second display is configured to be arrange on at least two edges of the mobile phone cover.

9. The mobile phone cover according to claim 5, wherein the second display is configured so that content can scroll from along a first edge of the at least two edges to a second edge of the at least two edges of the mobile phone cover.

10. The mobile phone cover according to claim 1, wherein one or more of the displays are configured to be arranged on at least two sides or at least two edges of the mobile phone cover.

11. The mobile phone cover according to claim 10, wherein one or more of the displays are configured so that content can scroll from along a first side of the at least two sides or a first edge of the at least two edges to a second side of the at least two sides or a second edge of the at least two edges of the mobile phone cover.

12. The mobile phone cover according to claim 1, wherein the one or more displays include a first display and a second display, wherein the first display is configured to display video content or multimedia content, and wherein the second display is configured to display data information.

13. The mobile phone cover according to claim 12, wherein the first display or the second display is configured to display one or more of the following: caller identification, sender identification, and information associated with the identified caller or the identified sender.

14. The mobile phone cover according to claim 12, wherein the first display or the second display is configured to display one or more of the following: caller identification, sender identification, and received data.

15. The mobile phone cover according to claim 1, wherein the one or more displays include a first display and a second display, wherein the first display is configured to display video content or multimedia content from the mobile phone, and wherein the second display is configured to display data information from the mobile phone.

16. The mobile phone cover according to claim 1, wherein the one or more displays are configured to display one or more of the following: a calendar alert, an appointment, a reminder, a notification, live video content, recorded video content, multimedia content, live content, updated content, an animation, and an image.

17. The mobile phone cover according to claim 1, wherein the one or more displays include a first display and a second display, wherein the first display and the second display are configured to be arranged on different sides of the mobile phone cover.

18. The mobile phone cover according to claim 1, wherein the first display is configured to play live video content, recorded video, or multimedia content, and wherein the second display is configured to display information relating to one or more of the following: received data, stocks, weather, sports, texts, alerts, notifications, and email.

19. The mobile phone cover according to claim 12, wherein the second display is configured to scroll the displayed information over at least two sides of the mobile phone cover.

20. The mobile phone cover according to claim 1, wherein one or more of the displays are configured to be used as an alternative to a display of the mobile phone.

21. The mobile phone cover according to claim 1, wherein one or more of the displays are configured to be used in combination with a display of the mobile phone.

22. The mobile phone cover according to claim 1, wherein one or more of the displays are configured to display video content or multimedia content that was being displayed on a display of the mobile phone.

23. The mobile phone cover according to claim 1, comprising:
one or more buses,
wherein the processor of the mobile phone cover is configured to be communicatively coupled with circuitry of the mobile phone via the one or more buses.

24. The mobile phone cover according to claim 1, comprising:
a rechargeable battery that is operatively coupled to the processor.

25. The mobile phone cover according to claim 24, wherein the rechargeable battery is configured to power the mobile phone or is configured to charge a battery of the mobile phone.

26. The mobile phone cover according to claim 1, wherein the one or more electrical signals include one or more digital signals, wherein the one or more digital signals include the information.

27. The mobile phone cover according to claim 26, wherein the one or more digital signals are received from the mobile phone.

28. The mobile phone cover according to claim 26, wherein the one or more digital signals include one or more of the following: live video content, recorded video content, multimedia content, text data, caller identification data, sender identification data, alert data, notification data, calendar data, and email data.

29. The mobile phone cover according to claim 26, wherein the one or more digital signals include first content and second content, wherein the first content is displayed on a first display of the one or more displays, and wherein the second content is displayed on a second display of the one or more displays.

30. The mobile phone cover according to claim 29, wherein the first display and the second display are on different sides of the mobile phone cover.

* * * * *